April 19, 1938.   E. E. CARLSON   2,114,955
METHOD AND MECHANISM FOR MAKING RUNPROOF OR RUN-RESISTANT
FULL-FASHIONED OR FLAT-KNIT STOCKINGS OR BLANKS
Filed March 4, 1937   32 Sheets-Sheet 1

Inventor
Ellsworth E. Carlson
Attys

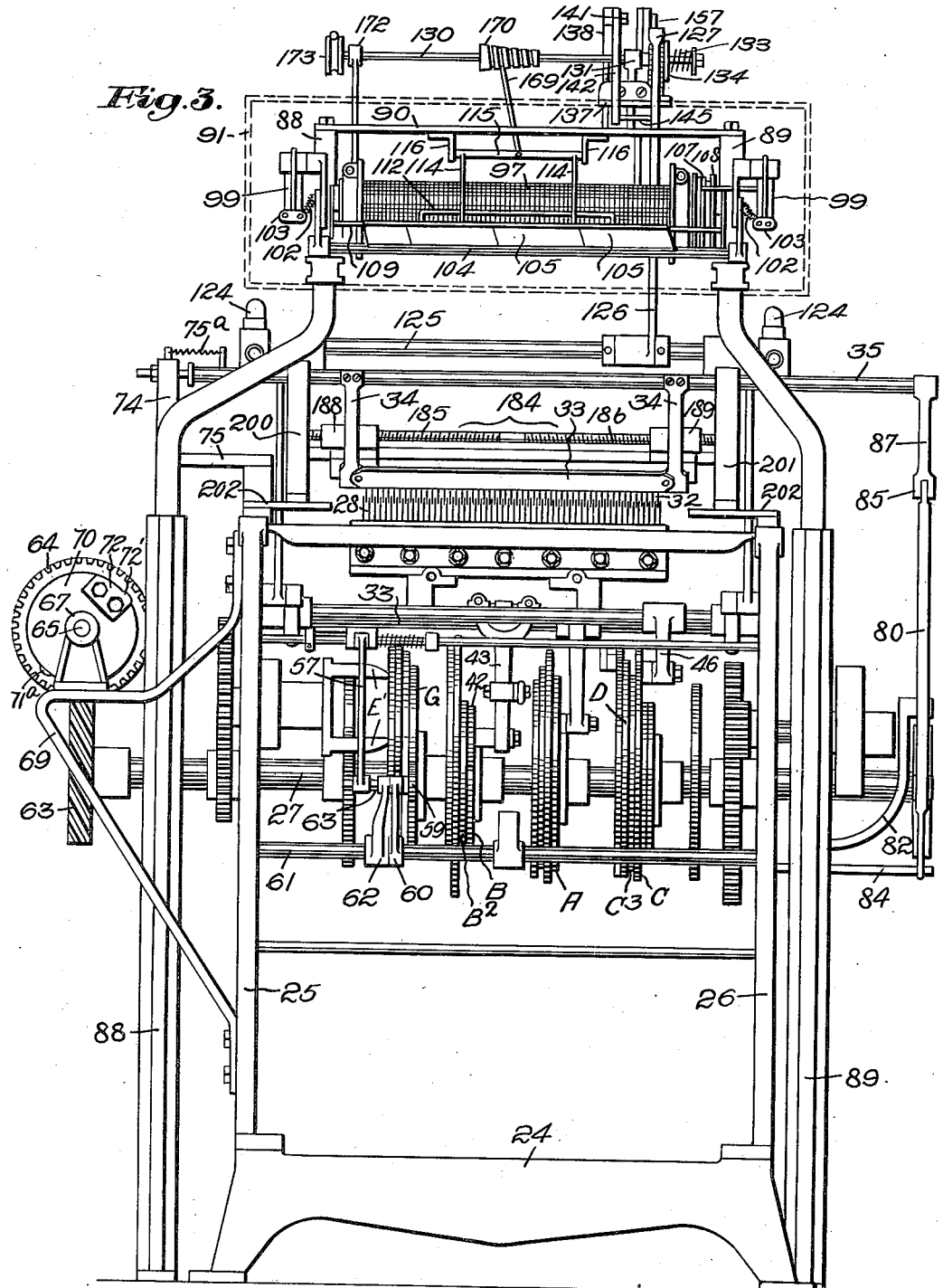

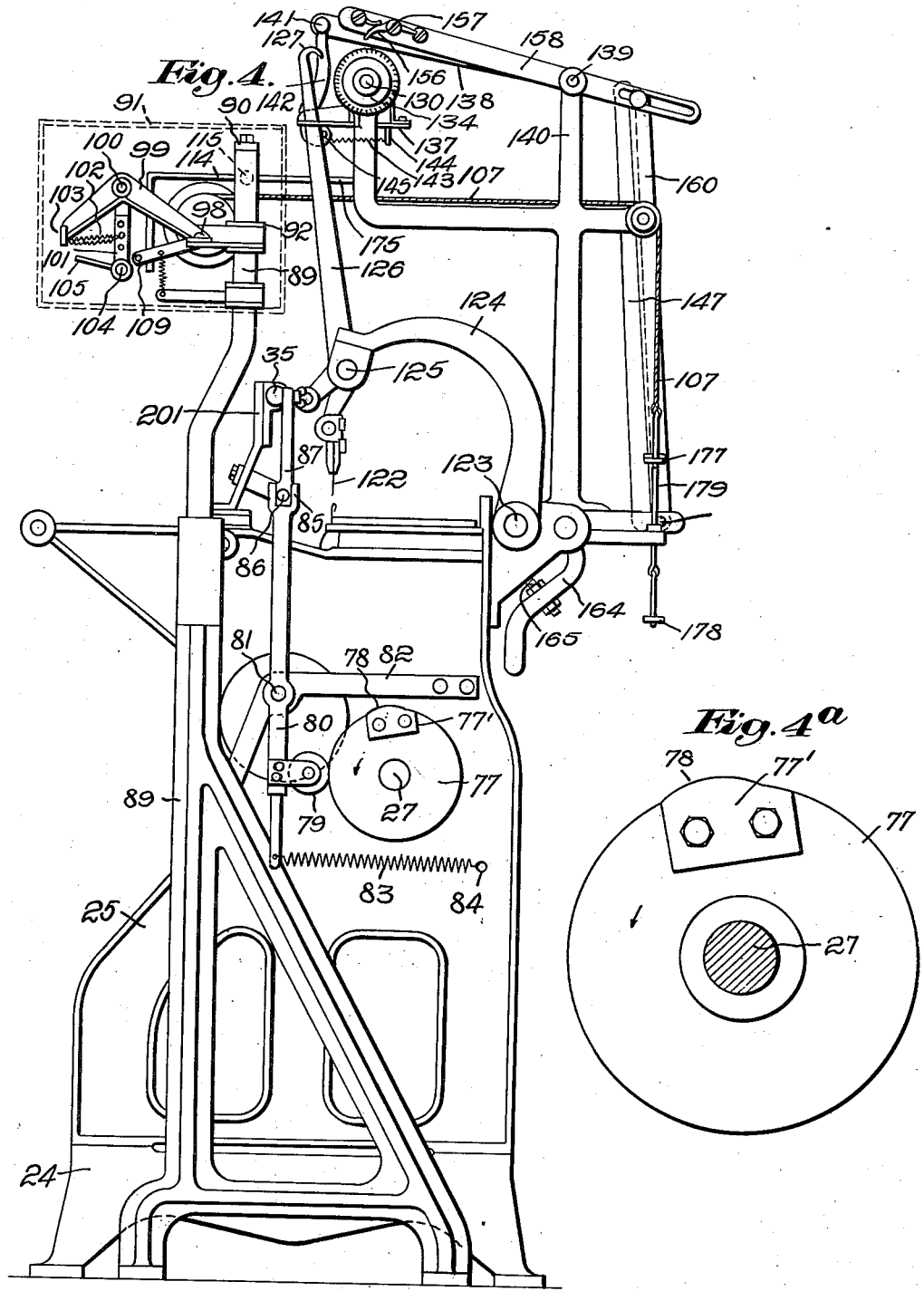

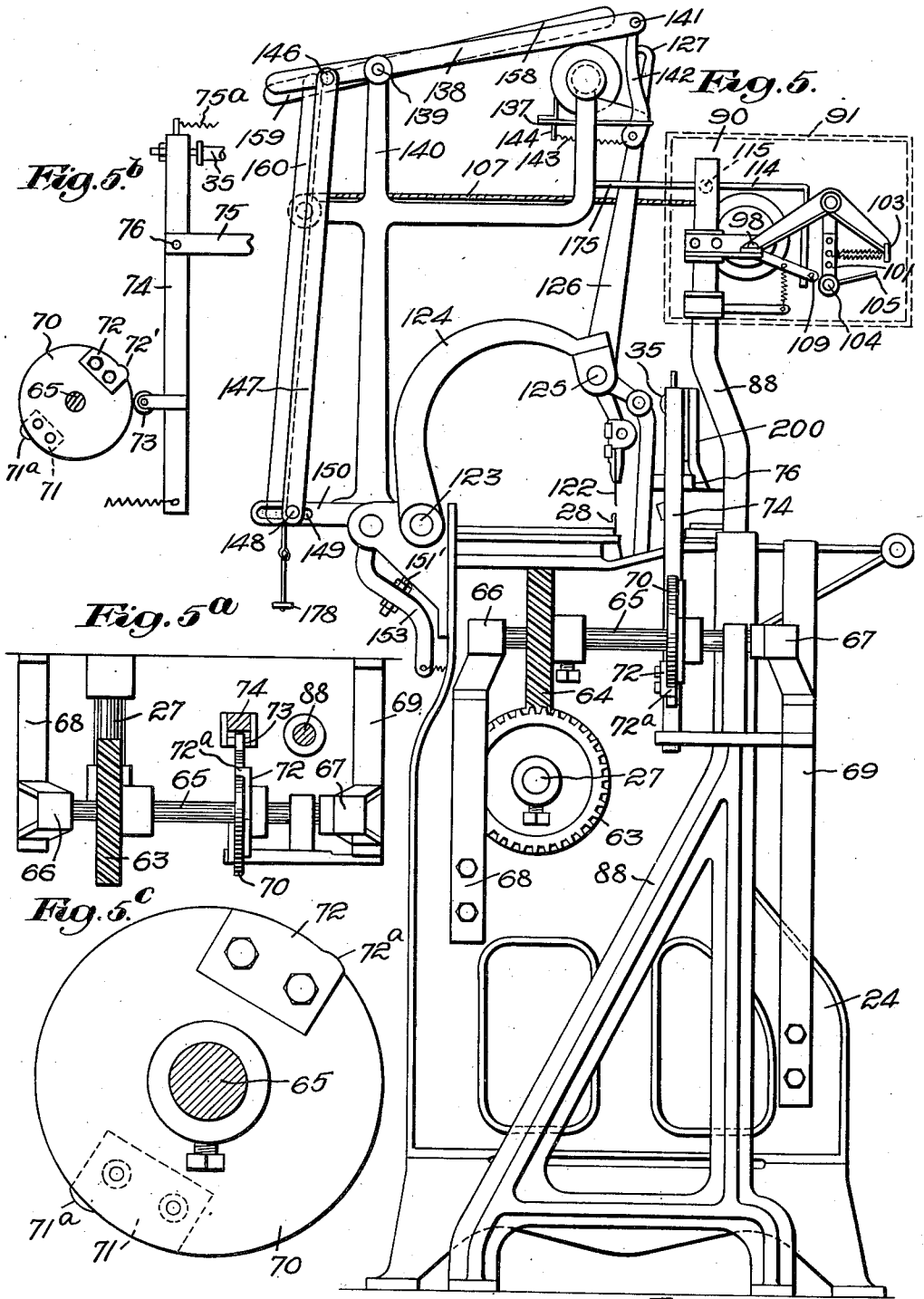

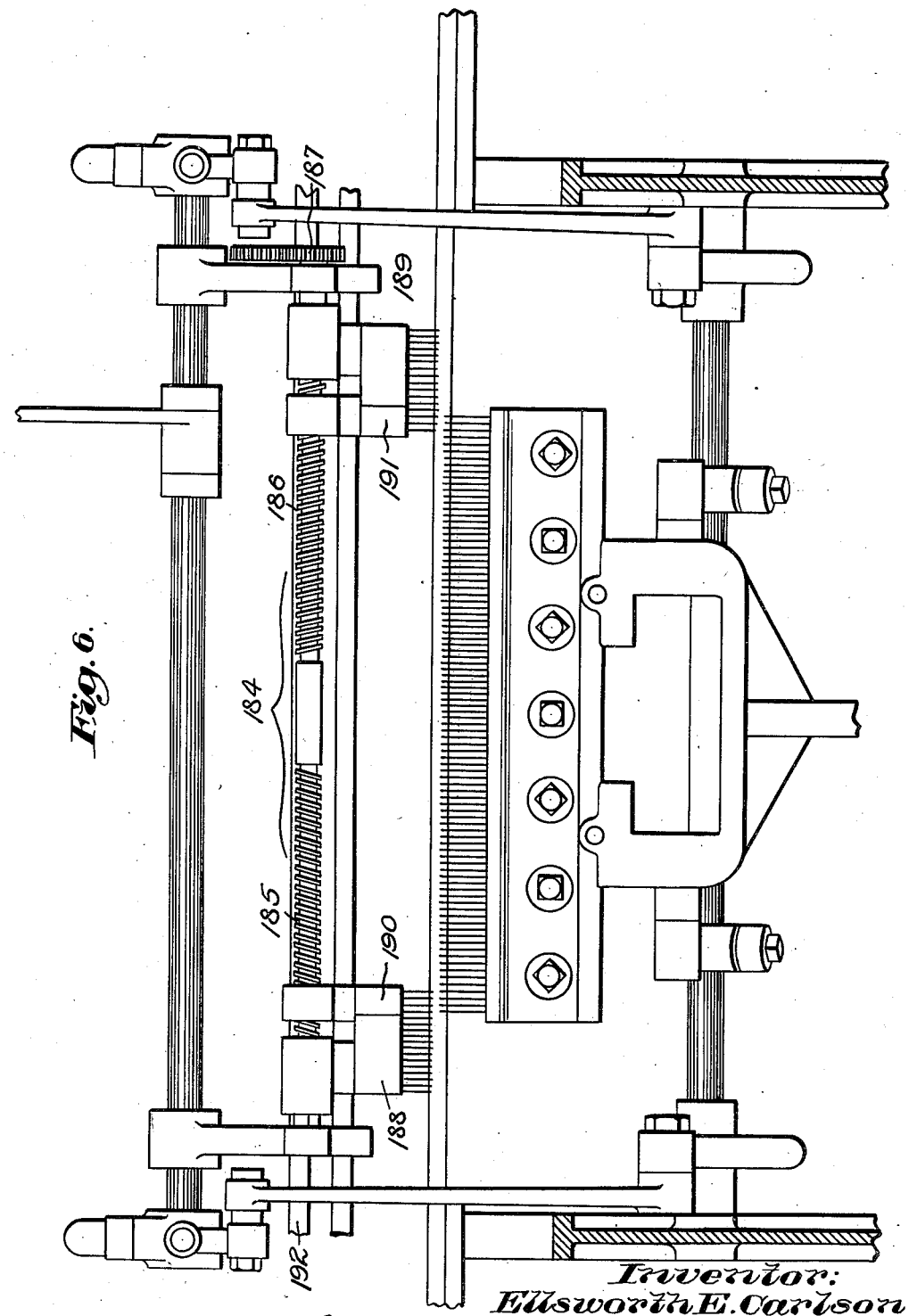

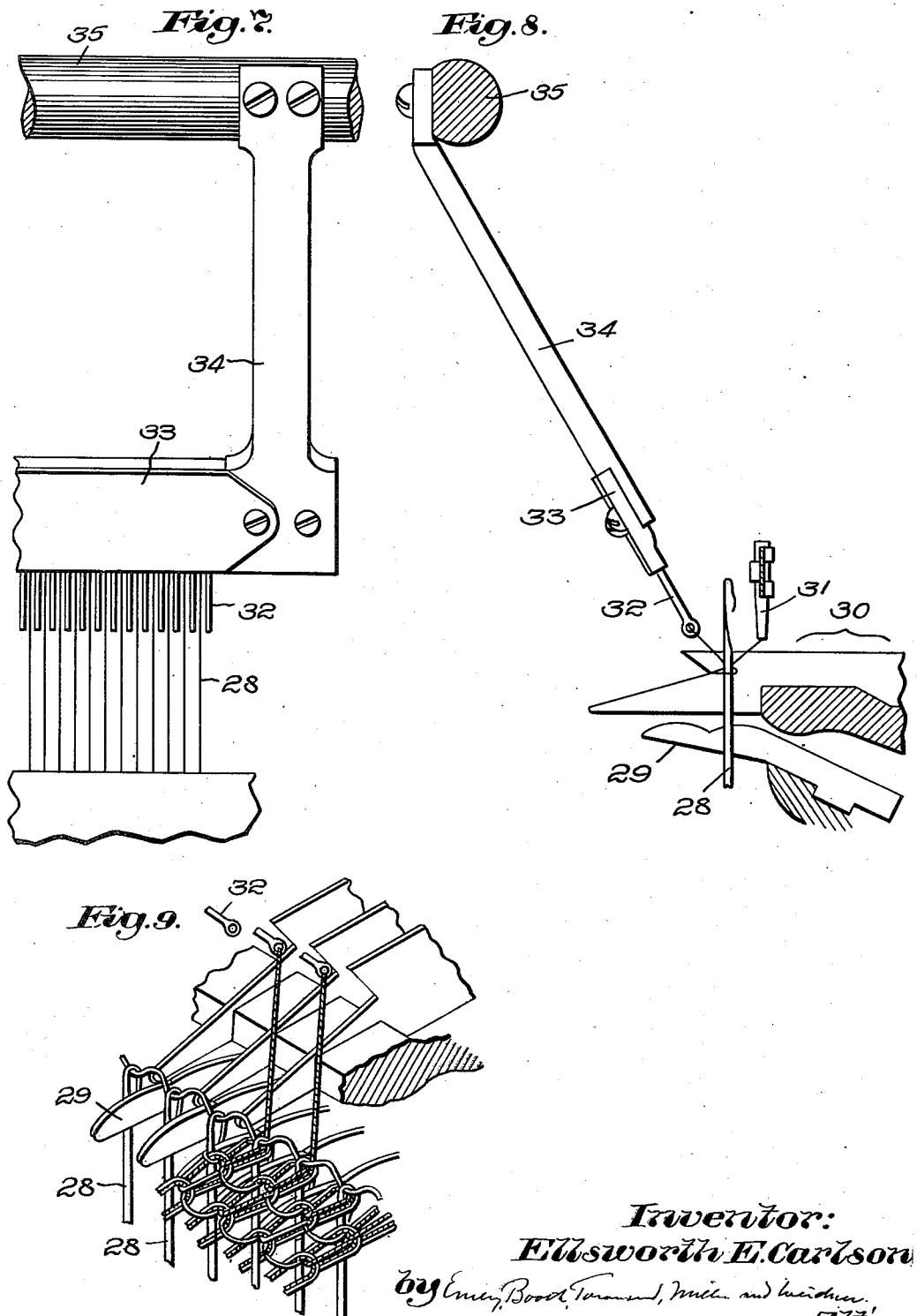

April 19, 1938.   E. E. CARLSON   2,114,955
METHOD AND MECHANISM FOR MAKING RUNPROOF OR RUN-RESISTANT
FULL-FASHIONED OR FLAT-KNIT STOCKINGS OR BLANKS
Filed March 4, 1937   32 Sheets-Sheet 7
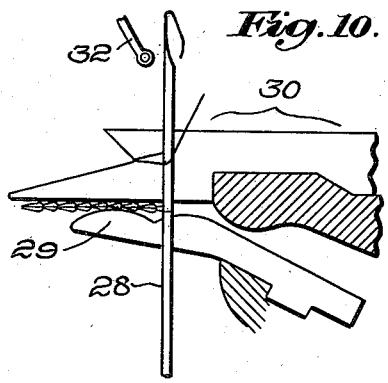
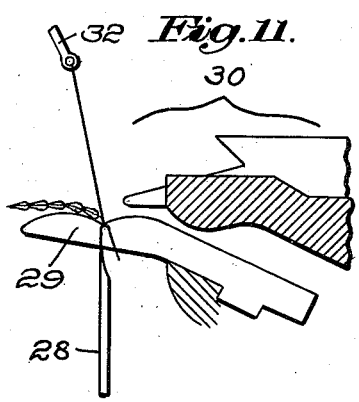
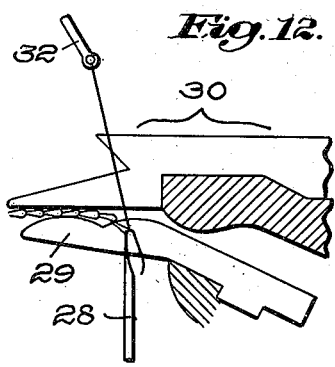
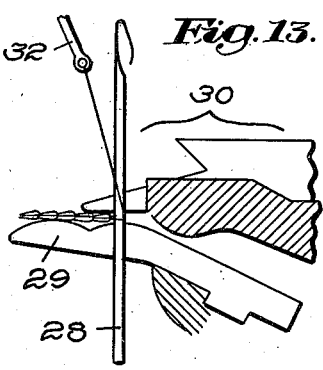
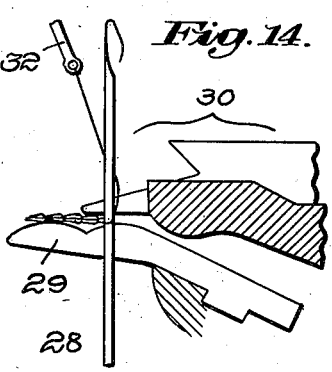
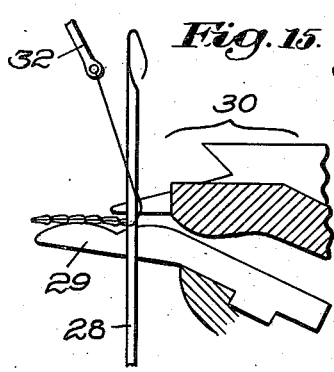
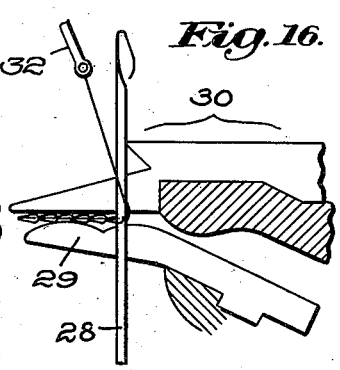
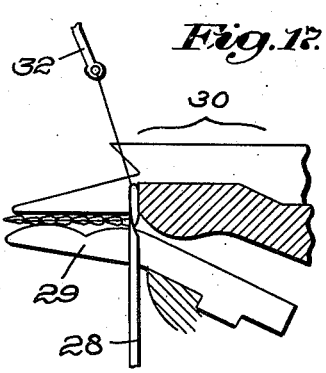
Inventor:
Ellsworth E. Carlson,
Attys

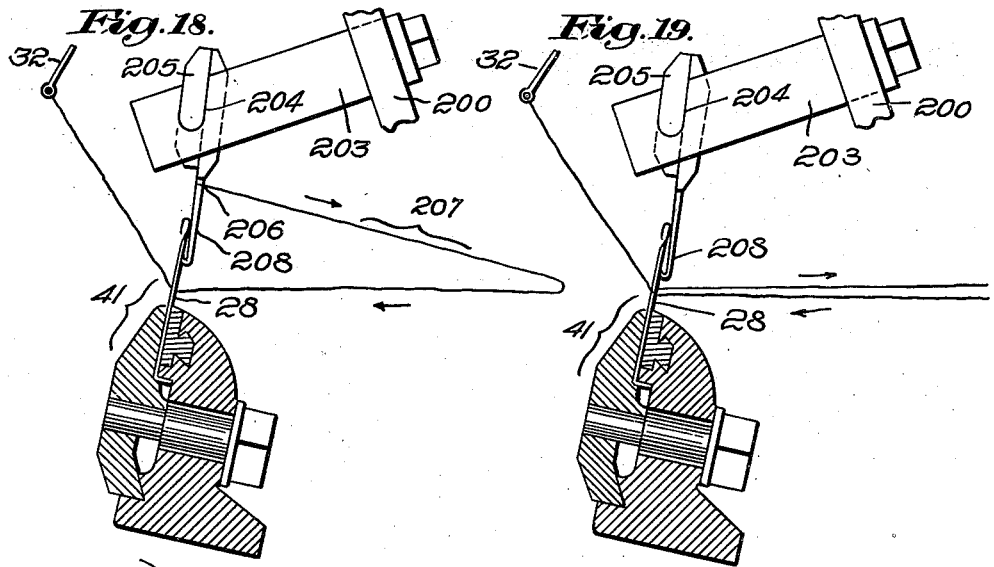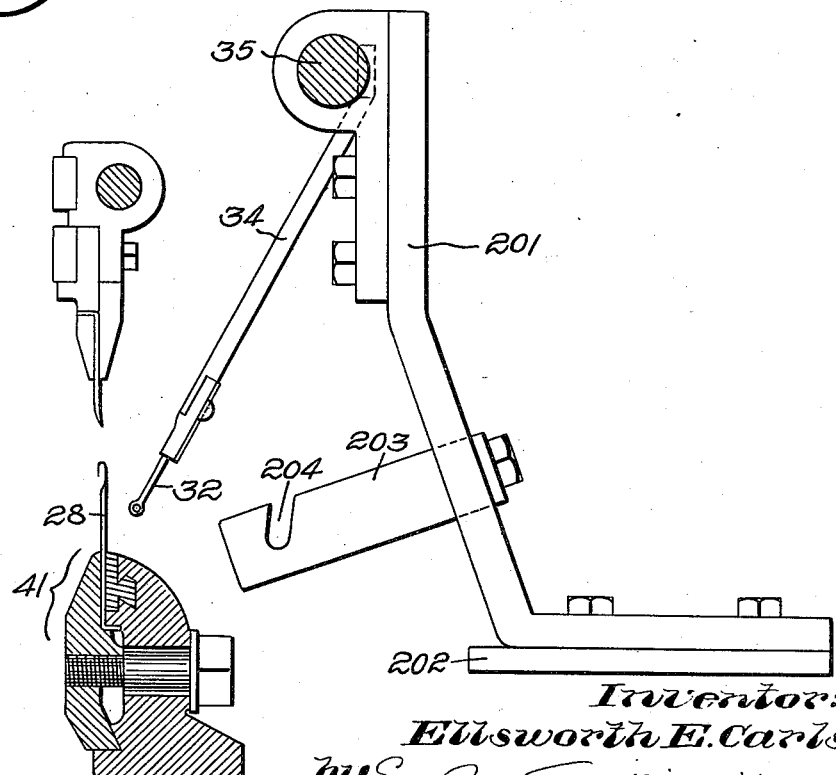

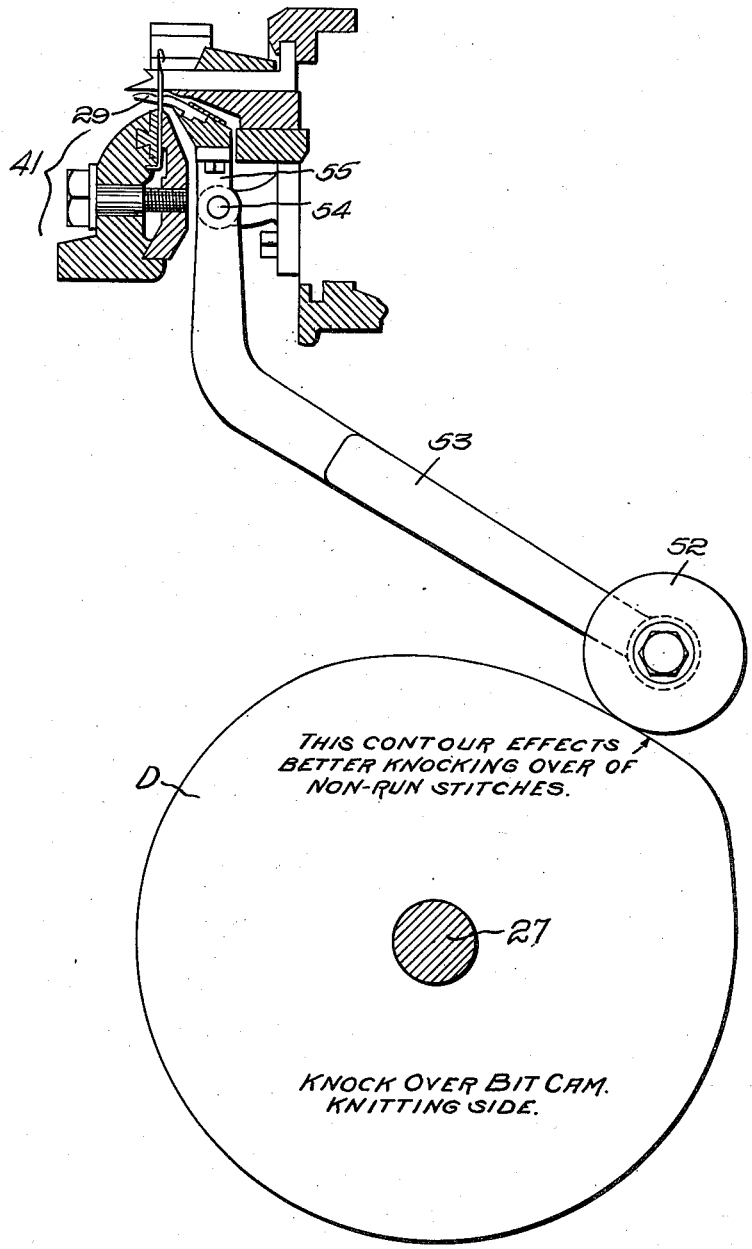

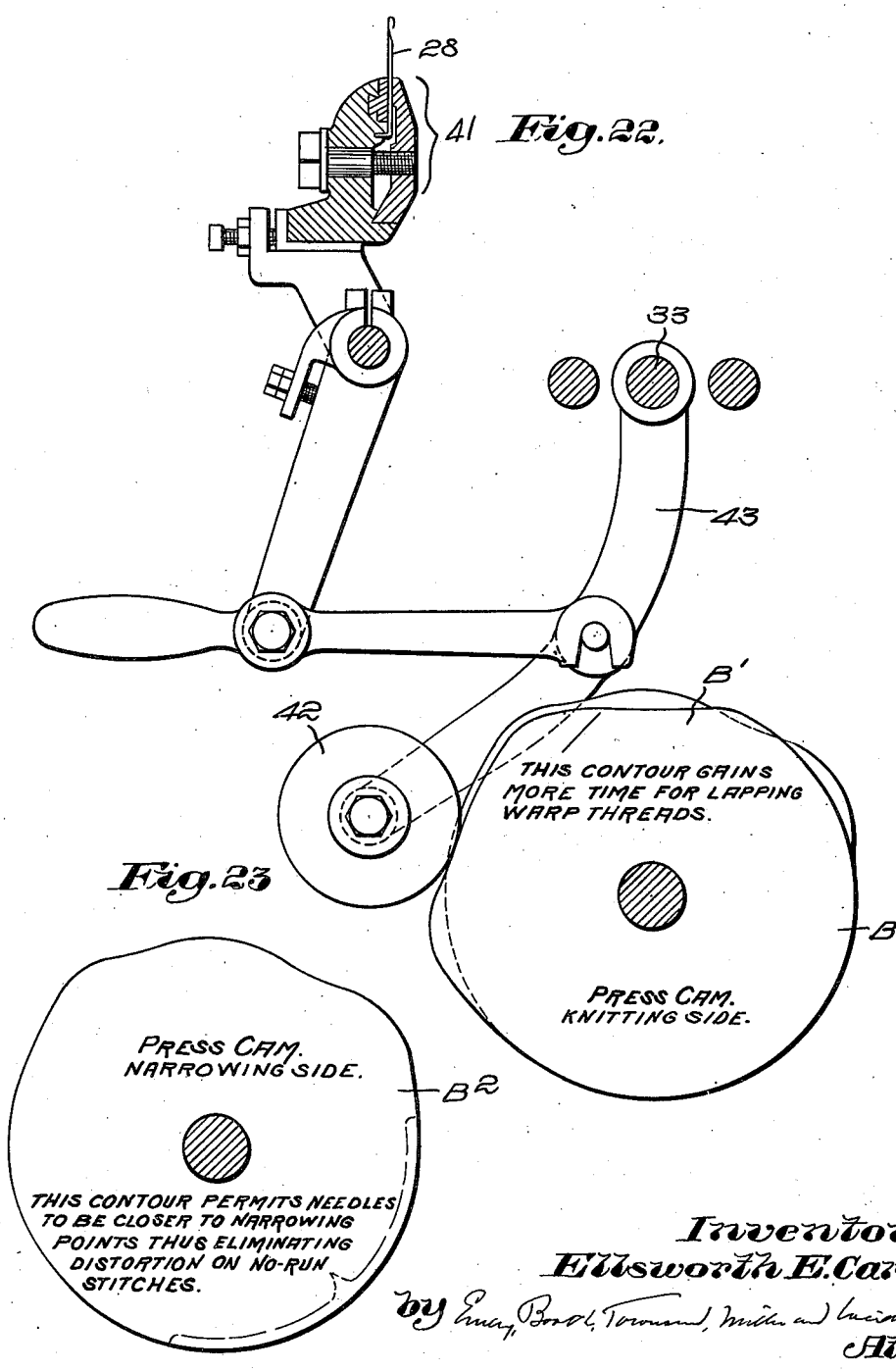

April 19, 1938.　　　　　E. E. CARLSON　　　　　2,114,955
METHOD AND MECHANISM FOR MAKING RUNPROOF OR RUN-RESISTANT
FULL-FASHIONED OR FLAT-KNIT STOCKINGS OR BLANKS
Filed March 4, 1937　　　　32 Sheets-Sheet 11

Inventor:
Ellsworth E. Carlson

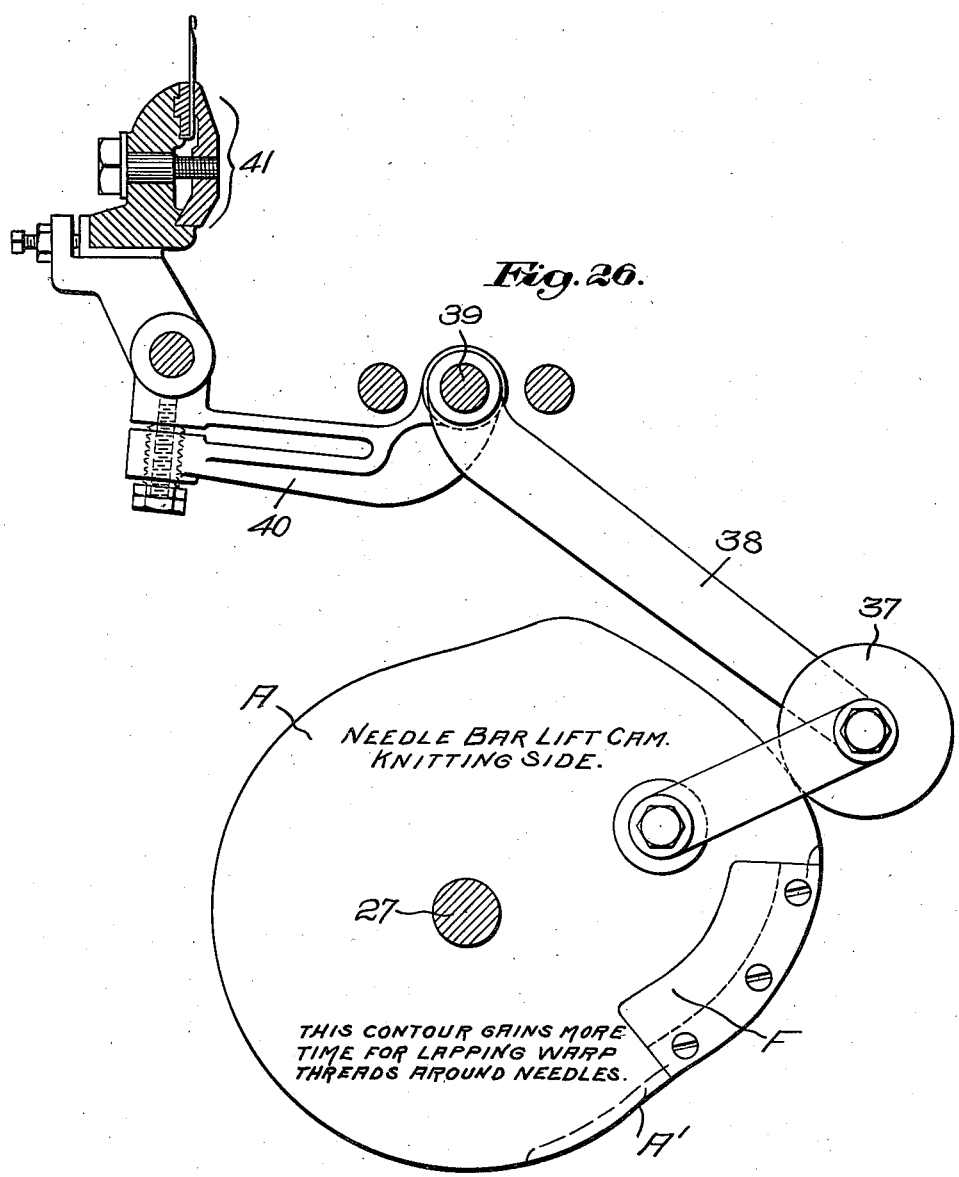

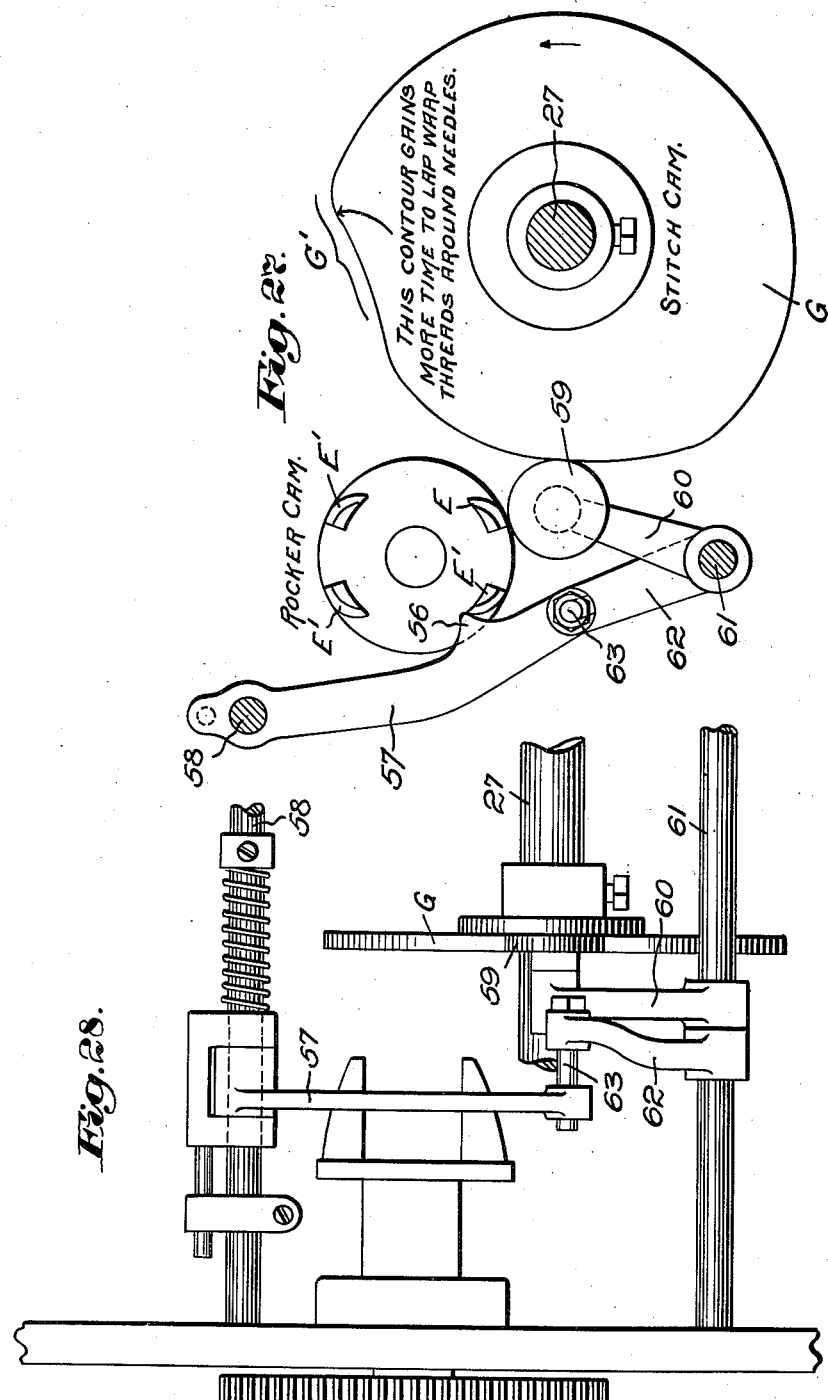

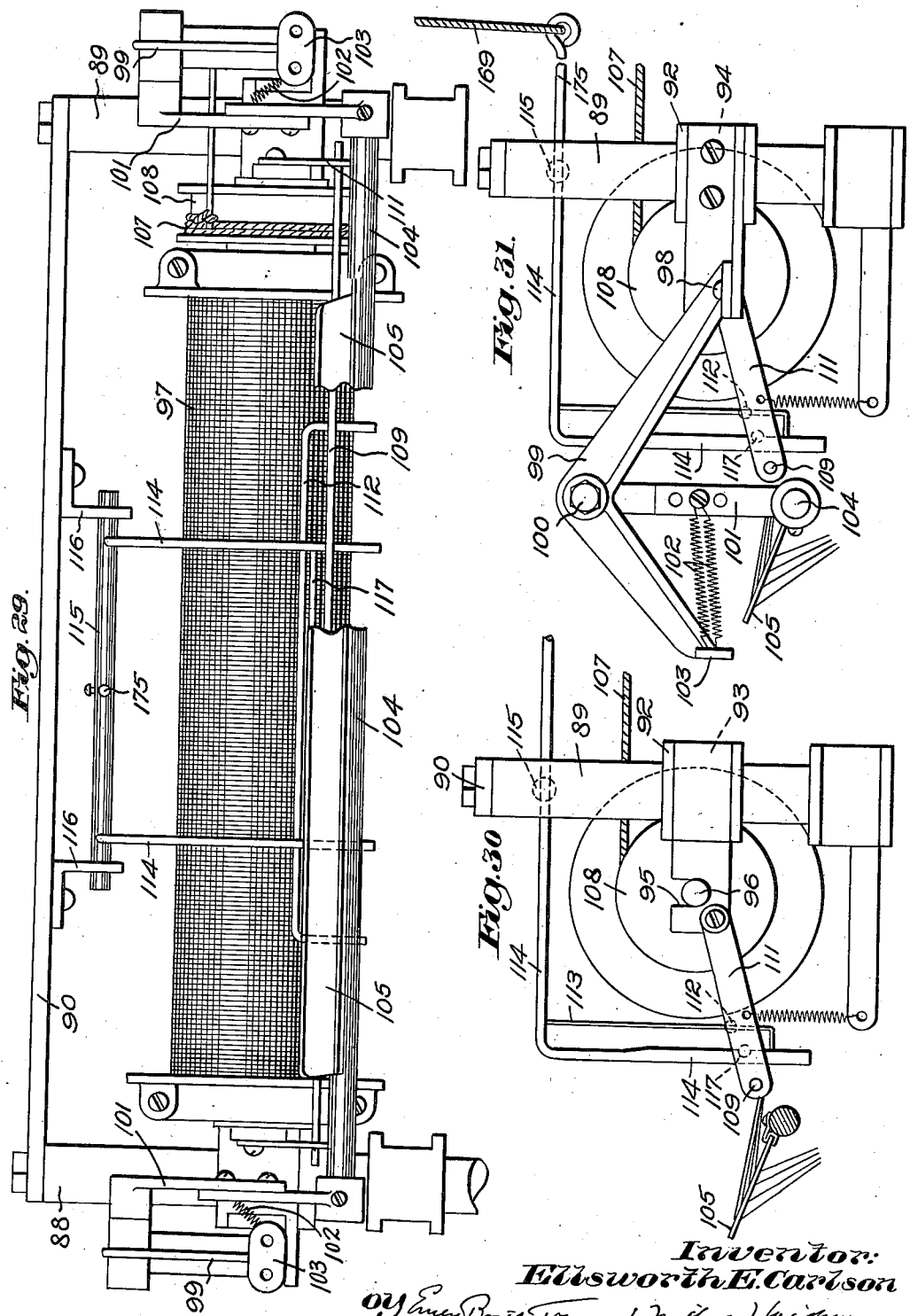

April 19, 1938.　　　　E. E. CARLSON　　　　2,114,955
METHOD AND MECHANISM FOR MAKING RUNPROOF OR RUN-RESISTANT
FULL-FASHIONED OR FLAT-KNIT STOCKINGS OR BLANKS
Filed March 4, 1937　　　　32 Sheets-Sheet 15
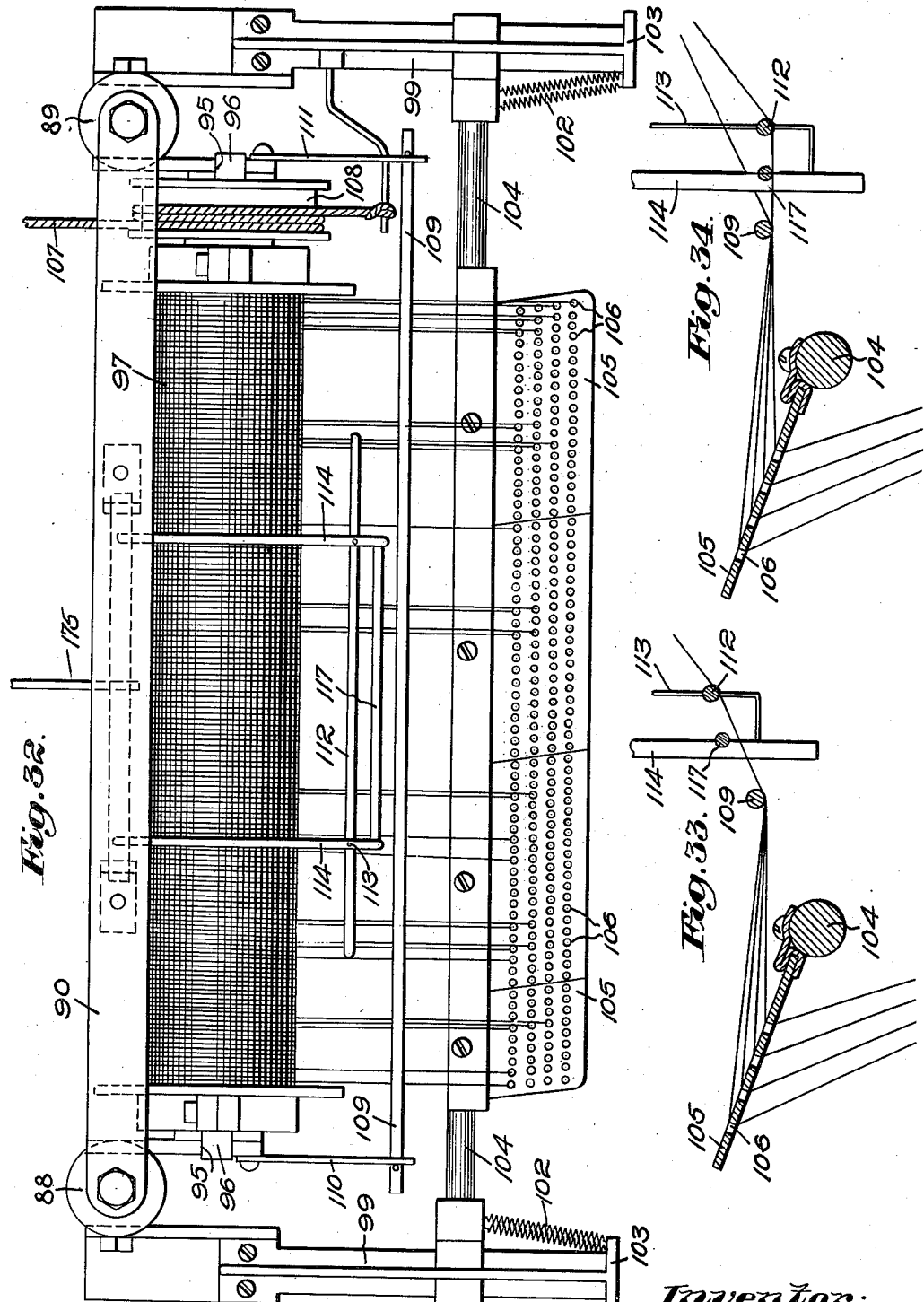

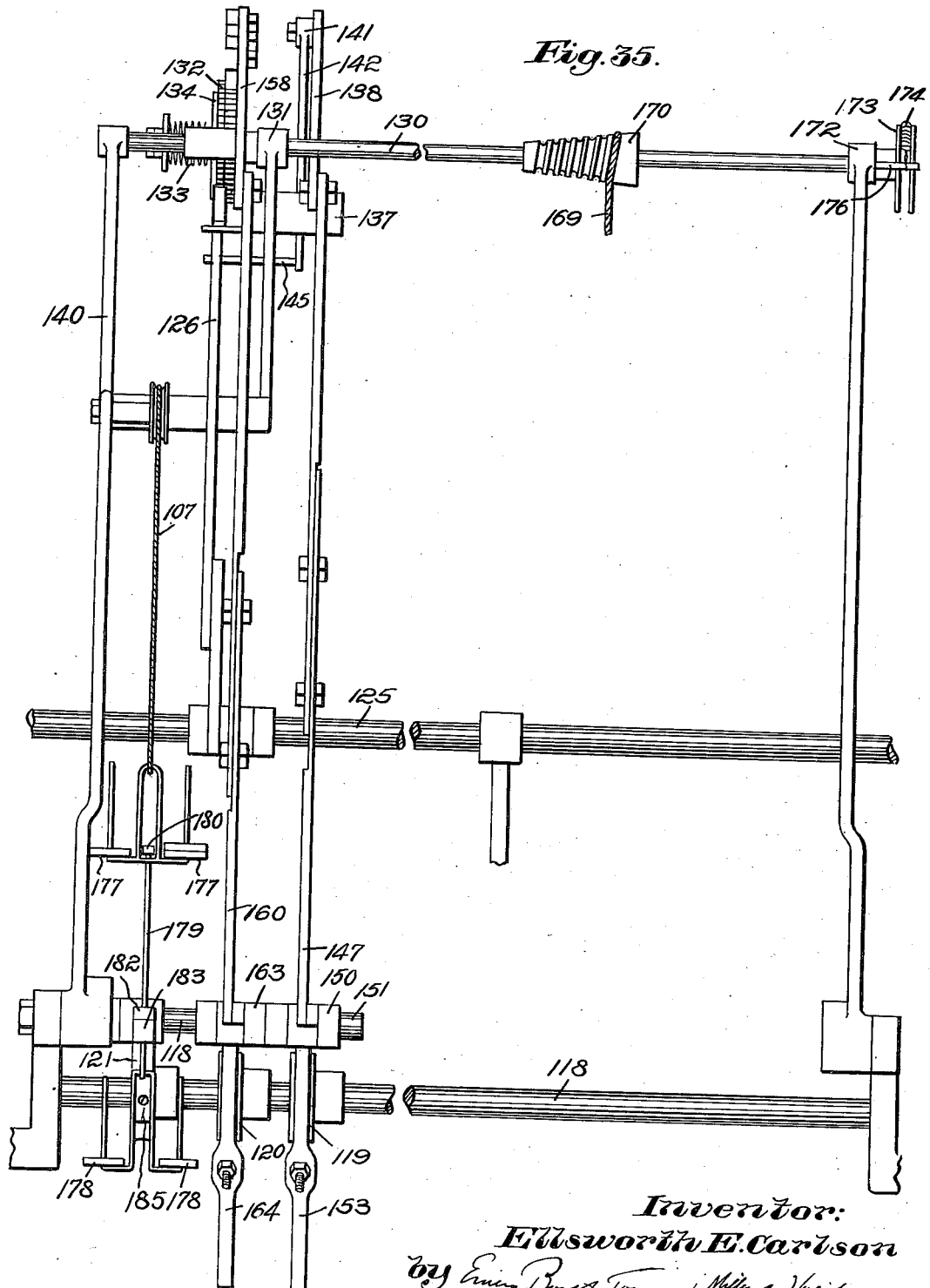

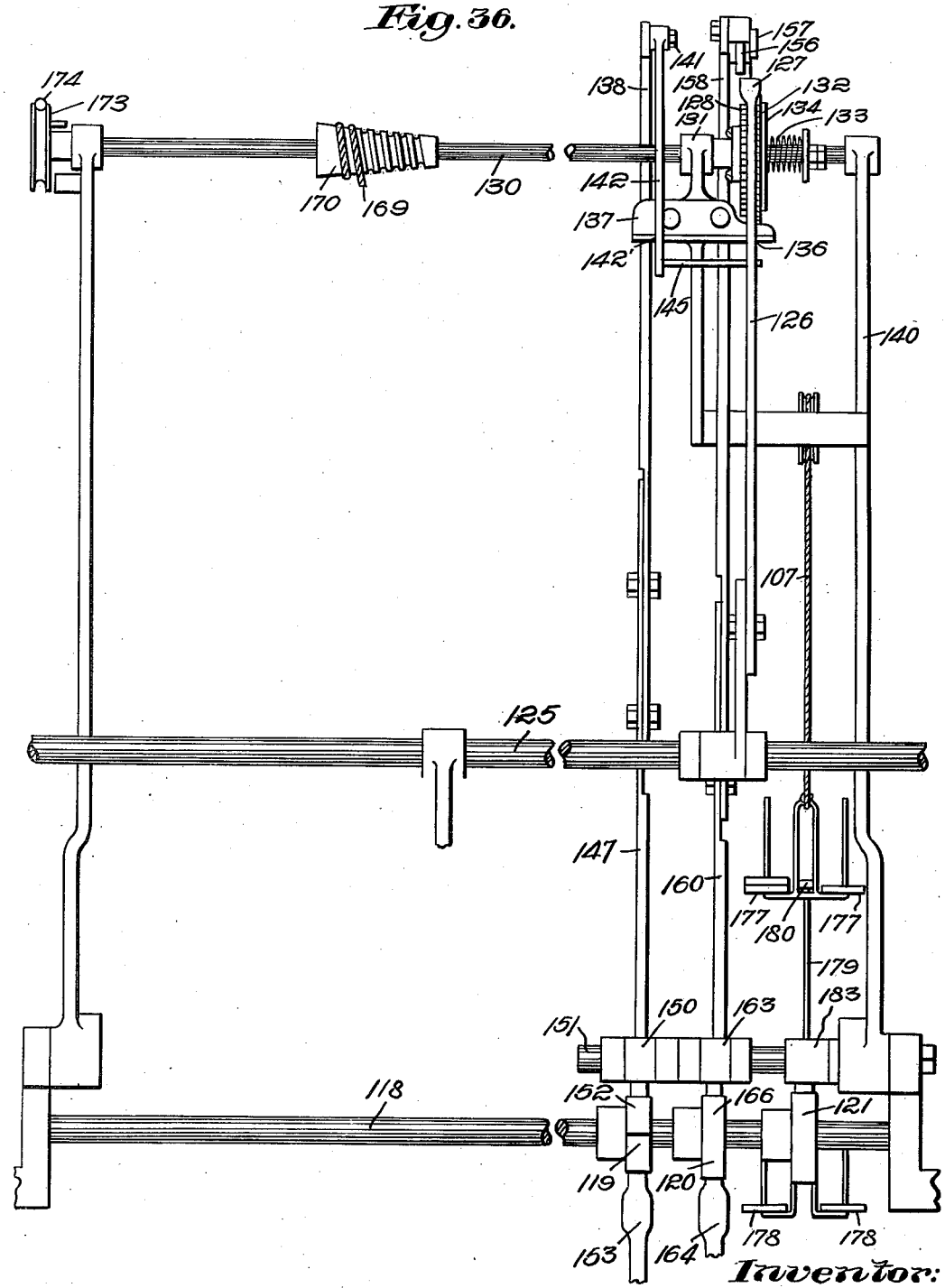

April 19, 1938.  E. E. CARLSON  2,114,955
METHOD AND MECHANISM FOR MAKING RUNPROOF OR RUN-RESISTANT
FULL-FASHIONED OR FLAT-KNIT STOCKINGS OR BLANKS
Filed March 4, 1937  32 Sheets-Sheet 18
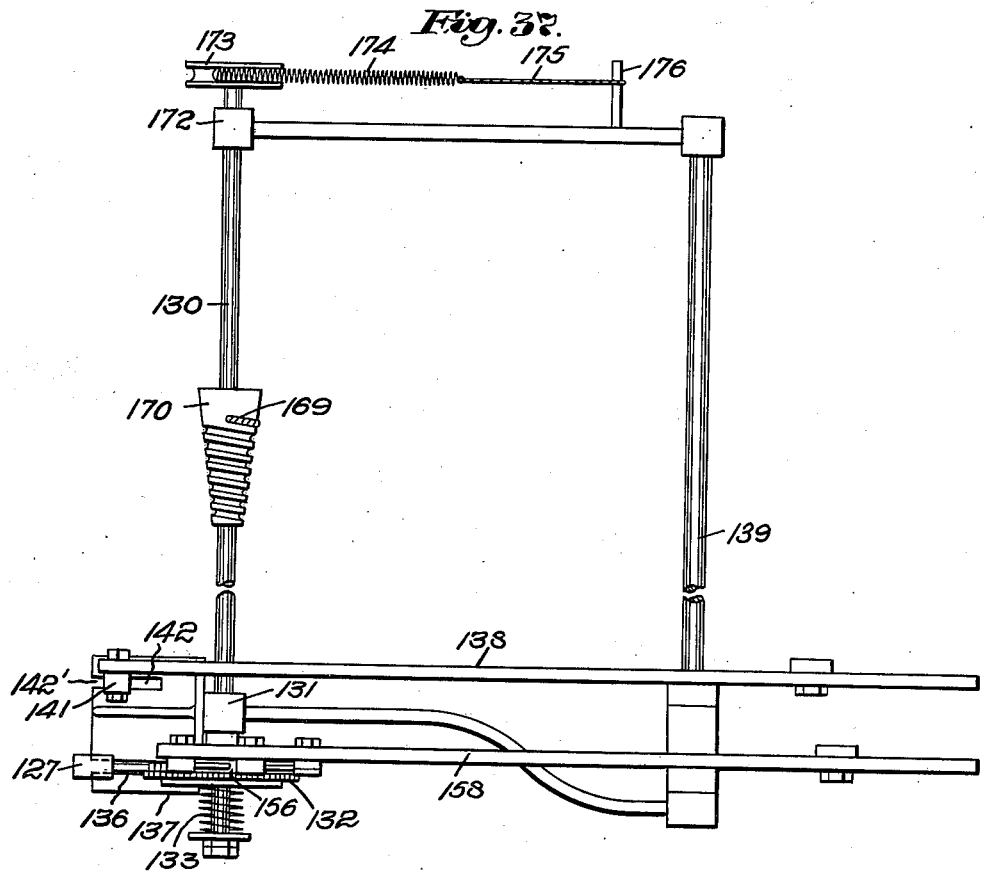
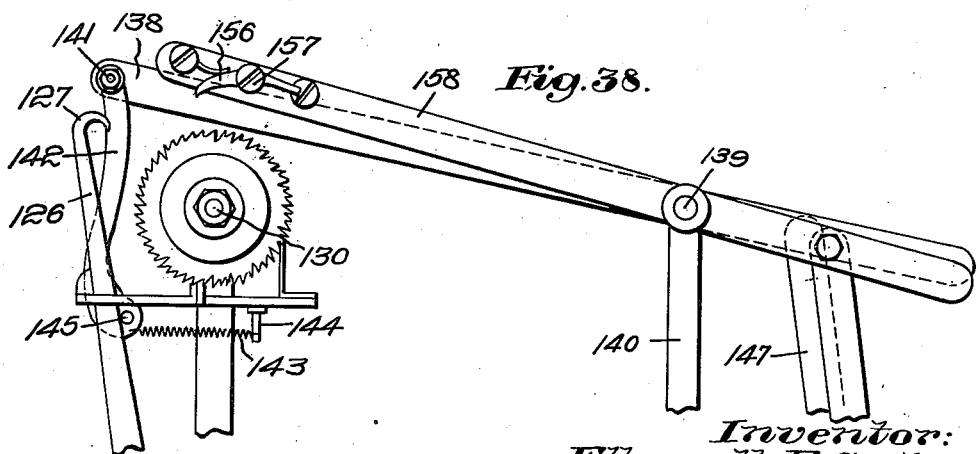
Inventor:
Ellsworth E. Carlson,
by Emery, Booth, Townsend, Miller and Neidner
Attys.

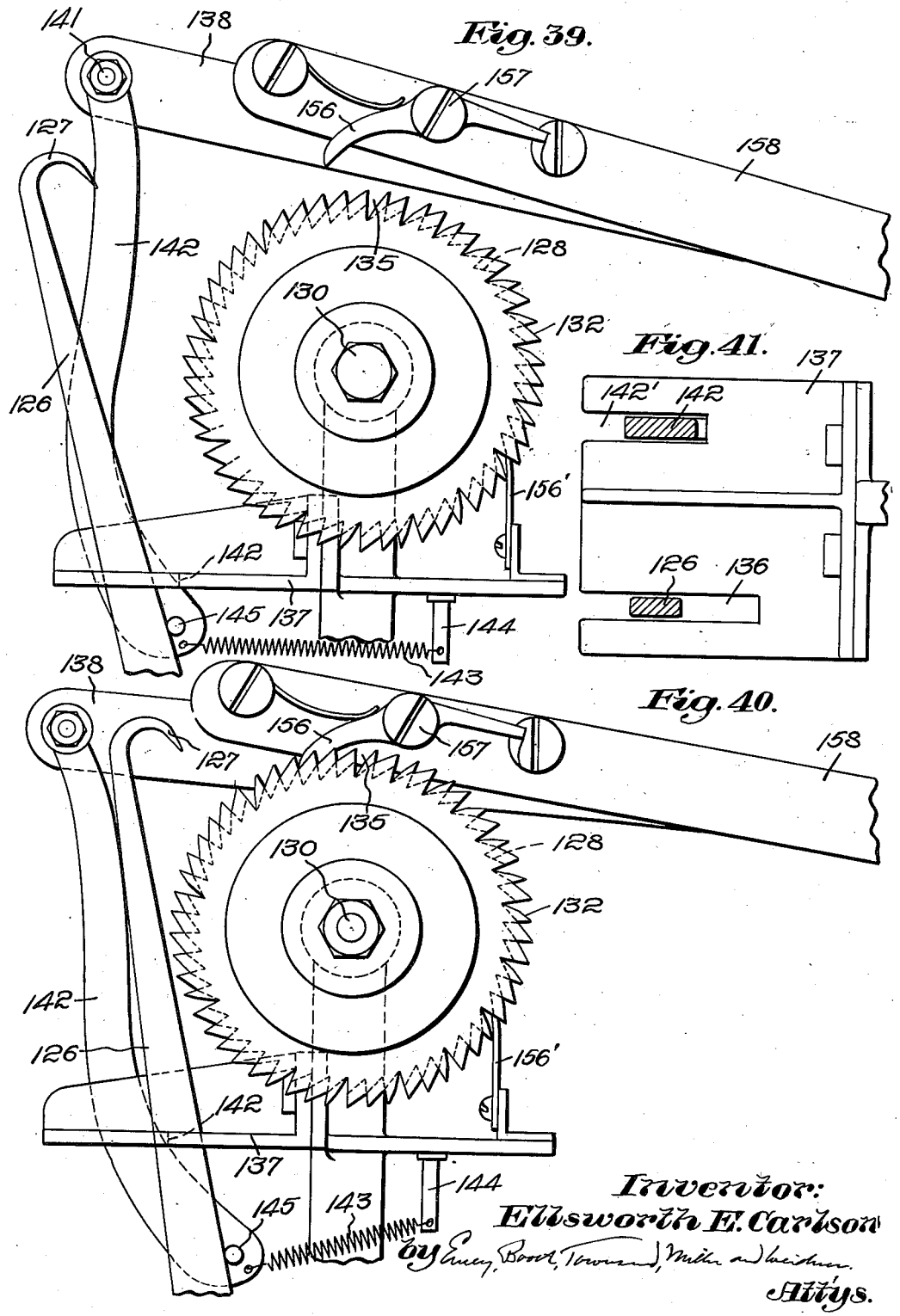

April 19, 1938.　　　E. E. CARLSON　　　2,114,955
METHOD AND MECHANISM FOR MAKING RUNPROOF OR RUN-RESISTANT
FULL-FASHIONED OR FLAT-KNIT STOCKINGS OR BLANKS
Filed March 4, 1937　　　32 Sheets-Sheet 20
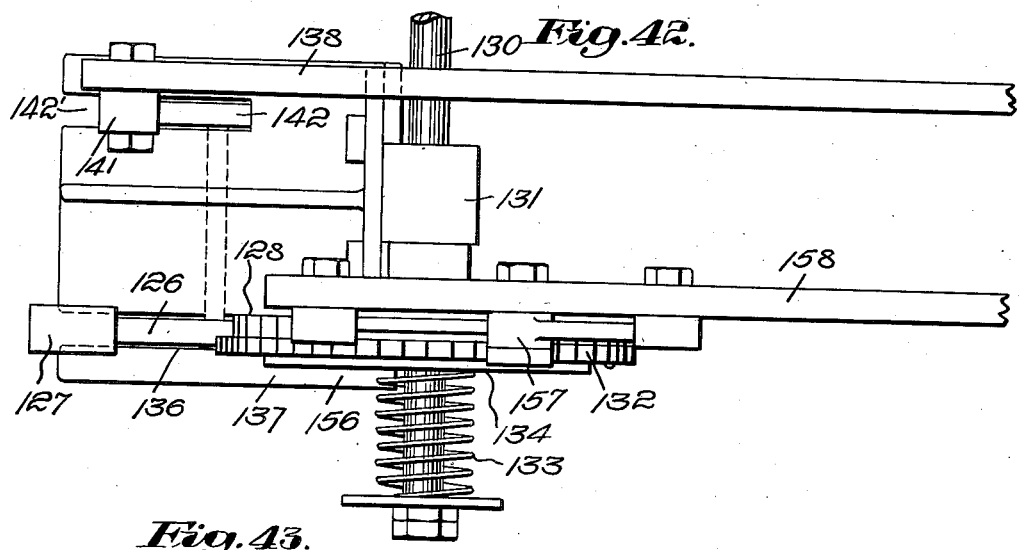
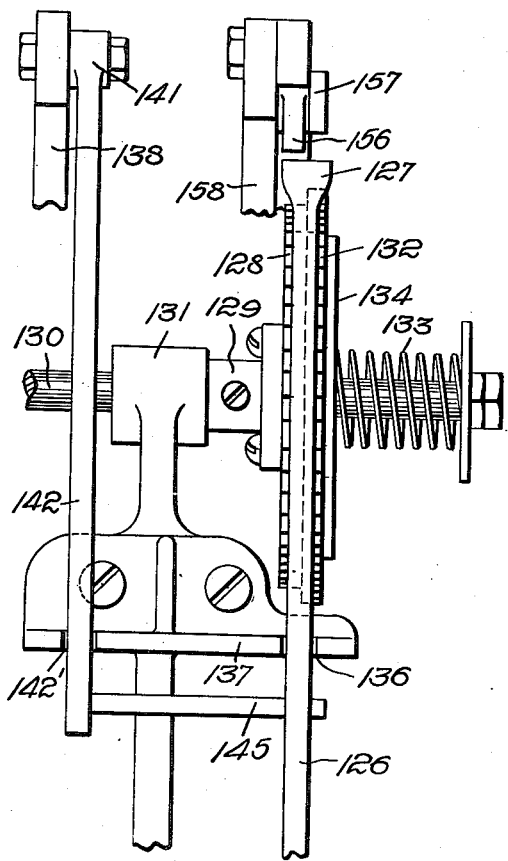
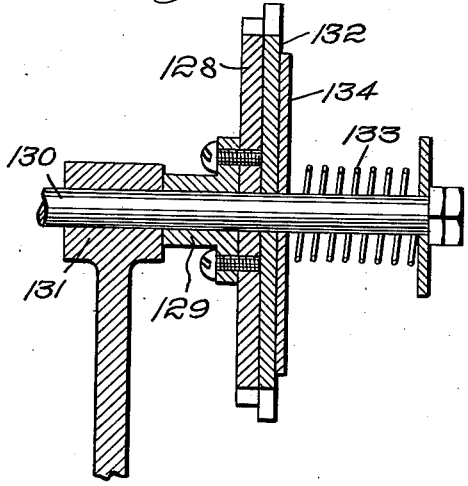
Inventor:
Ellsworth E. Carlson

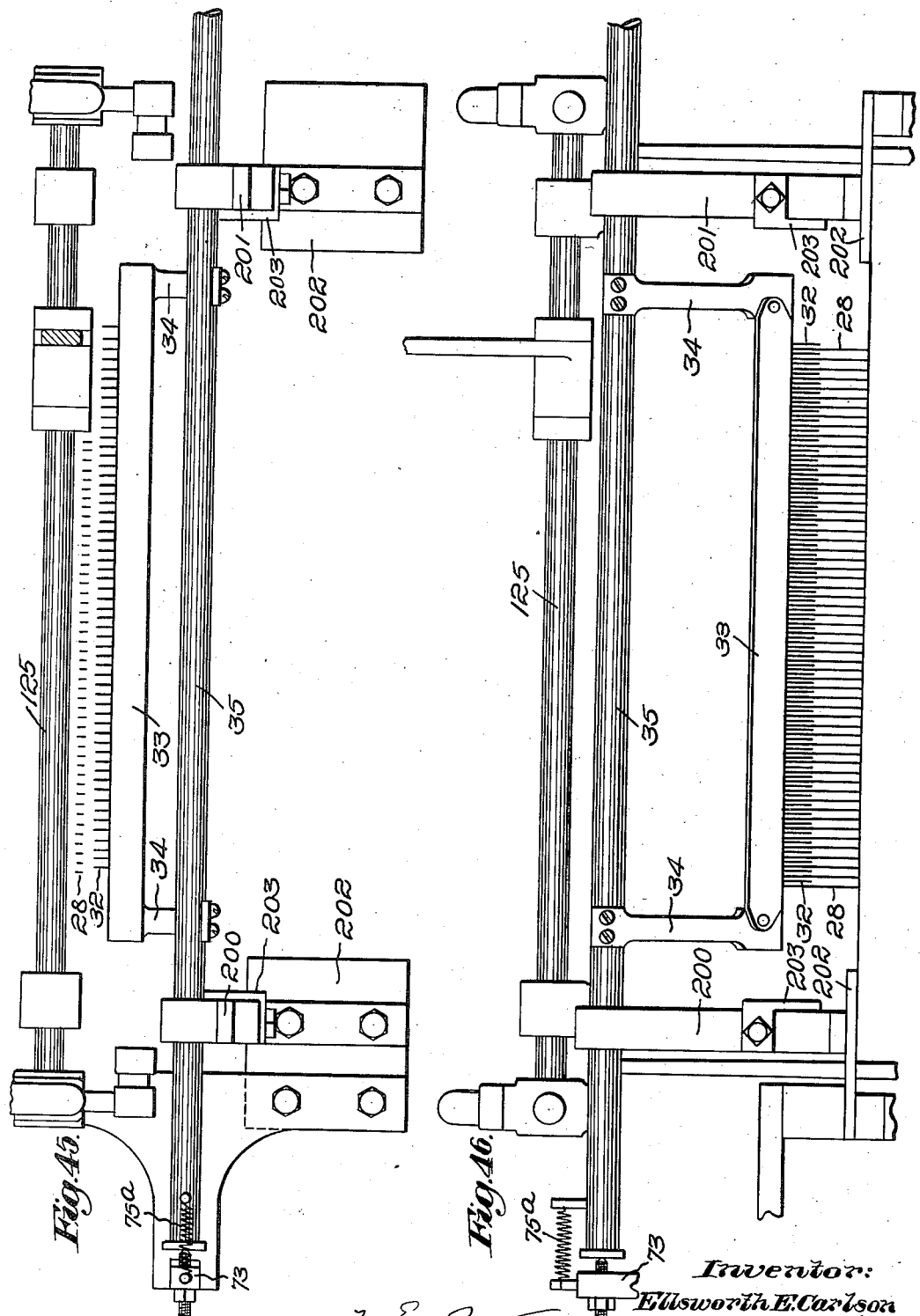

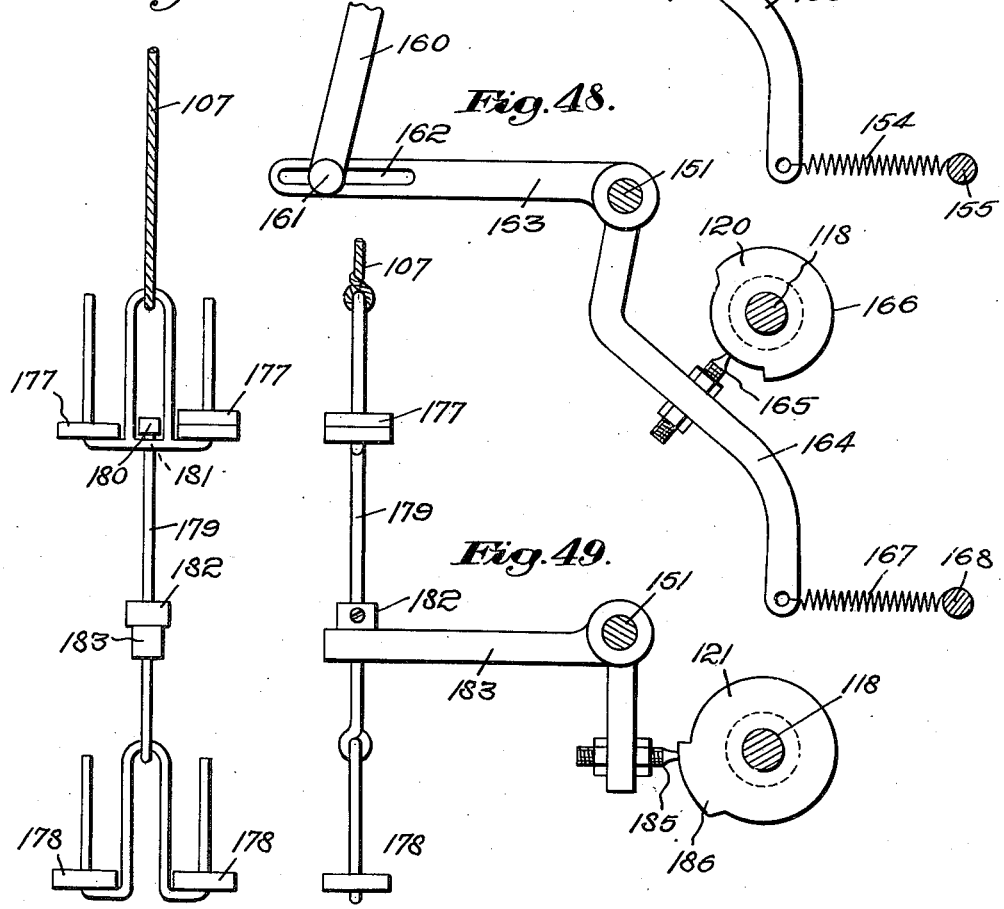

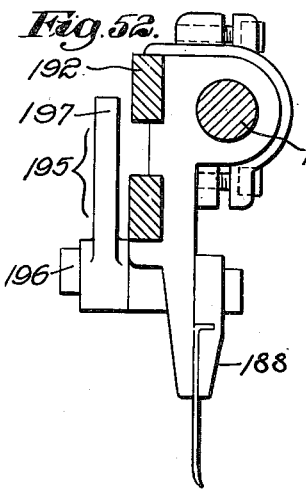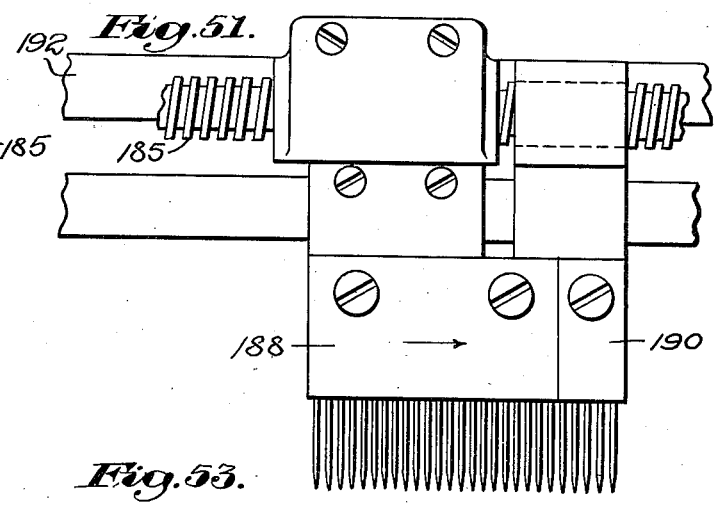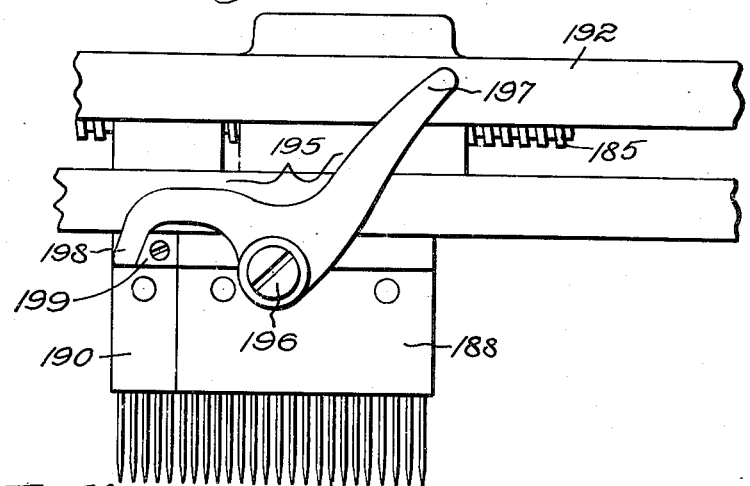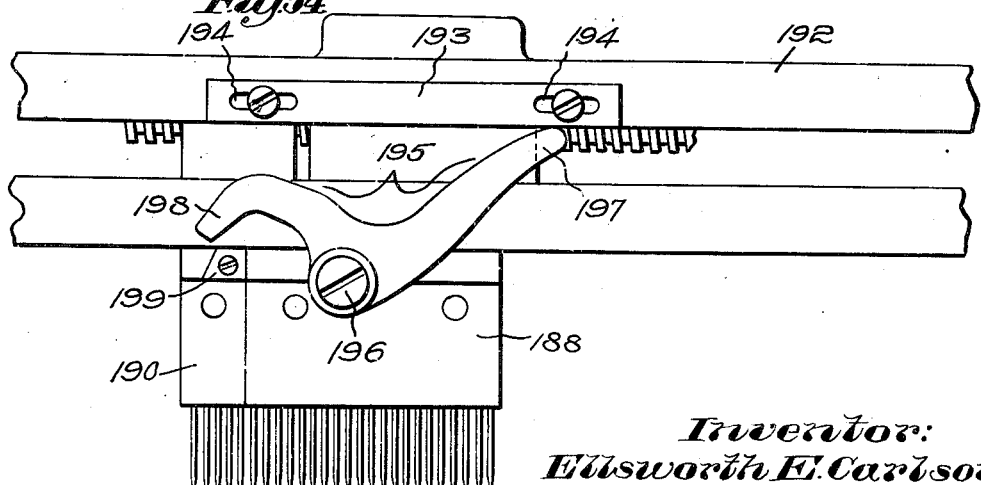

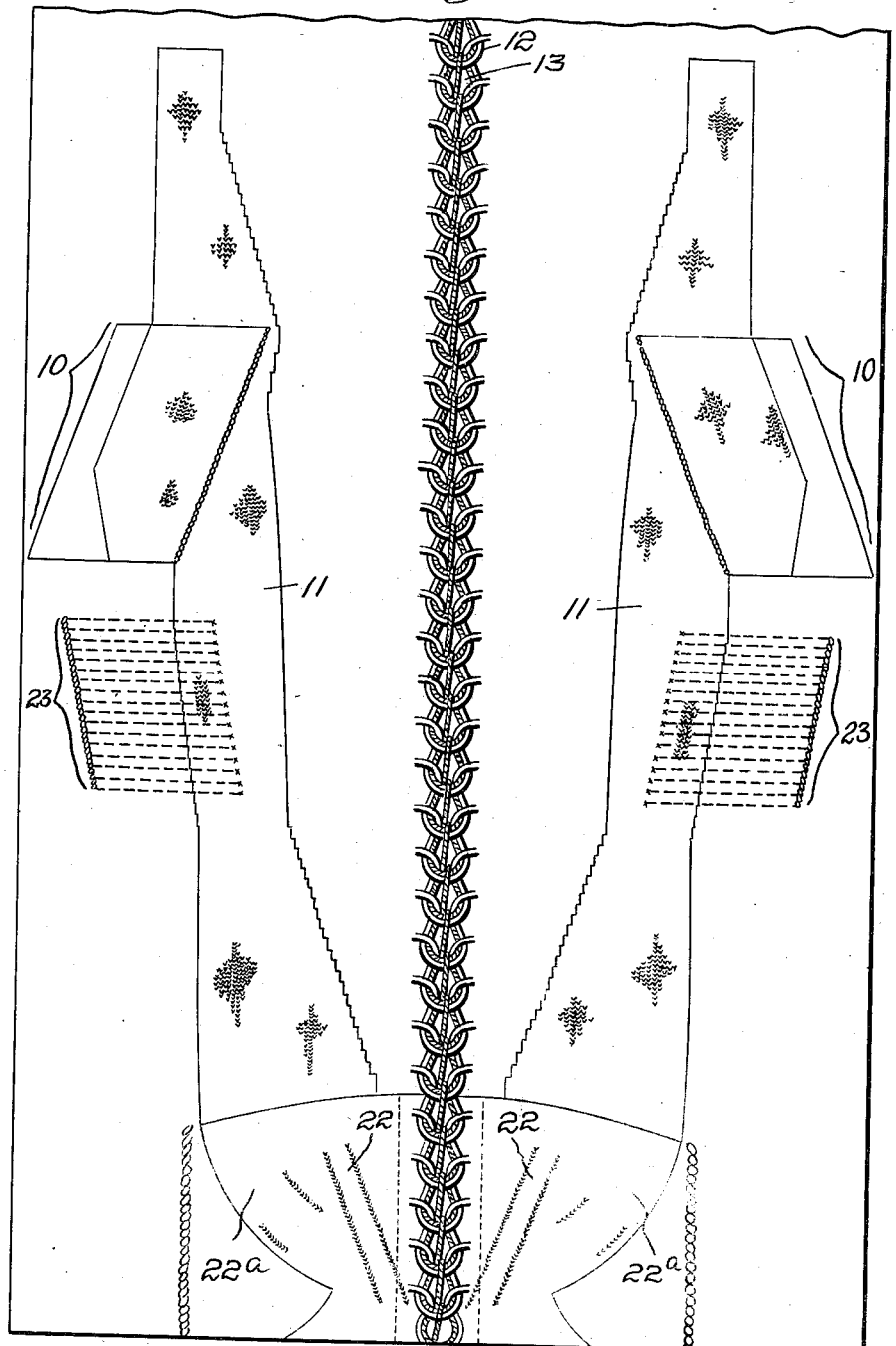

April 19, 1938.   E. E. CARLSON   2,114,955
METHOD AND MECHANISM FOR MAKING RUNPROOF OR RUN-RESISTANT
FULL-FASHIONED OR FLAT-KNIT STOCKINGS OR BLANKS
Filed March 4, 1937   32 Sheets-Sheet 25
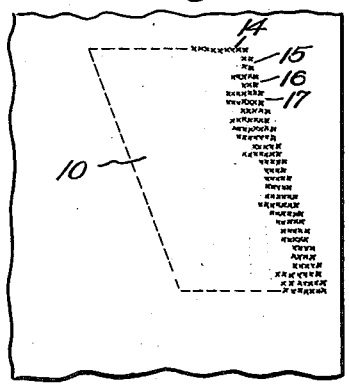
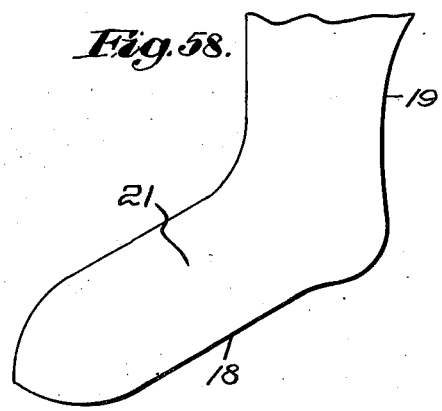
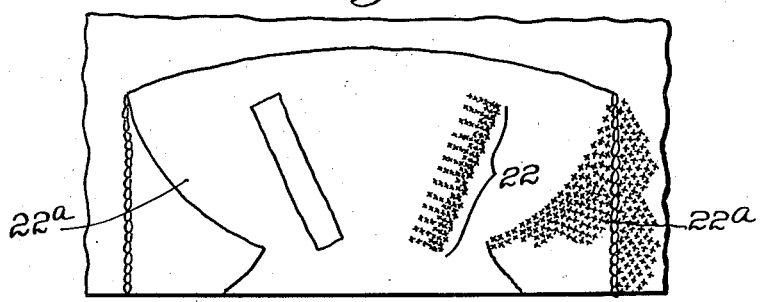
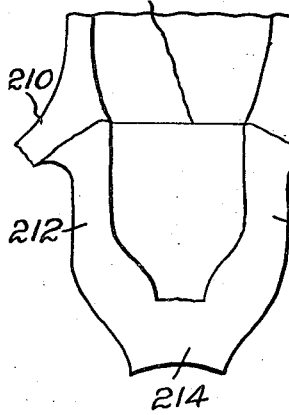
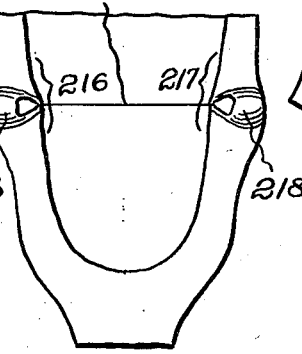
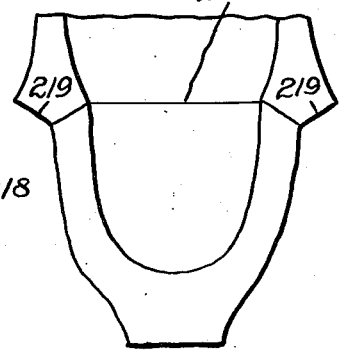
Inventor:
Ellsworth E. Carlson
Attys.

April 19, 1938.   E. E. CARLSON   2,114,955
METHOD AND MECHANISM FOR MAKING RUNPROOF OR RUN-RESISTANT
FULL-FASHIONED OR FLAT-KNIT STOCKINGS OR BLANKS
Filed March 4, 1937   32 Sheets-Sheet 26
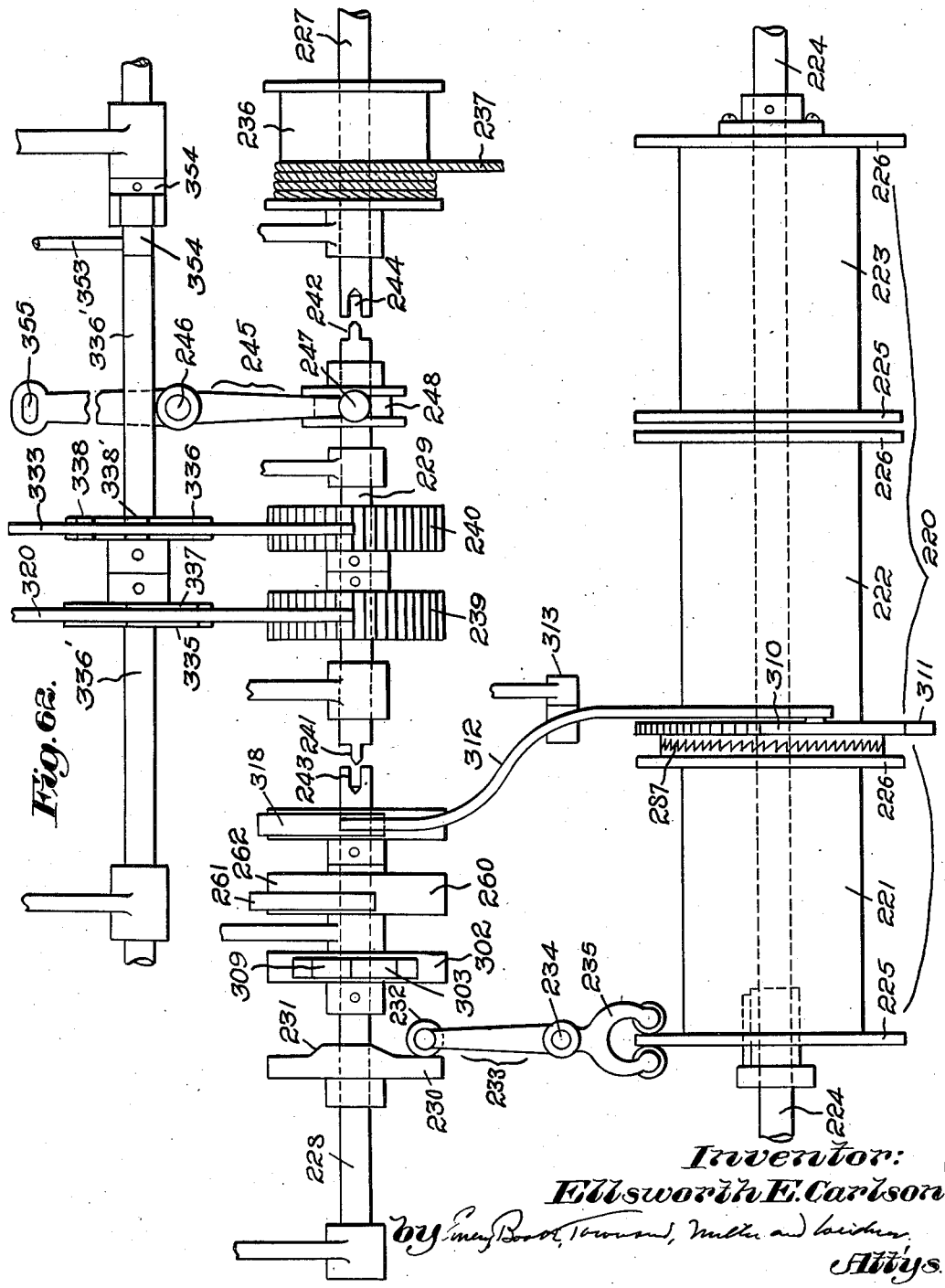

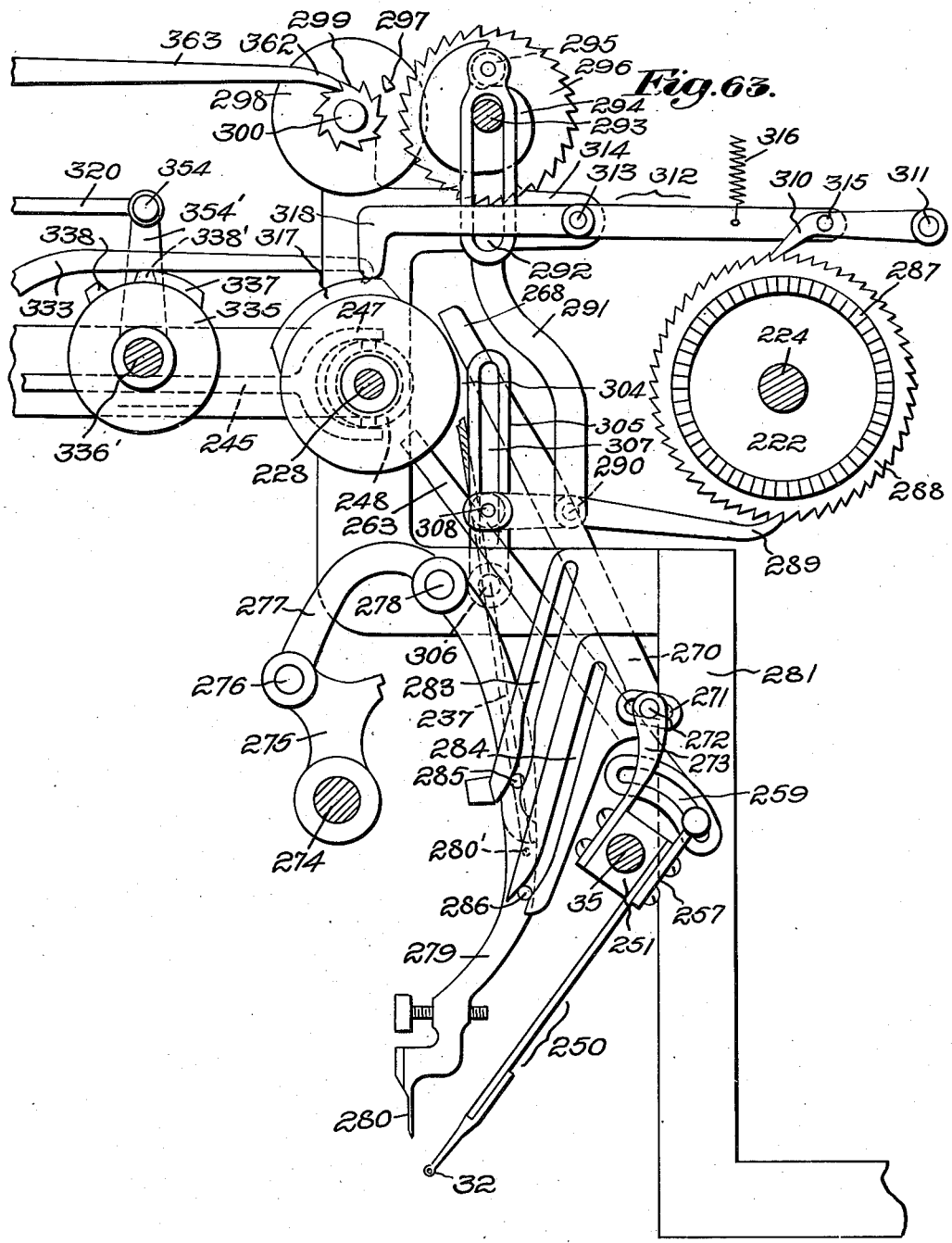

April 19, 1938.   E. E. CARLSON   2,114,955
METHOD AND MECHANISM FOR MAKING RUNPROOF OR RUN-RESISTANT
FULL-FASHIONED OR FLAT-KNIT STOCKINGS OR BLANKS
Filed March 4, 1937   32 Sheets-Sheet 23
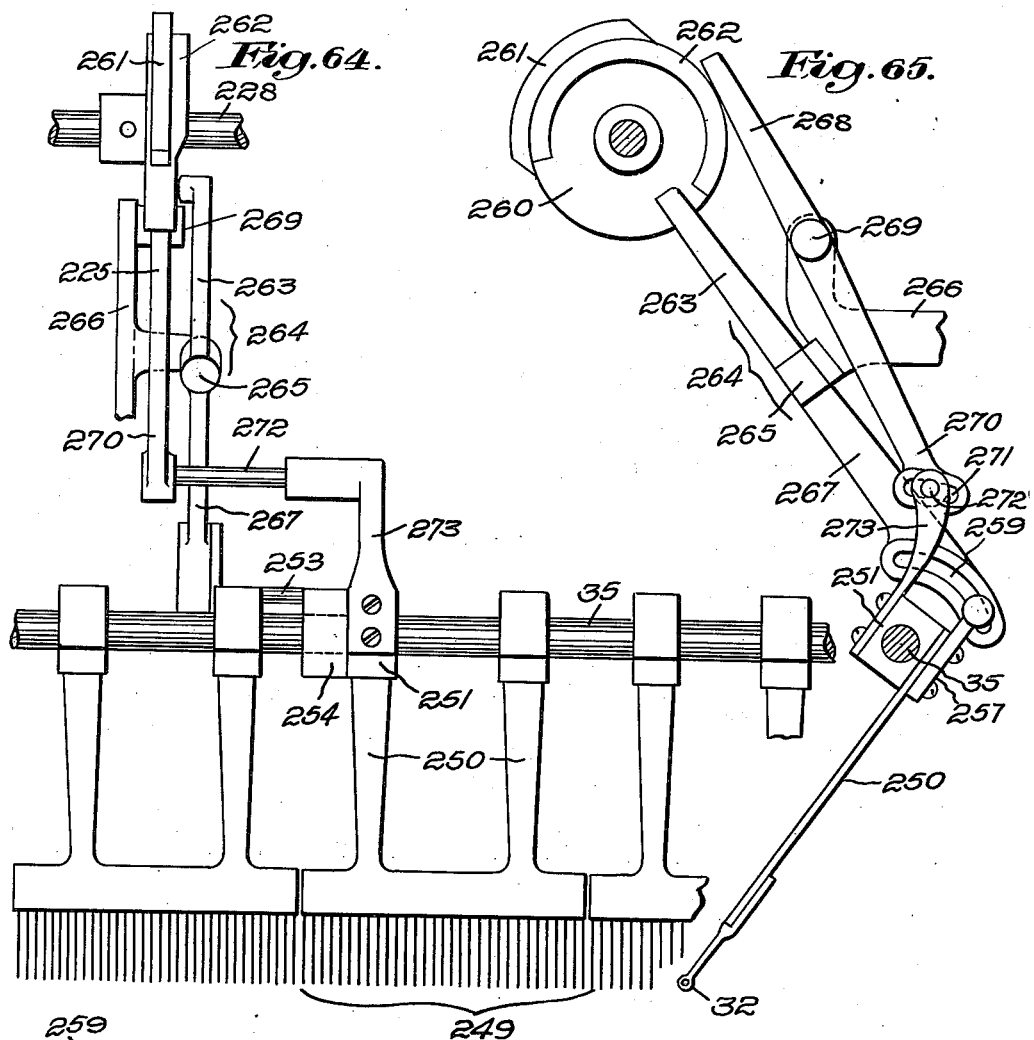
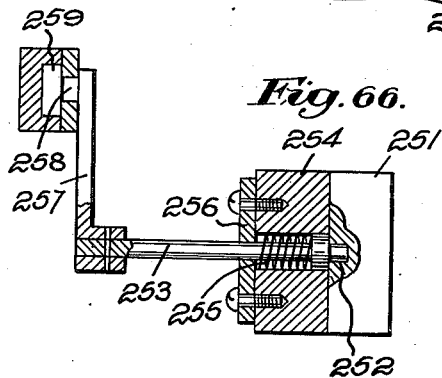
Inventor:
Ellsworth E. Carlson April 19, 1938.  E. E. CARLSON  2,114,955
METHOD AND MECHANISM FOR MAKING RUNPROOF OR RUN-RESISTANT
FULL-FASHIONED OR FLAT-KNIT STOCKINGS OR BLANKS
Filed March 4, 1937  32 Sheets-Sheet 29
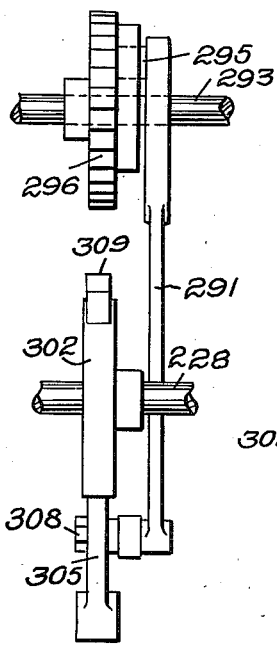
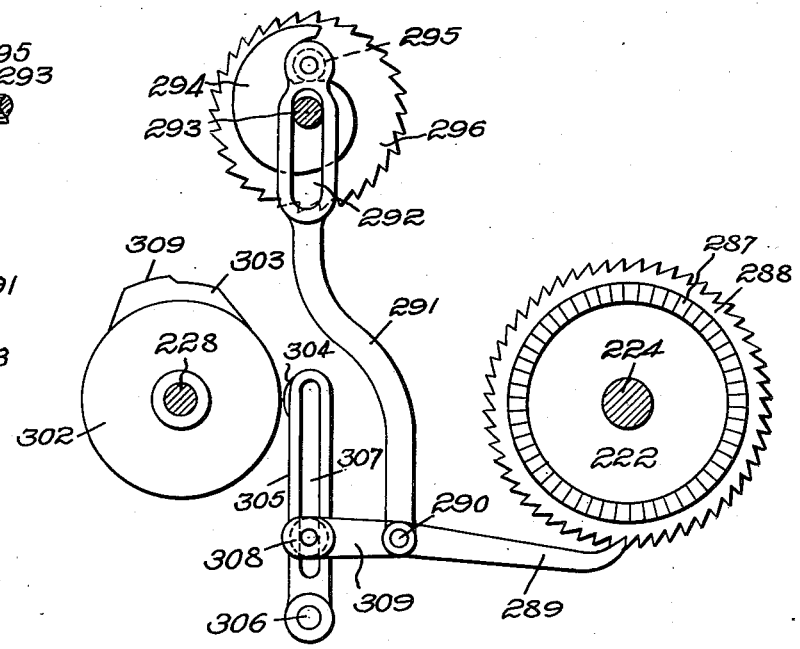
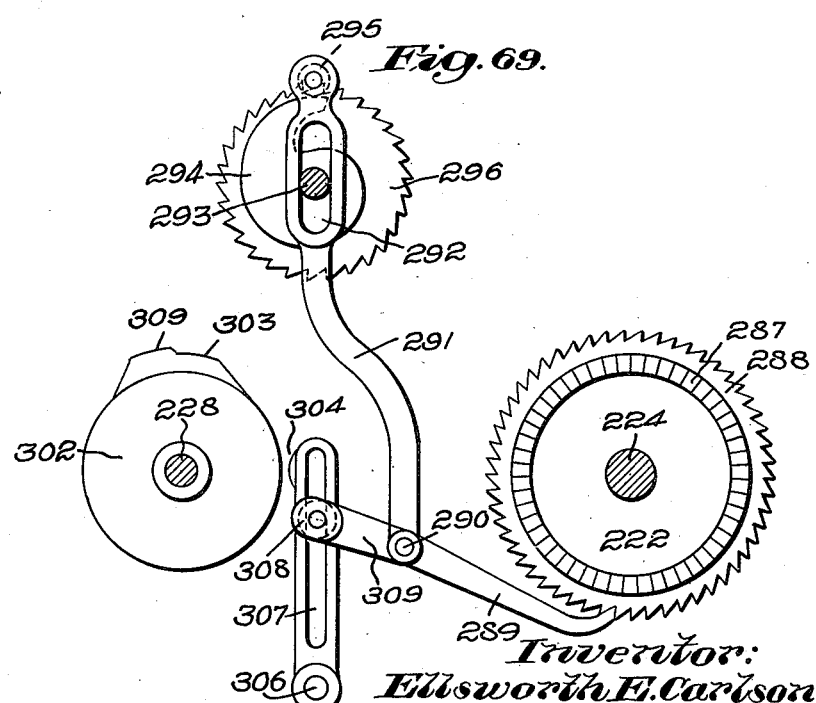
Inventor:
Ellsworth E. Carlson

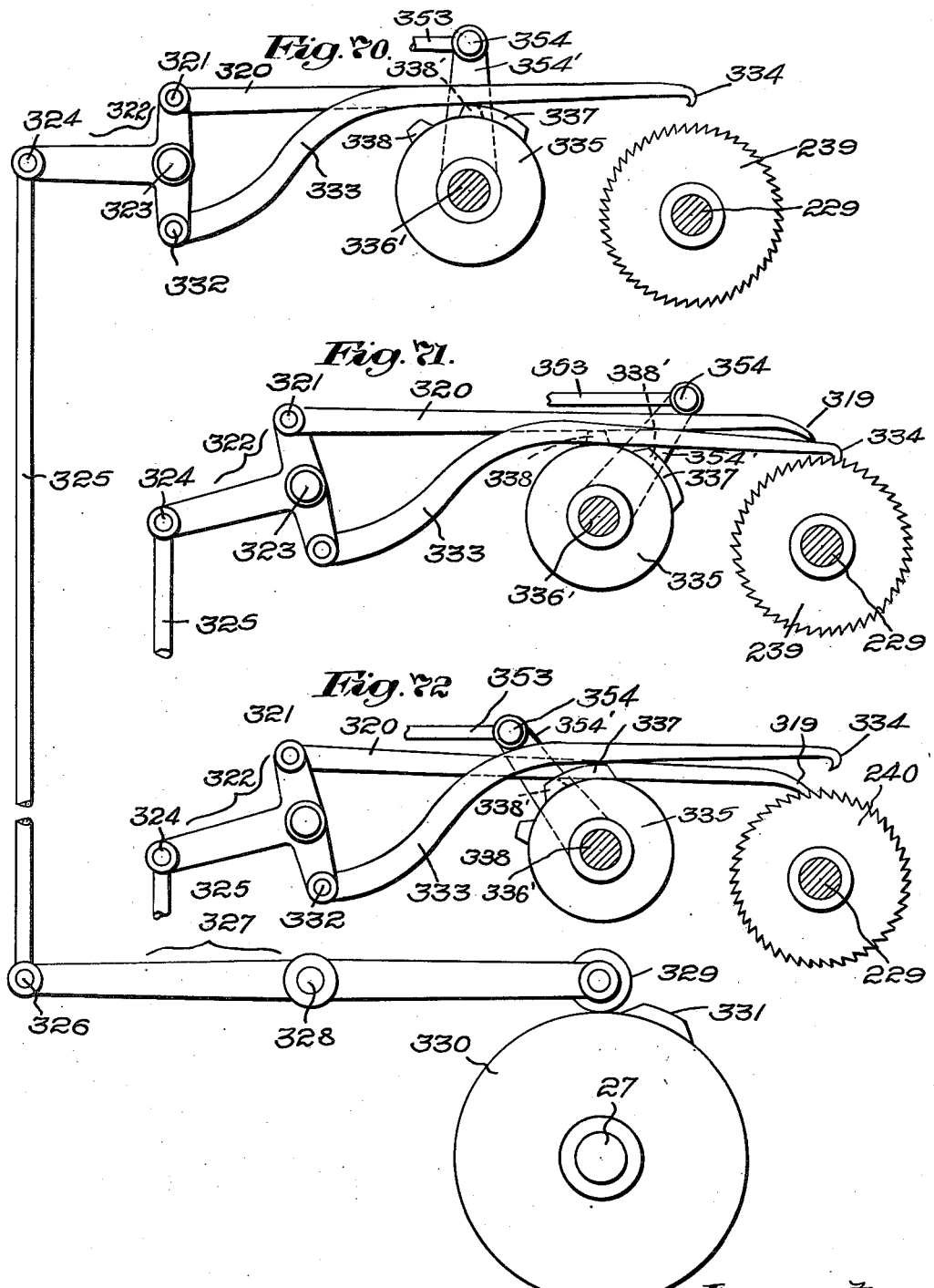

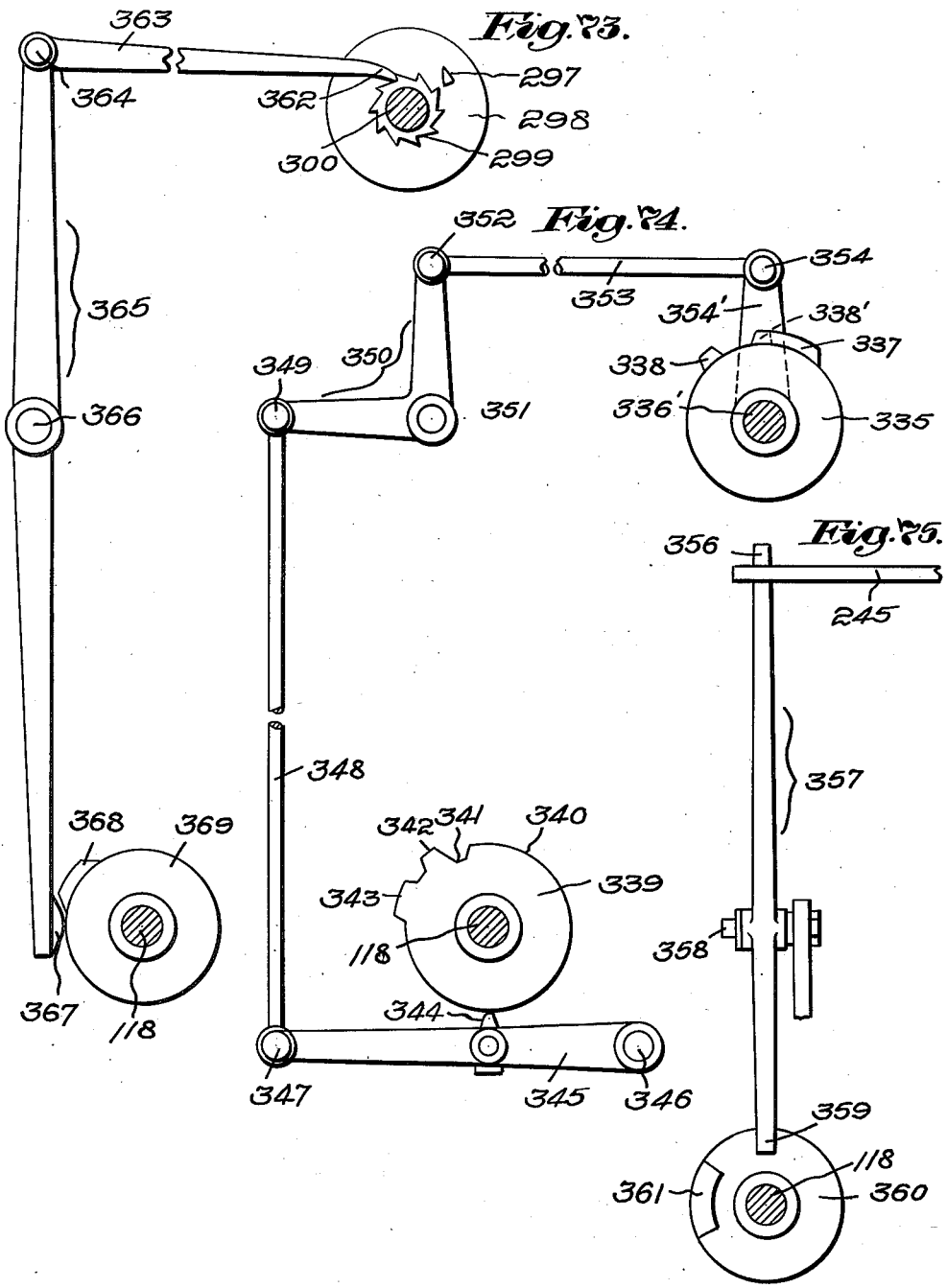

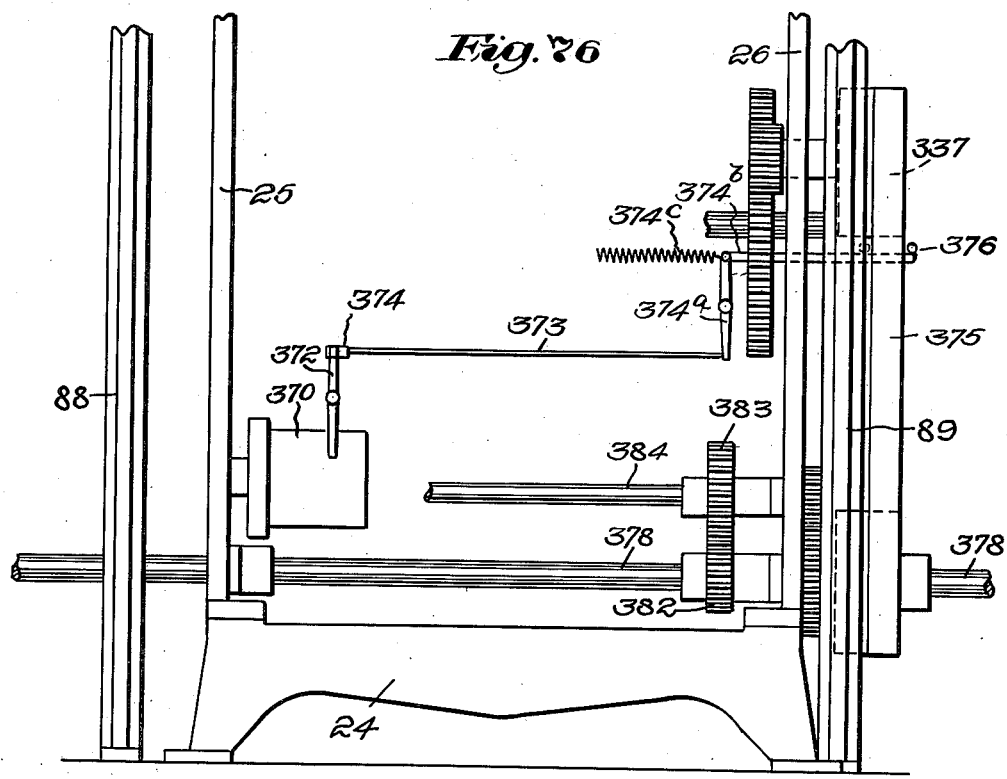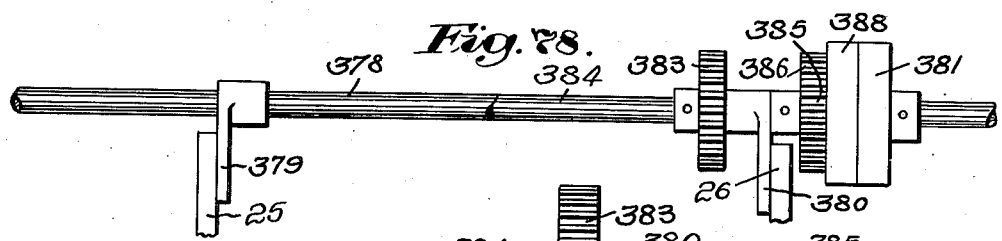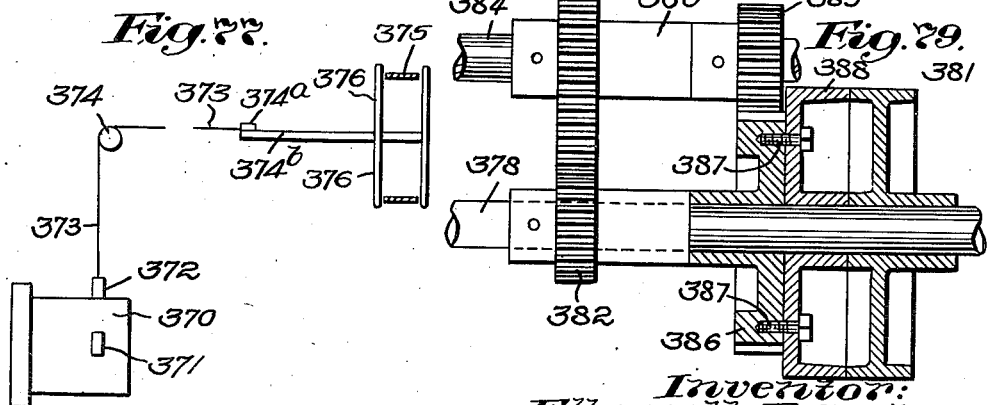

Patented Apr. 19, 1938

2,114,955

UNITED STATES PATENT OFFICE 2,114,955

METHOD AND MECHANISM FOR MAKING RUNPROOF OR RUN-RESISTANT FULL-FASHIONED OR FLAT-KNIT STOCKINGS OR BLANKS

Ellsworth E. Carlson, Saratoga Springs, N. Y., assignor to Van Raalte Company, New York, N. Y., a corporation of New York Application March 4, 1937, Serial No. 128,951

78 Claims. (Cl. 66—82)

This invention relates to methods and mechanisms for making run-proof or run-resistant full-fashioned or flat-knit stockings or blanks.

In order that the principle of the invention may be readily understood, I shall describe several types of mechanism for making the said stocking or blank, and shall disclose several types or embodiments of the said stocking or blank and the methods of making the same.

The stockings or blanks herein disclosed are made basically in accordance with patents already issued to me, among which I particularly refer to the following:

No. 1,978,408, Oct. 30, 1934; No. 1,978,409, Oct. 30, 1934; No. 1,978,412, Oct. 30, 1934; No. 2,011,267, Aug. 13, 1935; No. 2,014,126, Sept. 10, 1935; No. 2,037,000, Apr. 14, 1936; No. 2,039,283, May 5, 1936, and No. 2,049,994, Aug. 4, 1936.

In the drawings wherein several embodiments of mechanism are shown for making several types of non-run or strongly run-resistant full-fashioned or flat-knit hosiery,—

Fig. 3 is a front elevation of one type of the entire machine and disclosing the special framing that supports all the non-run mechanism;

Fig. 4 is a right hand end elevation of the mechanism shown in Fig. 3;

Fig. 4a is an elevation of a cam shown in Fig. 4;

Fig. 5 is a left hand end elevation of the mechanism shown in Fig. 3;

Figs. 5a and 5b are respectively a front elevation and a side elevation of certain details shown in Fig. 5;

Fig. 5c is an elevation of a cam shown in Fig. 5;

Fig. 6 is a front elevation upon an enlarged scale of the needle bar, the narrowing points and adjacent parts;

Figs. 7 and 8 are respectively a front elevation and a vertical section illustrating movements of the warp fingers;

Fig. 9 is a detail in perspective representing said movements;

Figs. 10 to 17 are vertical sections showing the movements of the needles, sinkers and warp thread fingers;

Figs. 18, 19 and 20 are vertical sections also indicating movements of the warp fingers, etc.;

Fig. 21 is a vertical section showing the knockover bit cam in its relation to the knitting mechanism;

Figs. 22 and 23 are vertical sections showing the press cam in operative relation to the knitting mechanism;

Fig. 26 is a vertical section showing the needle bar lift cam in operative relation to the mechanism controlled thereby;

Figs. 27 and 28 are respectively a vertical section and a front elevation showing the stitch cam in operative relation to the mechanism controlled thereby;

Figs. 29, 30 and 31 are views showing the warp beam and immediately associated parts;

Figs. 32, 33 and 34 are further views of the said warp beam and of the guides for the warp threads;

Fig. 35 is a rear elevation upon an enlarged scale of the connection for operation of the warp beam, etc.;

Fig. 36 is a front elevation thereof;

Figs. 37 and 38 are further views of the warp beam operating means, Fig. 37 being a plan view and Fig. 38 a side elevation of Fig. 35;

Figs. 39 and 40 are end elevations of the ratchet means for operating the auxiliary tension;

Fig. 41 is a detail of a part of such mechanism;

Figs. 42, 43 and 44 are further details of means for operating the auxiliary tension;

Figs. 45 and 46 are respectively a plan and a front elevation of the rod-carrying warp finger bracket;

Figs. 47 to 49 are views in vertical section and in elevation of cams and levers for operating certain ratchet mechanism and the weight changing device for the warp beam;

Fig. 50 is an enlarged detail of weights used in connection with the warp beam;

Figs. 51 and 52 are front and end elevations respectively of narrowing blocks;

Figs. 53 and 54 are rear elevations of the narrowing blocks in operating position;

Fig. 55 is a view upon an enlarged scale of the lower portion of the blank shown in Fig. 1 to indicate the presence of the warp threads throughout the entire extent of the said blank;

Fig. 56 is a diagrammatic plan view of a heel portion and a part of the fabric adjacent thereto when made by a widening action in alternate courses, this being done when I employ the TW type of mechanism;

Fig. 57 is a plan view of the toe portion of the fabric to indicate diagrammatically the narrowing action;

Fig. 58 is a view of the foot portion of the stocking to indicate the seaming along the middle of the bottom thereof, which is continued up the back of the leg;

Fig. 59 is a somewhat diagrammatic view to indicate the formation of the heel portions when using the mechanism of the TC type;

Figs. 60 and 61 represent diagrammatically the formation of the heel according to the TL type;

Figure 1:
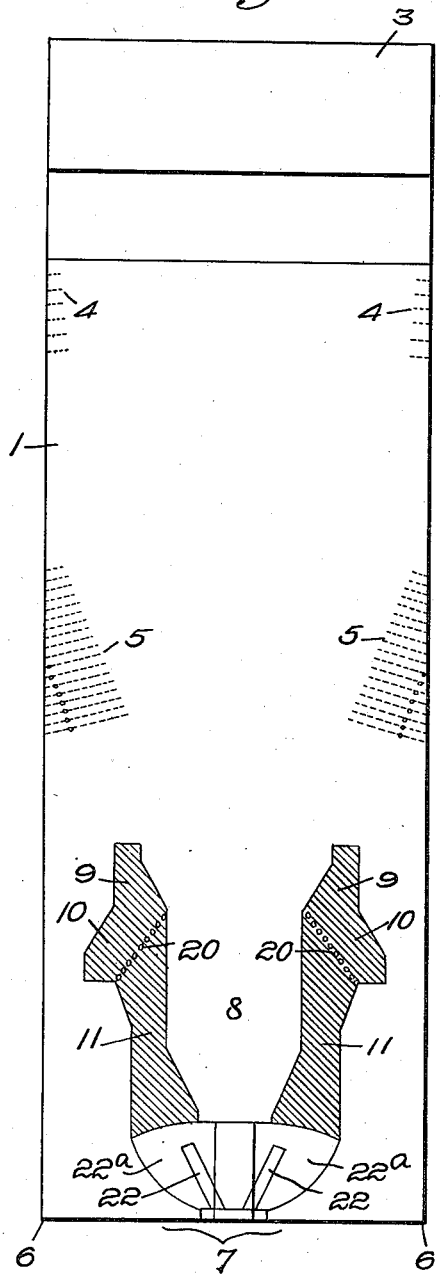
Fig. 1 is a plan view of a non-run or strongly run-resistant blank knitted of full width throughout and in accordance with my invention.

Figs. 62 to 79 all relate to a type of mechanism wherein the instep stitches are taken off the needles while the heel portions are being knit and then restored thereto. In said figures,—

Fig. 62 is a plan view showing the construction of warp beam employed with such type of mechanism, and showing also certain controlling means for said warp beam and for other parts;

Fig. 63 is a view, partly in end elevation and partly in vertical section, showing the automatic control of the transfer bar and means for controlling the center section of the warp beam;

Fig. 64 is a front elevation showing the control mechanism for the center section of the warp guide fingers;

Fig. 65 is an end elevation of the construction shown in Fig. 64;

Fig. 66 is a detail mainly in section of the structure shown in Fig. 65;

Fig. 67 is an end elevation of the means for controlling the center section of the warp beam;

Fig. 68 is a front elevation of the construction shown in Fig. 67;

Fig. 69 is a view similar to Fig. 67 but showing a different position of the parts;

Fig. 70 is a transverse section showing mechanism for operating the control shaft of Fig. 62 and representing the parts in neutral position;

Fig. 71 is a similar view showing the parts in reversing position;

Fig. 72 is a similar view showing the parts in the forward operating position;

Fig. 73 is a transverse section showing the operating means for the ratchet shown in Fig. 63 for controlling the center section of the warp beam;

Fig. 74 is a transverse section showing means for controlling the parts shown in Figs. 70, 71 and 72;

Fig. 75 is a side elevation of certain of the parts shown in Fig. 62;

Fig. 76 is a front elevation of the lower part of the framing and showing some of the parts supported thereby including means for changing the speed of the mechanism;

Fig. 77 is a detail mainly in plan showing a part of the connections for shifting the belt to change the speed;

Fig. 78 is a plan view showing the line drive shaft for a set or battery of knitting machines and carrying a part of the means for changing the speed of any machine; and Fig. 79 is a view, partly in elevation and partly in vertical section, of the change gearing whereby the speed of the machine may be altered.

In my patents hereinbefore referred to, I have disclosed a non-run or strongly run-resistant full-fashioned or flat-knit stocking or blank therefor, wherein a warp thread is preferably introduced, one for each needle wale. In certain of said patents, I have disclosed means for laterally transferring stitches for fashioning the fabric. In certain of said patents the stocking blank is disclosed as knitted of full width throughout. In those patents wherein means for knitting the stocking blank is disclosed, I have among other things disclosed the knitting of a blank or a continuous succession of blanks each knitted of full width down to the toe.

In this application, I have represented several embodiments of mechanism for knitting the entire stocking blank from the commencement of the welt through the toe, all upon a single-unit single-head machine, the warp threads which render the stocking of a non-run or strongly run-resistant character extending continuously throughout each stocking blank.

Without confining my invention to that general type of single-unit single-head machine, I have chosen to represent my invention, so far as the mechanism is concerned, as applied to a so-called Wildman machine, one type of which is shown in the patent to Howie and Krieble, No. 1,982,991, dated December 4, 1934. My invention, however, may be practised upon other types of mechanism.

The machine shown in the said Patent No. 1,982,991 is known upon the market as the Wildman single-unit single-head machine. I shall not attempt to describe the structure of the said machine inasmuch as the same is fully disclosed in said patent and in other patents of the Wildman Company. Said machine as now upon the market is of several types known respectively as the TW, the TC and the TL machines. The mechanism shown in Figs. 1 to 55 (excepting so far as the non-run features are concerned) is, or is mainly, that of the said TW machine, wherein the instep stitches are not taken off the needles during the knitting of the heel tabs or members. In the remaining figures of the drawings wherein knitting mechanism is shown, the structure of the Wildman machine is that of the TL type, namely, that in which the instep stitches are taken off the instep needles during the knitting of the heel tabs or members, and then returned to the same needles. However, in the said TL Wildman machine the operation of the transfer bar for taking the instep stitches off the needles and returning them thereto is wholly manual. I have disclosed herein and claimed means for rendering such action automatic.

To the several types of the Wildman single-unit single-head machine, I have applied mechanism for the introduction of warp threads preferably one to each needle wale, which warp threads are continued in action throughout the knitting of the entire blank, namely, from the commencement of the top welt through the termination of the toe.

The Wildman types of machine to which my invention is applied are preferably, and are herein described as, those in which the so-called three carrier system is employed, whereby the knitting of a ringless stocking is practised in accordance with the disclosure of the patent to Kaufman, No. 1,969,307, August 7, 1934, to which patent I refer for full disclosure of the manner of making a so-called ringless stocking. Where, therefore, in the specification I refer to a weft thread or a body thread or the like, it is to be understood that such terminology is intended to include the introduction of three or more threads in accordance with the said Kaufman method.

Figure 2:
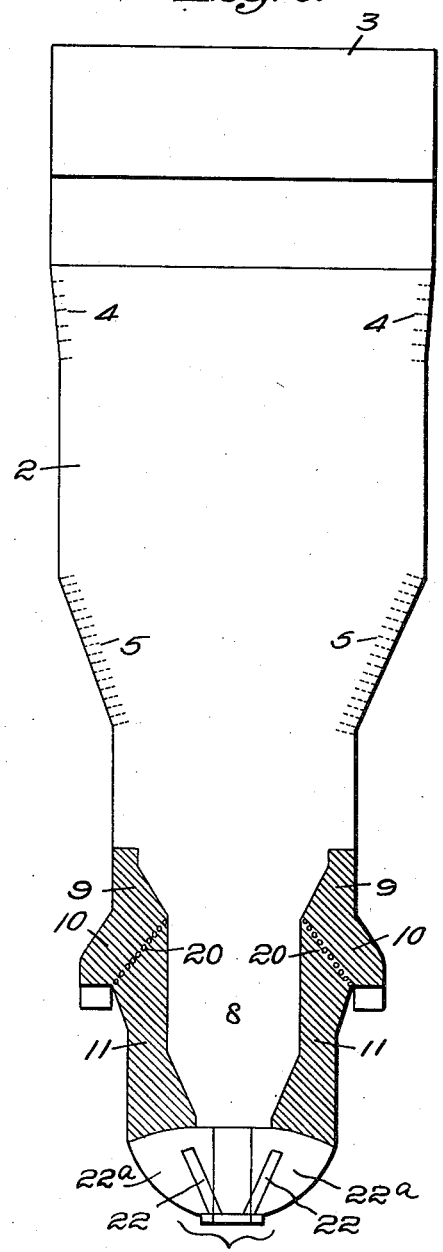
Fig. 2 is a similar view showing a blank after trimming.

Before attempting to describe any of the mechanism, I will refer to and explain the knitting of the stocking blank shown in Figs. 1, 2 and 55.

The stocking blank, shown in its unfinished condition in Fig. 1 and in its trimmed condition in Fig. 2 at 1 and 2 respectively, so far as the portion thereof down to the heel tabs is concerned, is desirably knitted in the manner disclosed in my Patent No. 1,978,408, Fig. 3, and more fully described in my Patent No. 1,978,409, wherein the stocking blank in its unfinished condition is represented in Fig. 37. In said Patent No. 1,978,409 is disclosed a Reading type of full fashioned knitting machine, whereas the blank shown in Figs. 1, 2 and 55 hereof, is represented as made upon the Wildman single-unit single-head machine. In both cases, however, I introduce a separate warp thread to each needle wale throughout the width of the fabric and confine each warp thread to its own needle wale throughout, so that each sinker wale is devoid of a warp thread. While my invention is not limited thereto, I have preferred in practice to introduce a separate warp thread to each needle wale and to confine each warp thread to its own needle wale throughout. While I prefer to knit the stocking blank of full width throughout, my invention is not so limited.

Desirably I employ natural silk threads in the manufacture of the stocking, but my invention is not limited to the use of any particular material. Preferably, however, I do employ natural silk and the body thread or threads may be of such character as to result in chiffon hosiery, but my invention is not so limited. I may employ in the manufacture of chiffon hosiery two threads or more, and the warp threads are also preferably of silk of like character, so that the resulting stocking blank is made of silk throughout, preferably in the gray and subsequently dyed, but my invention may also be employed in the manufacture of ingrain stockings.

In Figs. 1 and 2, the upper welt is shown at 3. Although the stocking blank is knitted of the full width throughout as shown in Fig. 1, stitches are laterally transferred inward both near the knee portion as indicated at 4, 4 in Figs. 1 and 2, and also at the calf portion as indicated at 5, 5 in said figures. In so fashioning the stocking blank, I preferably proceed in the manner fully disclosed in my said Patent No. 1,978,409 and particularly in Figs. 25 to 29 thereof. Each warp thread continues in action without being severed and without the fabric being removed from the machine, from the commencement of the welt 3 down to the extreme lower end of the blank indicated by the line 6—6. In other words, the warp threads are continued, without necessary thread severance, to the toe portion 7 of the stocking, this including not only the instep portion 8 but also the high splice portions 9, the heel tabs or portions 10 and the two portions 11, 11, which when seamed together constitute the under side of the foot, which in this case would result in the manufacture of the English type of foot, to which, however, my invention is not limited, as I may make the foot of the French type. The said blank is desirably reinforced as indicated in Figs. 1 and 2 in the high splice, the heel and the sole of the foot by the introduction of additional threads in a manner which need not be more fully described.

It is unnecessary to show the structure of each stitch of the fabric upon a sufficiently large scale to represent both the body or weft threads and the warp thread as entering into and constituting each several stitch, but it is to be understood that such is the structure herein, and hereby disclosed. I have, however, in Fig. 55, represented one characteristic needle wale as representative of each and every needle wale throughout the fabric. In said figure, the weft or body thread is indicated at 12 and the warp thread at 13. The warp thread 13 is introduced at and for the very commencement of the upper welt and continues down through the toe. It is to be understood that in the operation of the machine the warp threads are continuously introduced stocking blank after stocking blank, so that they are not removed from the warp thread guides or fingers, but are by said guides or fingers constantly introduced into the fabric or fabrics as the same is or are knitted. I have also in said Fig. 55 indicated diagrammatically the character of the fabric not only in the said single representative needle wale but at other portions thereof.

Referring further to Figs. 1, 2 and 55, and also to Figs. 56, 57, 58, and making reference in this connection to the so-called TW type single-unit single-head machine, it is pointed out that whereas in all of my patents hereinbefore referred to stitches are laterally transferred inward to effect narrowings (although certain claims of said patents are not so limited), I, in this application, disclose the transferring of stitches outward to widen the fabric. The stitches so transferred outwardly are stitches in the heel tabs 10, 10 of Figs. 1, 2 and 55. In Fig. 56 I have shown diagrammatically one of said heel tabs or portions 10. In order that the said heel tabs or portions may be formed or produced upon a more satisfactory outward inclination to the instep portion, etc. (that is, more nearly assuming a right-angled relation thereto), I desirably laterally transfer outward entire courses of stitches throughout an extensive portion of each of said heel tabs. The stitches so laterally transferred outward are desirably each composed of the warp thread loop and the weft thread loop together composing such stitch, although within the scope of my invention I may transfer outwardly only one of the threads of each of said loops, as, for example, the body or weft thread. Desirably, however, I laterally transfer outward both the warp and the weft thread constituents of each loop where transfer occurs.

Referring more particularly to Fig. 56, the first course in the heel tab or portion is represented diagrammatically at 14. This course consists entirely of non-laterally transferred stitches. The next course 15 knitted in the same direction preferably consists throughout the heel tab or portion of stitches laterally transferred outwardly. The next course 16 knitted in the same direction preferably consists of stitches not laterally transferred, and the next course 17 knitted in the same direction consists of stitches all of which are laterally transferred outwardly. This alternation of non-laterally transferred stitches forming one course and laterally outwardly transferred throughout the next course knitted in the same direction is preferably continued throughout the formation of each heel tab or portion.

Thus, I have disclosed a structure wherein at least one of the threads constituting a stitch (i. e. the warp thread and the body or weft thread) is laterally transferred outward. Such lateral transfer outward occurs throughout an extensive portion of the fabric and is preferably a lateral transfer of both the warp threads and the body or weft thread. Such transfer in the heel tabs or portions occurs in separated courses and desirably in alternate courses knitted in the same direction. Thus, the stocking blank is provided with heel portions whereof alternate courses knitted in the same direction only have laterally transferred outward stitches that are composed both of warp threads and of the body thread or threads. All of the stitches of one or more of the courses in the heel portions are thus laterally transferred outward for the purpose of widening the heel tabs or courses and giving them more nearly a right-angled relation to the instep.

It will thus be understood that I have provided a blank or stocking wherein is provided a series of warp threads one for substantially each needle wale of the fabric and collectively knitted into substantially all the stitches of the needle wales, so that substantially each stitch of the main thread of the fabric has a stitch of a warp thread to render the said fabric of a non-run or strongly run-resistant character, said stocking blank having stitches laterally transferred outwardly.

It will further be understood that as the stocking blank is knitted upon a machine capable of knitting the entire foot and the toe upon the same machine which formed the leg, I have provided a full fashioned or flat-knit run-proof or strongly run-resistant stocking blank comprising an integrally knitted leg portion, as shown in Figs. 1 and 2, an instep portion 8, heel portions 10, foot-sole portions 11 and a toe portion 7, said blank comprising a main or body thread or threads knitted into all the wales of the said blank from edge to edge thereof and into all the courses of the said blank and a series of warp threads extending integrally without any severance thereof being required by the steps of stocking manufacture lengthwise the fabric through the said leg portion, instep, heel, foot-sole and toe. Thus, the said stocking or blank, when knitted upon the TW type of Wildman full-fashioned machine, has as a continuation formed initially and integrally therewith and without necessary thread severance, an instep portion with initially integral lateral extensions 11, 11, which together, when seamed as indicated at 18 in Fig. 58, constitute the bottom of the foot, and has a toe 7 constituting an initially integral extension (without necessary thread severance) of said instep portion and said lateral extensions, the warp threads extending without necessary thread severance throughout the entire longitudinal extent of said heel portions 10, the instep portion 8, the foot-bottom portions 11, 11, and the toe 7.

The seam in this type of stocking extends along the middle of the bottom of the foot, as indicated at 18 (Fig. 58) and up the back of the leg as indicated at 19 in said figure.

It will be evident from the foregoing that my invention includes a process or method of knitting a full-fashioned or flat-knit run-proof or strongly run-resistant stocking or blank therefor which consists in knitting a main or body thread or threads into all the wales from edge to edge of the fabric and into all the courses of the said stocking or blank, and in knitting a series of warp threads extending lengthwise of the fabric into respective loops in successive courses in different loops of the said main or body thread or threads in such courses; then at the heel portions laterally outwardly transferring stitches in succeeding courses while at the same time continuing the knitting operation from edge to edge of the fabric, so as to provide the instep portion and the sole portions, all initially integrally formed with said heel portions without necessary thread severance. In such process and during the knitting operation, I provide at the inner edge of each heel portion, as indicated at 20, 20 in Figs. 1 and 2, an outwardly downwardly extending inclined line of openings, which openings are respectively traversed by certain of said continuous warp threads. The knitting of the said instep portion 8 continues course for course during the knitting of the heel portions 10, 10 (i. e. without taking the instep stitches or fabric off the needles) that is, when producing the fabric upon the TW type of machine.

Such stocking blank 1 of Fig. 1 has as a continuation formed initially and integrally therewith and without necessary thread severance, an instep portion 8 with initially integral lateral extensions 11, 11, that together, when seamed, constitute the bottom of the foot, as indicated at 21 in Fig. 58, said blank also having a toe 7 constituting an initially integral extension of the said instep portion 8 and said lateral extensions 11, the said warp threads extending without necessary thread severance throughout the entire longitudinal extent of said heel portions 10, 10, instep portion 8, foot-bottom portions 11, 11, and toe 7. The toe is fashioned by lateral transfer of stitches, as indicated diagrammatically at 22 in Fig. 57. These stitches are laterally transferred inwards by one-needle narrowings.

Thus, my invention includes in the disclosure thereof thus far referred to, a method of knitting a full-fashioned or flat-knit stocking blank of full width throughout, consisting in knitting a main or body thread or threads into all the wales from edge to edge of the fabric blank and into all portions of the said blank, and in knitting a series of warp threads one for substantially each needle wale of the fabric and collectively knitted into substantially all the stitches of the said needle wales, so that substantially each stitch of the main thread or threads of the fabric has a stitch of warp thread to render the said fabric blank of a non-run or strongly run-resistant character and during said knitting forming heel portions upon the blank and in the knitting of said heel portions laterally transferring stitches of warp and weft threads outward in alternate courses.

Referring again to Fig. 55, it will be observed that the heel tabs or heel portions 10 are there diagrammatically indicated as containing outward widenings. The two foot-sole portions 11 are diagrammatically indicated at 23, 23 as having inward narrowings. The toe portion 7 is there shown as having toe narrowings 22, 22ᵃ, which are preferably one needle narrowings. Throughout the knitting of the entire fabric shown in Figs. 1, 2 and 55, each warp thread continues without interruption in its own needle wale, as explained in my said patents.

It is to be understood that in knitting the fabric herein disclosed, there is throughout the same a stitch measuring of the weft thread and an accurate apportionment of the warp threads in all the stitches, as fully disclosed in my said Patent No. 2,049,994. The same principle of stitch measurement of the weft thread and accurate apportionment of the warp threads is employed by the mechanism of this application as disclosed in my said patent.

While the full-fashioned or flat-knit stocking or stocking blank of my invention (which is claimed in my copending application Ser. No.

152,338 filed as a division of this application) is herein described as knitted upon a single-unit, single-head machine, it is to be understood that I may knit the stocking or stocking blank herein described (which is claimed in said divisional application) upon any machine or machines capable of performing the necessary operations to produce the same, whether the machine be a single-unit single-head machine, or a single-unit multiple-head machine, or a single-head machine, or a multiple-head machine. While I have specifically described the knitting of the heel in accordance with the so-called TW, the TC and/or the TL types of the Wildman machine, my invention is not so limited excepting as certain of the claims herein or in said divisional application definitely so specify.

I will next describe the knitting elements and the means for operating them, and in such connection will refer mainly to Figs. 3 and 7 to 28. The framing of the machine is best shown in Fig. 3, where is represented a base 24 and side uprights 25, 26, and other parts of the framing not necessary to refer to in detail. Suitably supported in the framing is the main cam shaft 27, as disclosed in said patent to Howie and Krieble, having fast thereon a series of cams next to be referred to, and which (except as modified as next to be stated) operate as described in the said Howie and Krieble patent.

The machine is provided with spring beard needles of the usual type and as disclosed in said patent to Howie and Krieble, the same being represented at 28 in Fig. 8. Knocking-over bits 29 are provided and also sinkers and dividers both generally indicated by the reference character 30 in Fig. 8 and elsewhere. The body or weft threads are introduced each through its own carrier, as indicated at 31, and in the event that the three carrier system is employed, as is preferably the case, as hereinbefore stated, each such thread is introduced for a single course only in each of a series of courses repeated throughout the knitting of the stocking blank in the manner fully described in the said patent to Kaufman, No. 1,969,307. The warp guide fingers are indicated at 32 in Figs. 8, 9 and elsewhere. They are mounted upon a bar or support 33, itself secured in this type of mechanism by members 34 to a bar 35. In Figs. 10 to 17, I have indicated the successive positions of the knitting elements. In Fig. 10, the needles 28 are represented as elevated. In Fig. 11 the needles are represented as depressed and the stitches as knocked off. In Fig. 12, the needles are represented as starting to rise, and in Fig. 13 are represented as fully elevated. In Figs. 13 to 16, the warp guide fingers are represented as laying their warp threads about the needles in the manner described in my said patents. Fig. 15 shows the guides as having completed the lapping of the warp threads about the needles. In the position of the parts shown in Fig. 16, the weft thread has been laid and measured. In the position shown in Fig. 17, the stitches have been drawn down and the pressing action of the needles against the presser bar 36 has commenced.

In order to operate the said parts in the proper sequence and in order to provide for the proper positioning of the warp threads in its stitches and the proper clearing of the stitches from the needles, the cams upon the cam shaft 27 (Fig. 3) have been modified or altered from the construction shown in said patent to Howie and Krieble in respects that will now be noted.

I shall first refer to the needle bar lift cam which is indicated at A in Fig. 26. The contour of this cam as indicated at A' is provided so as to gain more time for lapping the warp threads around the needles, the period or length of time of the knitting cycle remaining the same. The said cam is fast upon the cam shaft 27. Upon the periphery of said cam, there is the roll 37 upon a lever arm 38 pivoted upon a rocker shaft 39 upon which is mounted the arm 40 connected substantially as shown in said Howie and Krieble patent to the needle bar 41.

The press cam is represented at B in Fig. 22. Upon the knitting side the contour B' is provided to gain more time for lapping the warp threads, the period or length of time of the knitting cycle remaining the same. In Fig. 23 the narrowing side of the said cam is shown at B2. The contour there shown permits the needles to be closer to the narrowing points than in the said Howie and Krieble patent, thus eliminating or preventing any distortion of the stitches although containing warp threads. Upon the periphery of the said cam B bears the roll 42 pivoted upon a rocker arm 43 on said shaft 33.

Figure 25:
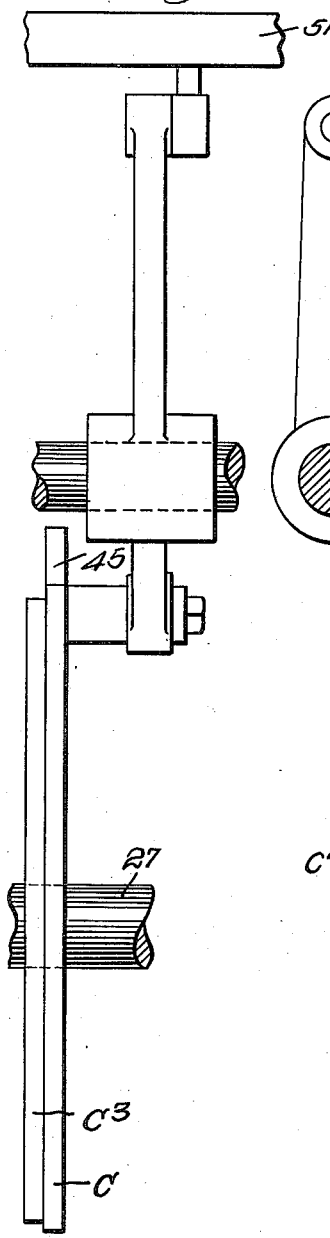
Figs. 24 and 25 are respectively a vertical section and an elevation showing the back catch bar cam in operative relation to the mechanism controlled thereby.
Figure 24:
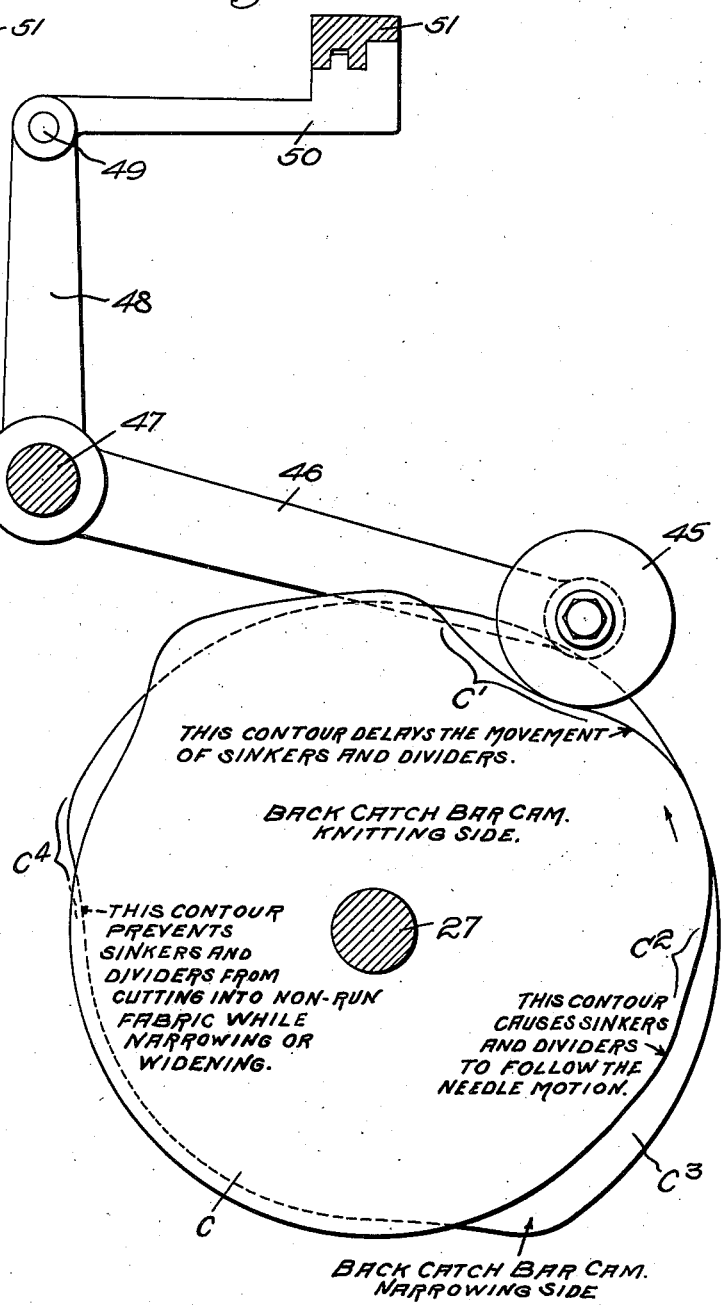

In Figs. 24 and 25 is represented the back catch bar cam at C. The contour of the said cam upon the knitting side is such as indicated at C', C2 to delay the movement of the sinkers and dividers without changing the length of time of the knitting cycle, so as to prevent any impairment thereby of the warp threads. Upon the narrowing side the said cam has the contour indicated at C3 and also at C4 to prevent the sinkers and dividers from cutting into the non-run fabric during the narrowing and widening operations. Bearing peripherally upon the said cam is a roll 45 mounted upon a lever arm 46 pivoted at 47 and fast with another arm 48 pivoted at 49 to the arm 50 which is connected to the catch bar 51.

In Fig. 21 I have represented at D the knockover bit cam. This cam is shaped on the knitting side as there indicated. The effect of the contour is to procure a better knocking over of the non-run stitches. Upon the periphery of said cam bears a roll 52 upon a lever arm 53 pivoted at 54 and fast with an arm 55 carrying the knocking-over bits 29.

In Figs. 27 and 28, I have represented at E the rocker cam. This is provided with four lateral cam portions or members E'. The said cams act in turn upon a lateral projection 56 upon a lever arm 57 mounted on the shaft 58.

Upon the knitting side of the needle bar lift cam, there is provided, as shown in Fig. 26, a box cam F, the purpose of which is similar to the box cam provided by me in a different location in Patent No. 1,978,409.

In Fig. 27, I have shown the stitch cam at G. The contour of this cam, as indicated at G', is such as to gain more time to lap the warp threads around the needles. Against the periphery of the said cam bears a roll 59 mounted upon a lever arm 60 pivoted on the shaft 61. On the shaft 61 is fast an arm 62 that is connected by a pin and slot connection 63 to the arm 57. The object of the rocker arm E' is to give excessive movement to the needle bar while splicing occurs, a longer stitch being there required. The ordinary movement is through the roller 59 while knitting the main yarn.

I will next refer to the means for operating the warp rod or bar 35. In the TW type of machine now being described, the warp fingers move in unison at all times. In Fig. 3, the members 34 secured by set screws to the bar 35 are shown as being joined at their lower ends by the bar 33 from which all the warp fingers extend.

In order to impart an axial movement to the bar 35 and also a swinging movement, so as to lap the warp threads about the respective needles, the following mechanism is preferably provided. Upon the main cam shaft 27 already referred to, there is provided (as shown in Fig. 5) a spiral gear 63 meshing, two to one, with a similar gear 64 fast upon a transversely extending shaft 65 that is mounted in bearings 66, 67 in upright brackets 68, 69 upon the main framing of the machine. Fast upon the said shaft 65, which is shown also in Fig. 5a, is a cam 70 shown in side elevation in Fig. 5c. It is of circular contour excepting for the fact that two blocks or members 71, 72 are secured thereto by suitable bolts or otherwise, each said block having a projection 71a, 72a respectively, which take against a roll 73 on the upright rod or bar 74, shown also in Fig. 5b. Said rod or bar is supported in a bracket 75 on the frame, and is pivoted upon a pin 76, shown most clearly in Figs. 5a and 5b. The construction is such that twice in each revolution of the cam 70, the warp bar is moved axially, inasmuch as the face of the pivoted upright bar 74 bears against the end of the said warp bar 35, as shown most clearly in Figs. 45 and 46. A spring 75a is employed to hold the face of bar 74 against the end of the warp bar 35. The said warp bar 35 is also given a rocking movement by the following means. Fast upon the shaft 27, as shown in Figs. 4 and 4a, is a disk 77 having secured to one face thereof a block or member 77' having a cam portion 78, which once in each rotation of the disk 77, in the direction of the arrow shown on Figs. 4 and 4a, engages a roll 79 upon a lever 80 pivoted at 81 upon a bracket 82 secured to the main framing. Said lever 80 has connected to its lower end a spring 83 secured at 84 to the framing so as to keep the roll 79 in contact with the periphery of the disk 77. The lever 80 at its upper end is forked, as indicated at 85, to receive a pin 86 upon the lower end of a bar 87 itself secured by set screw to the warp bar 35. The construction is such that the said warp bar is swung at the proper time to move between the needles.

I shall next refer to the warp beam or support and then to the novel tension means which I have provided to control the feeding of the warps.

In order to prevent the vibration of the mechanism that is supported by the framings 24, 25, 26, etc., from being conveyed to the warp beam, etc., I have provided a supplemental frame by which the warp beam and other parts are supported in proper relation to the knitting elements. For that purpose, as shown most clearly in Figs. 3, 4, 5, I have represented two uprights 88, 89, which, as shown in Fig. 3, are connected by a cross member 90.

I will next describe the means for supporting the warp threads and the special tension means which are provided constituting an improvement upon the tension means disclosed in my Patent No. 1,978,409, and in doing so I will particularly refer to Figs. 3, 4, 5 and 29 to 34.

Preferably I provide a humidifier box which is shown in Fig. 3 and elsewhere in dotted lines at 91. It preferably is composed largely of glass, so that the mechanism inside the same may be readily inspected. It is provided with a suitable door or doors, so as to afford ready access. The humidifier box is suitably supported upon the upper ends of the supplemental frame members 88, 89. As shown most clearly in Figs. 29, 30 and 31, each frame member 88, 89 is provided with a transversely recessed collar-like portion 92, shown most clearly in Figs. 30 and 31, providing upon the inner face a support for a strip or member 93 and upon the outer face a support for a strip or member 94. The member 93 has a bearing 95 receiving the end of the shaft 96 of the warp beam shown with its warp threads most clearly at 97 in Figs. 29 and 32.

Such warp beam is similarly supported at both ends. In the TW form of mechanism shown in the figures thus far described, all the warp threads are upon one beam as contrasted with the form later herein to be referred to, wherein the instep warp threads are upon a separate beam.

Each strip or member 94 (there being one provided at each end of the warp beam, as indicated in Figs. 3 and 32) has secured thereto at 98 an angular frame 99 from which is swingingly suspended at 100 the arm 101 connected by springs 102 to the lower outer end 103 of the said framing 99.

Upon the lower end of the two arms 101 is secured a whip rod or bar 104 from which extends at a suitable angle a plate or board 105 having a large number of openings 106 formed therein, one for each of the warp threads.

I have provided four tension means for the warps which act at various times. The first of said tension means in the disclosed embodiment of the invention, acts in the welt, the second at all times, the third in the narrowing, and the fourth upon the instep warps during the widening in forming heel tabs or members. As already stated, the warp threads are all upon a single beam within the humidifier box, and in said box are provided, in addition to tension means acting on all the warp threads, two tension means for a part only of the warps, namely, (a) the part representing the instep warps, and (b) about an inch more of the warp threads on both sides of said instep warps and representing part of the widening heels. There are provided, as hereinafter more fully stated in detail, three rods lying upon the warp threads, said rods being of respectively different lengths and acting at different times, one of them acting at all times during the knitting operation.

In knitting the welt, a heavier yarn is employed than in knitting the remainder of the stocking, and therefore there is not needed so much tension weight as in knitting the body of the stocking, that being made of thinner yarn. The less the beam weight that can be employed in knitting, the greater the lengthwise elasticity of the stocking. Thus, I also secure a welt more lengthwise elastic than heretofore.

The tension means for the beam is indicated as a rope 107, in Figs. 29 and 32, extending about a drum 108 and will be hereinafter more fully referred to.

As shown most clearly in Fig. 32, there is provided a rod 109 which rests upon all the warp threads. This is indicated also in section in Figs. 33 and 34. It is supported at its ends by strips 110, 111 which themselves extend outwardly from the support for the warp beam, as shown in Fig. 32. This is what I refer to as the general tension and is in the nature of a whip roll which extends across and bears upon all the warp threads to relieve them of the strain due to the jarring of the machine. There is also provided a rod 112, which is of substantially less length than the rod or whip roll 109, and is for the purpose of preventing lengthwise extending tension streaks. It is independent of the auxiliary tension next to be described, but is preferably slidably mounted thereon. During the leg narrowing, the motions of the machine have a tendency to distort the stitch structure, but by using the said rod 112 the threads controlled thereby are kept taut, and the occurrence of streaks is kept down to a minimum. The said rod or bar 112 is, as shown, slidable up and down at each end of a bent wire or structure 113, each of which is secured to an arm 114, as shown in Figs. 33 and 34. The two arms 114 are shown also in Fig. 29. They extend from a rock rod 115, which is mounted in suitable bearings or supports in two brackets 116 secured to the cross member 90 of the supplemental frame, as shown in Fig. 29. In addition to the said rod 109, which lies upon all the warps and the rod 112 which rests upon a lesser number of warps, there is also provided a tension rod 117 which, as shown most clearly in Fig. 32, is secured to and supported by the two arms 114. The said rod 117 constitutes an auxiliary tension. In knitting and widening the heel tabs or parts, there is a tendency to draw more warp threads with those heel tabs. Since the warp threads are all on one beam in this construction of the mechanism, this structure of warp beam tends to draw upon all the warps for the instep during the continuation of the knitting of the heel tabs. Therefore, the auxiliary tension is put in action to take up the slack in the warp threads for the instep.

In order to control the times of action of the tension rod 117 herein termed the auxiliary tension, I have provided automatically controlled means represented in Figs. 35 to 50, in certain of which figures means is also shown for controlling the tension or pull upon the rope 107 shown in Figs. 29, 32, and elsewhere.

Desirably the control in both cases is derived from the so-called selector shaft which is shown at 118 in Figs. 47, 48, 49, and which is the shaft $b$ of the patent to Howie and Krieble, No. 1,982,991, as shown most clearly in Figs. 6 and 7 thereof. In addition to the cams or other parts on said shaft as disclosed in the said patent, I have provided for the purposes next to be described, the three cams 119, 120, and 121 in Figs. 47, 48 and 49. I will first refer to the mechanism which is controlled by the cam 119.

I have stated that the auxiliary tension 117 is put into action and bears upon the instep warp threads during the knitting of the heel portions, which, as already stated, are widened desirably in every other course. Since, however, there is a definite coordination between the coming into action of the said auxiliary tension 117 and the action of the narrowing or widening points, diagrammatically shown at 122 in Fig. 5, I have initiated from the shaft 123, carrying the arms 124 of the narrowing and widening mechanism, the movement of the dog or member which through the mechanism to be described brings the said auxiliary tension rod 117 into action.

Pivoted upon the stud or member 125 of the arms 124 of the narrowing and widening mechanism is a dog 126, shown also in Figs. 38, 39 and 40. The said dog is provided at its upper end with a hook or tooth 127, which, when permitted to do so, engages teeth of a ratchet 128, best shown in the sectional view Fig. 44 and in side elevation in Figs. 39 and 40. The said ratchet 128 is fast by means of a collar 129 upon a stud shaft 130 suitably mounted in a bearing 131 of the framing. Loose upon the said stud shaft 130 is a shielding ratchet disk 132 which, by reason of a coiled spring 133 and washers 134, is constantly pressed facewise against the ratchet 128. The relative shape of the teeth of the said two ratchets is best shown in the full and dotted lines of Figs. 39 and 40. It is to be understood that in order to turn the shaft 130, it is necessary for the tooth or hook of the dog 126 to engage deeply between teeth of the ratchet 128. This it is not permitted to do at certain times because the teeth of the shielding ratchet 132 are so shaped or positioned as to prevent the full entry of the tooth or point 127 of the dog 126. Viewing Fig. 39, it will be seen that at certain points, as, for example, at the point 135, the tooth 127 of the dog 126 would be permitted to penetrate fully and thus to turn the ratchet 128 one step or tooth. It is to be understood that while the arrangement of the teeth upon the shielding ratchet 132 may be varied so as to secure different periodicities of action of the ratchet 128, I have, in the construction shown in Figs. 39 and 40, provided for the following operation. Starting at the very commencement of the action upon the ratchet 128, I have so arranged the teeth of the shielding ratchet 132 that there is first a fully exposed tooth and then a tooth not fully exposed, and this alternation occurs for six times. Then occurs a fully exposed tooth followed by two teeth not fully exposed, and this sequence occurs six times. Then follow a fully exposed tooth and five teeth not fully exposed for four times, and this arrangement occurs for any desired number of times. Any other desired arrangement of the shielding formations of the ratchet 132 may be provided.

The dog 126 reciprocates up and down in a slot 136 in a bracket 137, best shown in Figs. 39, 40 and 41 as secured to the framing. When the dog 126 is in the position shown in Fig. 40, it is about to engage teeth of the said ratchets, but when it is in the position shown in Fig. 39, it is held out of action and cannot engage teeth of the said ratchets. Such active and inactive positions of the dog 126 are determined or controlled by the following mechanism.

Upon a lever 138, shown in Figs. 39 and 40 and also in Fig. 5 (said lever being pivoted at 139 upon an upright portion 140 of the framing), there is pivoted at 141 a depending cam piece 142 positioned in a slot 142' of the bracket 137. The lower end of said cam piece 142 is connected by a spring 143 to a pin 144 upon the bracket 137. Said cam piece 142 has a laterally extending pin 145 which, when in the position shown in Fig. 40, permits the dog 126 to function and when in the position shown in Fig. 39, prevents it from functioning.

The end of the lever 138 opposite that shown in Figs. 39 and 40 has pivotally connected thereto at 146, a downwardly extending link 147 which at its lower end is connected by a pin 148 in a slot 149 to a bell crank lever 150, shown on a larger scale in Fig. 47. The said bell crank lever 150 is pivoted upon the stud 151 in the vicinity of the selector shaft 118, and has a pin or screw 151' to engage the cam 119.

The high portion 152 of the cam 119 moves the arm 153 of the lever 150 outwardly or toward the left, viewing Fig. 47, against the tension of a spring 154 connected to the framing at 155. Such movement of the lever 150 moves the arm or link 147 upwardly and therefore moves downwardly the cam piece 142 and thus permits the dog 126 to be brought into action, as shown in Fig. 40.

I provide a holding dog 156 shown in Figs. 39 and 40 to prevent, at certain times, rotation in a clockwise direction of the ratchet 128, a dog 156' holding the ratchet 132. The said holding dog 156 is pivoted at 157 upon a lever arm 158 which, at its opposite end 159, is pivotally connected to a downwardly extending link 160, shown in Fig. 48 as having a pin 161 extending into a slot 162 of a bell crank lever 163 pivoted upon the same shaft 151 as the lever 150. The said lever 163 has an arm 164 which engages, by means of a screw or pin 165, the periphery of the cam 120. The high portion 166 of said cam 120 rocks the bell crank lever 163 in a clockwise direction against the stress of the spring 167 connected to the framing at 168. The high portion 166 of said cam 120 moves the holding dog 156 into action (that is, into the position shown in Fig. 39).

In order to convey movement from the parts described to the auxiliary tension or rod 117, I have provided a cord 169, best shown in Figs. 31, 35 and 37. As there shown the said cord is secured at one end to a grooved cone 170, which is fast upon the short shaft 130 suitably mounted in the framing as indicated at 131, 172. Upon a grooved member 173 on one end of said shaft is connected a coiled spring 174 which by a cord 175 is connected to a pin at 176 in the framing 140. Therefore, the shaft 130 with its cone 170 is turned against the action of the said spring 174. The said shaft 130 is the shaft already described as the one upon which the two ratchets 128, 132 are mounted, the ratchet 128 being the ratchet through which the said shaft is turned intermittently. The turning action of said ratchet 128 therefore tends to wind the cord 169 upon the grooved cone 170.

The cord 169 is connected as best shown in Fig. 31 to a pivoted wire or lever 175, the pivot thereof being indicated at 115. Thus the said auxiliary tension is automatically applied to the instep warps at the beginning of the formation of the heel tabs or portions and continues so long as desired. Preferably the dog 126 is moved into inactive position at the end of the heel widenings.

The third cam upon the selector shaft 118 (namely, the cam 121) is for the purpose of controlling the tension strain or pull upon the rope 107 wound upon the end of the warp beam, as shown in Figs. 29 and 32. The said rope 107, as best shown in Figs. 49 and 50, is provided at its lower end with weights 177, which are always acting. At certain times the auxiliary weights 178 act and at other times are moved into an inactive position. This is by reason of the fact that the additional or lower weights 178 are carried by a spindle 179 having a head 180 extending through a small opening in the base portion 181 of the upper weight 177.

Upon the spindle 179 is fast a collar 182 adapted to be engaged by the arm of a lever 183 pivoted upon the stud 151. Said lever has upon its other arm a screw or pin 185 engaging the periphery of the cam 121. The high portion 186 of the said cam rocks the lever 183 in a clockwise direction and so lifts the lower or suppleweight 178, and thereby relieves the rope 107 of the effect of the said lower weight 178.

Thus, at all times the weight 177 acts upon the rope 107, and at certain times the weight 178 also acts. In the disclosed embodiment of the invention, the times when only the weight 177 acts are during the knitting of the welt, the shadow or after welt, and the toe. In other words, I relieve the warp beam of a certain amount of tension during the knitting of the welt, the shadow welt and the toe, though my invention is not in its broadest aspects limited to relieving the warp tension at precisely said areas so long as the purposes of my invention are carried out, since an important purpose in providing a heavier weft thread at desired points is to reduce special strains upon the stocking when worn, which special strains may and do occur somewhat below the top and shadow welt, as, for example, at the knee when bent. By reducing the warp tension, I relieve in part at least such special strains. During the knitting of the leg portion and the heel as well as the foot, the lower weight 178 is also acting.

I will next refer to the improved narrowing mechanism which is shown in Figs. 6 and 51 to 54. I have already referred to the narrowing points, as shown at 122 in Fig. 5, and I have in the description of the toe narrowing referred to such narrowings as shown at 22, 22a.

The narrowing mechanism is indicated generally at 100 in Fig. 6. It includes the opposite threads 105, 106 controlled by a gearing 107 as in the said patent to Howie and Krieble, and need not therefore be more particularly described. In the said patent there are shown narrowing or widening blocks which correspond to the blocks 108, 109 shown in Fig. 6. The said blocks are internally threaded so as to be operated by the screw threads 105, 106. In addition to what is just referred to in said patent, I have here provided supplemental blocks 190, 191, which are supported upon the said threads 105, 106, but are not themselves internally threaded, so that they are not, by any threaded engagement with the said threads 105, 106, moved thereby.

The respective blocks 108, 190 and 109, 191 act as two units during the narrowings at the leg, namely, at the flare and at the calf, and also in the sole narrowings, and they also act as widening instrumentalities in knitting the heel portions. In knitting the toe narrowings 22, 22a, however, I provide for a relative movement of the two parts of each of said units. This is done by the following mechanism.

A bar 192 forming a part of the narrowing organization and extending transversely thereof, is provided at two points near midwidth of the blank with like plates or cam elements 193, one of which is shown in Fig. 54, and the other of which is employed in connection with the other narrowing block unit. Each said plate is adjustably secured by screw and slot construction 194 to the said bar 192. There is provided at each narrowing block unit a lever 195 pivoted at 196 and having an end 197 adapted at the commencement of the toe narrowing to ride under the corresponding plate 193 and elevate its opposite hooked end 198 out of engagement with a lug or projection 199 upon the small block 191. This, therefore, permits the larger block 108 to act independently of the smaller block 191. The same is true at the left hand portion of the toe with respect to the larger block 109 and the smaller block 190.

The construction is such that when the knitting of the toe narrowings is to commence, both the large block and the small block of each unit go down together and take stitches from the fabric and transfer them one stitch inward. Then at the ensuing turning movement of the threaded shaft having the opposite threads 185, 186, the two large blocks 188 and 189 will be moved outward but will leave the smaller blocks 190, 191 undisturbed. In the second course, therefore, upon the descent of all the narrowing blocks, the smaller blocks 190, 191, although they take stitches, do not transfer them, because the said smaller blocks have not received any transverse movement. The larger blocks 188, 189, however, have received a transverse movement from the said threads 185, 186, and therefore transfer stitches one needle laterally. In such transferring action, each of the larger blocks is then brought into contact with the smaller blocks and upon the next course each large and corresponding small block go down as a unit and take up all the stitches which are thus laterally transferred one stitch. Upon the fourth course the action is the same as upon the second course, and so on in alternate courses throughout the narrowing of the toe.

I will next refer to the means for turning the welt. Preliminary thereto, it is noted that the warp bar 35 (shown in Figs. 3, 45, 46 and elsewhere) is mounted for axial and rocking movement in two brackets 200, 201 mounted upon the framing as indicated at 202 and 203 in said figures. One of the said brackets is also shown in Fig. 20. Each of said brackets 200, 201 is provided with a member 203 secured to the respective bracket and provided with an open ended slot 204. Said slot is adapted to receive the welt bar 205 which is placed therein manually at the proper time. Referring to Figs. 18 and 19, it is to be understood that the knitting of the blank in question is begun at 206 and continued in the direction of the arrows, as indicated in said figures, until a sufficient length of fabric is knitted to make both walls of the welt. Thereupon the welt bar 205 is placed by the operator in the slots of the brackets 203. The first portion of the fabric (namely, that indicated at 207) is pushed up into the position shown in Fig. 18 (that is, to the base of the welt hooks 208). The needle bar 41 is dropped back under the control of the operator against the said welt hooks 208, as shown in Fig. 18. The beginning end of the fabric is then pushed down onto the needles (as indicated in Fig. 19) and off the welt hooks 208. The welt bar 205 is then removed from the brackets 203 and the needle bar 41 is pushed forward into operating position, as indicated in Fig. 20.

At this point, the procedure is substantially that disclosed in my Patent No. 2,014,126, September 10, 1935, so far as the knitting of a series of stocking blanks as a continuous string or series is concerned.

I have described the preferable knitting of the welt at the top of the stocking from a body, main or weft thread that is heavier or of a larger diameter or greater denier than the thread or threads from which other parts of the stocking are knitted, as, for example, the leg and instep. Desirably also the heel is knitted of a heavier weft thread or threads than the main or weft thread of the leg. By the mechanism already described, which is the preferred embodiment of my invention, I impart less tension to the warp threads, while they are being incorporated into stitches made from the heavier weft thread or threads, than I do to the said warp threads while they are being incorporated into stitches made from a weft or body thread which is of less diameter or smaller denier. By my invention, I proportion the tension upon the warp threads in inverse relation to the size, weight or diameter of the welt or body thread or threads, thus increasing the longitudinal expansibility of the fabric particularly with respect to those portions of the fabric having the heavier weft or body thread or threads, such, for example, as the top welt, mentioned as one instance only of the application of my invention, which is directed to relieving warp tension at needed areas.

The foregoing completes the operation so far as the knitting of a stocking blank upon the TW form is concerned. With respect thereto and also with respect to the knitting of a blank upon the TC and TL forms, I point out that in my Patents Nos. 1,978,408 and 1,978,412, I have stated that the foot of the stocking may be made directly upon the machine whereon the leg is made. While, therefore, there is a broad reference in the said patents to the accomplishment of such purpose, the means for doing so are first disclosed and are claimed in this application.

The foregoing completes the description of the formation of the non-run stocking or blank therefor when made upon the so-called TW type of Wildman machine. In the TW type, it has been hereinbefore pointed out by me that during the knitting of the heel portions the knitting also continues upon the instep, or, in other words, the stitches are not taken off the instep needles during the knitting of the heel portions.

I will next describe the knitting of a stocking blank upon what is termed the TC and the TL forms. An outstanding difference between the TW form on the one hand and the TC and TL forms on the other, is that when the knitting operation has progressed to the commencement of the heel portions, the stitches are taken off the instep needles and held out of action temporarily, the said stitches being restored to the instep needles substantially upon the completion of the heel portions.

So far as the introduction of the warp threads into the fabric is concerned, the action is essentially the same in all three of said forms, namely, the TW, TC and TL, and therefore it will be unnecessary to repeat the description with respect thereto. There is, however, the important difference that in knitting the fabric according to the TC and the TL types, instead of providing a single warp beam for all the warp threads, I provide a warp beam in three sections whereof the middle section contains the warp threads for the instep needle wales. Such mechanism will be hereinafter described.

Before describing such mechanism, however, I will sufficiently refer to the heel construction of both the TC type and the TL type, the former being shown in Fig. 59 and the latter being shown in Fig. 60 and also in Fig. 61.

Referring to Fig. 59, the lower part of the ankle portion (namely, the portion just preceding the commencement of the heel portions) is represented at 209. When the commencement of the heel portions is reached, the instep stitches are taken off the needles by mechanism which will be described later. Then the two heel portions 210, 211 are knitted as integral continuations of the leg portion. The said heel portions are knitted without any widening action whatever, as was done in connection with the TW type. Upon the completion of the said heel portions, the instep stitches are transferred back to the needles and the said two heel portions are topped onto the proper needles, so that the foot-sole portions may be knitted as continuations of said heel portions after said heel portions have been so topped onto the needles. The operation of knitting the instep or top of the foot continues and at the same time there are knitted as initially integral lateral extensions of said instep, the two parts 212, 213 just above referred to, and which together constitute the bottom of the foot. Then the toe portion 214 is knitted, desirably in the same manner as shown in Fig. 57, said toe portion thus being an initially integral extension of the said instep portion and of said lateral extensions 212, 213. It will be noted that the warp threads extend throughout the entire fabric shown in Fig. 59, and that the warp threads extend without necessary thread severance throughout the entire longitudinal extent of said heel portions, the instep portion, the foot-bottom portions and the toe. The blank is then seamed up along the bottom of the foot and the back of the leg. According to the TC type, it is necessary to cut the fabric at the end of the heel tabs to turn them at right angles for topping, the cut being made in front of the needles so that some fabric remains thereon.

The knitting of the heel portions, etc., according to the TL type is indicated in Figs. 60 and 61. As there shown, the knitting proceeds until the lower part of the ankle portion is completed as indicated at 215. Thereupon the instep stitches are taken off the needles in a manner similar to that just referred to, and the knitting of the two heel portions 216, 217 is proceeded with. Substantially at the end of what constitutes the heel portions, the instep stitches are put back on the instep needles. There is, however, no topping action employed, but the heel is completed by what is known as a looping action, which is done after the knitting of the blank is completed. Therefore, the knitting operation proceeds from this point onward as described with respect to the TC form shown in Fig. 59, so as to complete the top of the foot, the lateral extensions thereof which form the bottom of the foot, and the toe. In knitting the heel portions 216, 217, I knit an additional portion on each heel portion to provide a looping finger-hold including a loose course.

The two heel portions as they appear after the completion of the blank, but before the cutting and seaming action, are indicated in Fig. 60 at 216, 217. In Fig. 61, I have indicated that each heel portion is cut through at the termination thereof and then turned into a lateral position, whereupon the lateral edge of each heel portion is looped as indicated at 219 onto the commencement of the bottom-foot portions of the fabric.

It will be understood that in this type of stocking when made in accordance with my invention, the warp threads are continuous throughout the entire fabric from the initial introduction of the said threads down to the completion of the fabric. There is, of course, a necessary severance of the warp threads pertaining to the heel portions and the foot-bottom portions by the action of cutting the heel portions across, as indicated in Fig. 61, for the looping action.

Referring again to the knitting of the fabric according to the TC type, as shown in Fig. 59, it will be understood that the warp threads continue throughout the heel portions. In performing the topping action, the inner lateral edge of each heel portion is topped upon the needles and the knitting of the two foot-bottom sections or portions is proceeded with as already described.

In knitting the said heel portions, the warp threads are introduced each into a separate needle wale of the said heel portions. In other words, each and every stitch throughout the entire fabric, both of the TC form and the TL form, contains a warp stitch, this being also true of the TW form already described.

In Figs. 62 to 79, I have disclosed mechanism employed in connection with a single-unit single-head machine of the TC and/or the TL type as contrasted with the TW type, which has been described at length in the preceding portion of the specification. In the so-called TW type, the instep stitches are not taken off the needles during the knitting of the heel portions. In both the TC and TL types, said instep stitches are taken off the needles at the very commencement of the knitting of the heel portions and are restored to the same needles upon the completion of said heel portions.

I am aware that it is not broadly new to take the stitches off the instep needles at the commencement of the formation of the heel portions and to restore them to the same needles upon the completion of the heel portions. Heretofore, however, that has been accomplished only manually and it has required the stopping of the entire mechanism while the operation is carried out. I have provided, as shown in Figs. 62 to 79, automatic means for accomplishing this result.

My invention is not limited to the use of automatic means for removing and restoring the instep stitches in a combination wherein warp threads are introduced to render the fabric of a non-run character, or wherein any other means is or may be employed to render the fabric of a non-run character, inasmuch as my invention in this respect is of broad application.

Before describing specifically the means employed by me for effecting the automatic removal and automatic restoration of the instep stitches, I again refer to the fact that in the mechanism shown in said Figs. 62 to 79, the warp beam, instead of being a single or unitary device as in the construction of mechanism shown in connection with Figs. 1 to 55, is made in three sections, the central section being that which receives the instep warp threads. When, therefore, the instep portion is reached and the knitting of the heel portions is about to begin, the warp fingers pertaining only to the instep needles are rendered temporarily inactive, being moved to a non-functioning position. The said central section of the warp beam is rendered inactive or idle so that it is not driven with the right and left hand sections thereof which continue to feed their warp threads to the other portions of the stocking blank. The said central section of the warp beam is positively held from a forward or feeding movement while rendered inactive.

By the automatic means now to be described, the stitches are all taken off the instep needles and are held from the needles until the completion of the heel portions, whereupon said stitches are automatically returned to the same needles.

It is to be understood that aside from the mechanism shown in Figs. 62 to 79, the general mechanism of the machine is the same as that shown in connection with Figs. 1 to 53. Therefore, it need not be again referred to.

The warp beam employed with the type of mechanism shown in Figs. 62 to 79 is indicated generally at 220 in Fig. 62. It is composed of three sections indicated respectively at 221, 222 and 223. The right hand section 223 is fast on the warp beam shaft 224 as there indicated. The left hand section 221 slides longitudinally on the shaft 224, having a key and slot or equivalent connection therewith, so that it at all times rotates with the said shaft. The center section 222 is loose on the shaft 224 and is driven with the end sections 221, 223, only by means of a certain locking connection therewith which will be later described and which includes interengaging ratchet teeth indicated generally in Fig. 62, but shown more in detail in Fig. 67. Each of the said warp beam sections is preferably provided with end flanges indicated at 225, 226.

In suitable parallel relation with the said three-sectioned warp beam is mounted a control shaft 227 in suitable bearings in the framing. The said shaft has three sections or portions, of which the left hand section is indicated at 228, the center section at 229, the right hand section being that referred to by the reference character 227. Upon the left hand section 228 of the said control shaft are several cams shown mainly in detail in other views. Included among the cams fast upon said left hand section of shaft 228 is a cam disk 230 having a lateral cam 231 thereon to engage periodically a roll 232 upon a lever 233 pivoted at 234 and having a fork 235 to engage the flange 225 of the left hand section 221 of the warp beam. By the described construction the said warp beam section 221 is moved to the left viewing Fig. 62, in order to disengage itself from the center section 222 which therefore remains idle until said left hand section 221 is moved back to the right into the position shown in Fig. 62, thus coupling said sections 221, 222 and compelling the center section 222 to rotate as a unit with the sections 221, 223.

Said control shaft upon the section indicated at 227 has fast thereon a drum 236 upon which is wound a cord or cable 237 extending to a part of the transfer arm shown in Fig. 63 and which will be hereinafter described. By means of said drum the transfer arm and transfer points are lifted up at the proper time out of functioning position and again at the proper time are dropped back into fuctioning position.

The center section 229 of the control shaft has fast thereon two contrasting ratchets 239, 240, shown in other figures and to be more fully described. The said center section 229 of the control shaft has axial pin formations 241, 242 to engage respectively sockets 243 and 244 upon the other sections of the control shaft when said center section 229 is moved axially in one direction or the other. The means for imparting such axial movement of the shaft 229 is here shown as including a lever 245 pivoted at 246 upon the framing and controlled by mechanism shown in Fig. 65. The opposite end of said lever 245 has a roll or pin 247 to engage the groove of a collar 248 fast upon said center shaft section 229. When said center section 229 is moved axially to the right viewing Fig. 62, the drum 236 is under the control of the ratchets, so that said drum is moved in one direction or the other at the proper time. When said center section 229 is moved to the left viewing Fig. 62, the cams upon the section 228 come under the control of the ratchet 239.

In Figs. 63, 64 and 65, I have represented the transfer mechanism pertaining to the needles upon which the instep needle wales are knitted and the stitches whereof are at the commencement of the formation of the heel portions automatically removed from the needles to be automatically restored thereto upon the completion of the heel portions. Also in said figures is represented the means for controlling the center section of the warp fingers, namely, those warp fingers whose duty it is to feed or introduce the warp threads to those needles whereon the instep is knitted. I will first refer to the novel construction of the center section or portion of the warp fingers and the means for controlling the same.

The shaft for the warp fingers is indicated at 35 in Figs. 63 and 64, and excepting for the fact that the center portion of the warp guide fingers has a movement independent of the right and left portions of said warp guide fingers, the construction and the means for supporting the parts may be and desirably are the same as that disclosed in connection with the mechanism of Figs. 1 to 55, and hence need not be more fully described.

The center section of the warp guide fingers is indicated at 249 in Fig. 64. It is provided with two or other suitable number of arms 250 for supporting the same upon the shaft 35 but so that said center section may be locked to the shaft to participate in the axial and rotative movements thereof or may be unlocked so that it hangs in a vertical position without functioning while the instep stitches are off the needles, being at such times supported on the transfer points. As best shown in Figs. 65 and 66, the block 251 is loose upon the shaft 35 and is provided with a socket 252 to receive the end of a suitable pin 253 extending through a block 254 fast on the shaft 35. Surrounding the pin 253 is a coiled spring 255 held in position by a plate 256. Said pin 253 is fast to an arm 257 extending laterally therefrom, as indicated in Fig. 66, and itself having a pin 258, the large end of which is received in an arcuate slot 259, shown also in Fig. 65.

Upon the part 228 of the control shaft is fast a cam 260, best shown in Fig. 65, and having a peripheral cam formation 261 and a lateral cam extension 262. The latter of these cams is adapted to engage the arm 263 of a locking and unlocking lever 264 pivoted at 265 upon a bracket 266 on the framing. The arm 267 of said lever is provided with the said arcuate slot 259. The construction is such that upon movement of the lever 264 toward or from the plane of the sheet bearing said figure, the pin 253 is moved axially so as to lock or unlock the center section 249 of the warp guide fingers. Thus, at the proper time (namely, when the instep stitches are taken off the needles by the transfer points) the center section 249 of the warp guide fingers is released from the shaft 35 and the said warp guide fingers are permitted to swing into a vertical depending non-functioning position, where they remain until at the proper time the instep stitches are restored to their needles and the center section 249 of the warp guide fingers immediately again becomes operative, so that in the further operation of the parts the center section of the warp guide fingers acts as a unit with the remaining parts or groups of said warp guide fingers.

The cam formation 261, shown in Fig. 65, takes under the end 268 of a lever pivoted at 269 on the bracket 266 and having at the end of its arm 270 an arcuate slot 271 to permit the needle wrapping movements of the warp guide fingers. Received in said slot is a pin 272 upon an arm or bracket 273 secured to the block 251. By said construction the block 251 with the warp guide fingers of the center section are moved in the manner already referred to.

As shown in Fig. 63, the narrowing mechanism shaft is positioned at 274, being supported in suitable manner in the framing. Extending therefrom is a bracket 275 having a pivot pin 276 for the transfer bar hanger 277 provided with a pivot 278 from which extends downwardly the transfer bar 279 having the transfer points 280 of usual construction. The transfer points are shown in operating position in Fig. 63 and the warp guide fingers 32 are there also shown in operating position. Upon a portion of the framing indicated at 281 is a bracket 282 of which a plurality may be provided in parallel position, each having two inclined, lengthwise extending slots 283, 284 of suitable form and which act as guides and steadying means for the movements of the transfer bar automatically into and out of functioning position. The said transfer bar is provided with two studs 285, 286, fast with and laterally extending therefrom into the said slots 283, 284, respectively, other like pins being provided to engage the other slots if employed. Thus, as the transfer bar is elevated or lowered, the pins 285, 286 are guided in the slots 283, 284, and by the provision of a suitable number of said studs and slots the movements of the transfer bar are facilitated and the bar steadied.

In order to lift the said transfer bar out of functioning position, there is provided a cable 237 connected to the transfer bar at a suitable point 280', said cable extending to the drum 236 already described. Thus, at the proper time, according to the control of the cam means therefor, the drum 236 is turned in one direction or the other so as to wind or unwind the cable sufficiently to move upwardly or to permit to move downwardly by gravity, assisted by a suitable coiled spring attached thereto and to the framing, the transfer bar 279 with its transfer points 280, thus withdrawing said transfer bar from and again restoring it to functioning position.

After the said transfer bar is in functioning position, the action of the narrowing mechanism already on the machine takes said transfer bar down when it picks up the instep stitches, then through a series of motions imparted by suitable cams upon the said TC and TL types of Wildman machine as now upon the market, said transfer bar moves one half needle to the right, then through between the needles and then in front of the needles, where it holds the stitches until the knitting of the heel tabs or portions is completed. After the said heel tabs or portions are completely knitted, the aforesaid cams already provided upon the TC and TL types of the Wildman machine move the stitches again to the right, then through between the needles and in back of the needles, whereupon the narrowing mechanism comes into action again, thus causing the transfer bar 279 to land the stitches back on the needles. Only then do the drum 236 and the cable 237 act to raise the said transfer bar out of functioning position. In other words, the function of the drum 236 and the cable 237 is to place the transfer bar 279 in position for the narrowing mechanism and transfer bar cams already upon the machine, so as to cause or permit the transfer points to pick up or land the stitches. Said drum 236 and cable 237 do not take any part in the actual transfer of stitches. At a suitable time the transfer bar 279 is raised up so that the regular narrowing points can move inwardly to accomplish the sole and toe narrowings.

I will next describe the means for controlling the center section 222 of the warp beam when the same is rendered inactive or loose upon the shaft 224. Said center section is indicated in end elevation in Figs. 67 and 69, where it is shown as having an annular ratchet tooth construction 287 to engage or disengage corresponding teeth on the left hand section. Said center section is also provided with a peripheral set of ratchet teeth 288 as shown in said figures. With the ratchet teeth 288 is adapted to engage the end of the pawl 289 pivoted at 290 upon an upright, lengthwise movable link 291 having a lengthwise slot 292 in which is received a shaft 293 suitably supported in the framing, as shown also in Fig. 63. Fast upon said shaft 293 is a spiral or scroll cam 294 upon the periphery of which takes a roll 295 carried by the said link 291 at its upper end. Also fast upon the shaft 293 is a ratchet disk 296 which, as best shown in Fig. 73, is adapted to be engaged periodically by a suitable lateral projection 297 upon a disk 298 having fast therewith a ten-toothed ratchet 299, both on the shaft 300. The teeth of said ratchet 299 are engaged by the point of a pawl 301, to be later referred to.

It has been stated that the ratchet 299 is provided with ten teeth. Thus, at every ten revolutions of the shaft 300 the ratchet disk 296 is turned to the extent of one tooth. There are thirty ratchet teeth upon the disk 296; thus the ratchet disk 296 will make one complete revolution for each three hundred revolutions of the shaft 300. In other words, the pin or projection 297 upon the disk 298 turns one tooth of the ratchet disk 296 for every ten stockings, the spiral cam 294 making one complete revolution for every three hundred stockings.

The left hand section 228 of the control shaft 227 is shown in Figs. 67, 68 and 69. Thereon is fast at a suitable point the disk 302 having a cam formation 303 adapted in the rotation of said shaft section to engage a suitable projection 304 on a lever arm 305 pivoted at 306 in the framing and having a lengthwise slot 307 in which takes a pin 308 upon the short arm 309 of the lever 289 which, as already described, is pivoted at 290.

It will be understood that the warp beam and its contents, as the latter decrease in diameter, must receive a greater arcuate or turning movement proportionate to the decreasing diameter of the warp mass. At the end of each inactive period of the center section of the warp beam, and when said center section is being coupled up to the said other two sections, so as to rotate as a unit therewith, it is important first to turn backward said central section so as to wind back onto said center section such portion of the warp ends as may be necessary in order to tighten the said warps and to place them under the same tension as the other warp ends. Moreover this must be done in a variable manner since the contents of the warp beam are constantly lessened. It is for that purpose that I provided the slot 307 in the lever 305, outwardly in which slot the pin 308 is constantly being moved under the influence of the link 291 which, as stated, provides a pivot 290 for the lever 289, 309, said link being gradually moved upward as described by the spiral cam 294. Preferably the peripheral cam 303 is provided with a terminal portion 309 which is intended at the proper time to ride under the projection 304 of the lever 305, so as to give an extra extent of push to said lever 305, so as completely to take up slack in the warp threads of the entire warp beam as a unit, by imparting a slight additional backward turning movement to the said center section 222.

It is necessary or highly desirable to provide means for preventing the center section of the warp beam from turning forward at any time while it is loose upon the shaft support and while the instep stitches are held on the transfer points. For this purpose, I have represented the ratchet 288 as engaged by the tooth of a pawl 310 shown in Fig. 63 as pivoted at 311 upon the frame. Means are provided to withdraw said pawl 310 from the teeth of the ratchet 288 immediately upon the center section of the warp beam again functioning. For that purpose I have provided the following construction.

A lever 312 is pivoted at 313 upon a bracket 314 on the framing. The right hand end of said lever 312, viewing Fig. 63, is connected by a pin and slot connection 315 to the pawl 310, so that upon movement of said lever 312 in a contraclockwise direction, the pawl 310 is withdrawn from the teeth 288. A spring 316 is provided tending to move said lever in the desired direction. The opposite end 317 of said lever 312 bears upon a cam 318 upon the part 228 of the control shaft shown in Fig. 62, and therefore at a proper time causes the pawl 310 to be withdrawn from the teeth of the ratchet 288.

I will next describe the means for operating the control shaft, and for that purpose will refer to Figs. 70, 71 and 72. The center section 229 of the control shaft is indicated in each of said figures. Fast thereon are the two ratchets 239, 240 already described with respect to Fig. 62. The teeth thereof extend in opposite directions as clearly indicated in Figs. 70, 71 and 72. With the teeth of the ratchet 239 is adapted to engage the end 319 of a long pawl 320 pivoted at 321 upon a T head lever 322 pivoted at 323 upon the framing. To the outer arm of said lever 322, there is pivoted at 324 a long downwardly extending link 325, which at 326 is pivoted to a lever 327 itself pivoted at 328 on the framing. The opposite end of said lever 327 has a roll 329 adapted to engage the periphery of the disk 330 fast upon the main cam shaft 27 of the machine. Upon the periphery of the said disk 330 is a cam 331.

Also pivoted upon said T head lever 322 at 332 is another pawl 333, the tooth 334 at the free end of which is of a hook shape, so as properly to engage the teeth of ratchet 240. The said pawls 320 and 333, which are shown also in Fig. 62, are controlled by two cam disks 335, 336, on a shaft 336', as best shown in Fig. 62. Said cam disk 335 is provided with a peripheral cam elevation 337, shown in Figs. 70, 71 and 72. The cam disk 336 has two cam projections 338, 338', shown in Fig. 72. According to the location of the said cam projections 337, 338, 338', one or the other of said pawls 320, 333 is permitted to engage the ratchet 239 or the ratchet 240, so as to turn the central portion 229 of the control shaft in one direction or the other. As already stated, the pawls 320 and 333 receive their lengthwise or functioning movements from a cam 331 on the cam shaft 27. The neutral position of both the said pawls 320 and 333 is shown in Fig. 70. In Fig. 71, the pawl 333 is in functioning position, its end being shown as engaging the teeth of the ratchet 240. This is the reversing position. The forward driving position of the parts respecting the central portion 229 of the control shaft is indicated in Fig. 72, where the pawl 320 is shown in driving relation to the ratchet 239.

It will be understood from the construction just described that the central portion 229 of the control shaft is driven periodically in one direction or the other and that if said central portion of said shaft is coupled up to the section 228, the cams on said section 228 will be caused to function at the proper times, whereas if said central section 229 be coupled up to the section 227, the drum 236 will be turned at the proper times in one direction or the other as necessary to perform its function.

The shaft 336' is mounted in suitable bearings upon the framing. In order to turn the same I preferably provide the means shown in Fig. 74, as follows: Upon the selector shaft 118 of the machine is fast a disk 339, the main portion of the periphery of which, shown at 340, is termed the neutral portion thereof. At 341 is a recess, the bottom of which constitutes the low part of the cam and adjacent thereto are two projections 342, 343 constituting the high parts of the periphery of the disk. Adapted to ride upon the periphery of the disk 339 is a pin 344 upon a lever 345 pivoted at 346 upon the framing. To the outer end of said lever 345 is pivotally connected at 347 an upwardly extending link 348 pivotally connected at its other end at 349 to a bell crank lever 350 pivoted at 351 to the framing. To the outer end of the upright arm of said lever 350 is pivotally connected at 352 a link 353 which, at its opposite end, is pivotally connected at 354 to an arm 354' fast on the shaft 336'. The construction is such that according to the rotation of the selector shaft 118, the pin 344 of the lever 345 is permitted either to ride on the neutral surface 340 of the disk 339, or to enter and engage the low part 341, or to ride upon the high parts 342, 343. The neutral part 340 is the one which gives the position of parts shown in Fig. 70, the low part is that which gives the position of parts shown in Fig. 71, and the high parts 342, 343 give the forward driving position shown in Fig. 72. The construction is such that the shaft 336' with its disks 335, 336 is turned a comparatively few degrees in one direction or the other so as to cause the cams shown in Figs. 62, 70, 71 and 72 to function in their control of the pawls 320, 333.

I will next describe the means for axially moving the center section 229 of the control shaft. It has already been stated that a lever 245 is provided to impart said axial movement. The means employed automatically to move said lever 245 is desirably the following, shown in Fig. 75. Said lever 245, as best shown in Fig. 62, is provided at its end opposite the shaft section 229 with a slot 355 with which engages, as shown in Fig. 75, the end 356 of a lever 357 pivoted at 358 upon the framing and having its opposite end 359 lapping last the periphery of a disk 360 fast upon the selector shaft 118. Upon one face of said disk 360 is a cam 361 by which intermittently at the proper time a rocking motion is imparted to said lever 357 so as thereby to rock the lever 245 (Fig. 62) and impart axial movement to the center section 229 of the control shaft.

I have referred to the ten-toothed ratchet 299 upon the shaft 300. Movement is intermittently imparted to the said ratchet by preferably the following means shown in Fig. 73. The point 362 of a pawl 363 engages the teeth of said ratchet 299. Such pawl is pivoted at 364 to the upper arm of a lever 365 itself pivoted at 366 upon the framing and having at its lower end a projection 367 in the path of a cam projection 368 upon a disk 369 fast on the selector shaft 118.

I will next refer to the means whereby the mechanism is driven at a slower speed during the operation of the transfer mechanism, etc. This is shown in Figs. 76 to 79. In Fig. 76, which is a front elevation of the lower part of the framing, there is indicated at 370 a drum which is the pattern drum A, shown in Fig. 1 of the patent to Howie and Krieble, No. 1,982,991. The said drum functions as described in said patent and has the construction there shown and described and in addition has a projection 371 which at the proper time swings outwardly a lever 372 suitably pivoted upon the framing and which is connected with a steel band 373 passing over the guide roll or rolls 374 and which at its end is provided with a lever 374a itself connected to a bar 374b to engage the driving belt 375 of the machine as indicated at 376. A spring 374c is connected to the said lever and the framing. The said belt drives the pulley 377 upon the shaft 27 shown in Fig. 3.

In order to drive the said belt 375 at two different speeds, I preferably provide a line shaft 378, shown in Figs. 76, 77 and 78 as supported in brackets 379, 380, and such other brackets as are necessary, inasmuch as said line shaft desirably extends along the rear of a battery or series of like knitting machines. In this manner, each of the knitting machine units is controlled from the line shaft 378 and at each of the machines is provided the construction shown in Figs. 77, 78 and 79.

Therefore, when the belt 375 is on the pulley 381 the machine is driven at high speed. In order to drive the machine at the desired times at a low speed, I have provided the following mechanism.

Also fast upon the line shaft 378 is a driving pinion 382 desirably shaving fifteen teeth and meshing with a gear 383 desirably having forty teeth and fast upon an auxiliary or jack shaft 384, which shaft also has fast thereon a pinion 385 meshing with the teeth of a gear 386 loosely sleeved upon the line shaft 378. Desirably the pinion 385 has fifteen teeth and the gear 386 has forty teeth. Secured to one face of the gear 386 by bolts 387 is a pulley 388 which thus is desirably driven at sixty revolutions per minute. Thus, according to whether the belt 375 is upon the driving pulley 381 or upon the pulley 388, the mechanism is driven at either a high speed desirably 423 revolutions per minute, or at a low speed of desirably sixty revolutions per minute. This change in the speed is under the control of the said pattern drum 370 which for that purpose has a suitable number of projections thereon to operate the lever 372 at the proper times.

The sequence of operations with respect to the taking of the instep stitches off the needles, the knitting of the heel portions and the return of said stitches to the same needles is as follows:

First, the operator desirably applies water with a brush to the stitches upon the needles so that while they are being held by the transfer points, they will not become too dry. The center section 229 of the control shaft 228 is moved to the right viewing Fig. 62, so that the drum 236 is turned to unwind to a sufficient extent the rope 237, thus lowering the transfer bar 279, permitting the transfer points 280 to reach functioning position as described. Then the push dog or pawl 320 becomes operative with the forward turning ratchet 239 and continues so to act until the transfer bar 279 reaches its operative position. Preferably at this part of the cycle the speed is changed from high speed to low speed. The center section 220 of the control shaft then moves to the left viewing Fig. 62, thereby unlocking the central portion of the warp guide bar through the operative connections described, including the cam 230 and the lever 233. The left hand end 221 of the warp beam is moved to the left to disengage the center section 222 thereof and the center section 249 of the warp guide bar swings into a vertical depending non-functioning position. The dog or pawl 310 then engages the ratchet 208 to prevent the said center section of the warp beam from turning further in a feeding direction. At this time the transfer points take the stitches off the instep needles. Thereupon the full speed of the machine is restored and the knitting of the heel portions is proceeded with and completed. When the knitting of the heel portions is completed, the machine then is driven again at slow speed while the reversal of the operations above described with respect to the transfer bar is carried out and the central section 222 of the warp beam is again made operative. The dog 310 is elevated out of engagement with the ratchet 208. The dog, pawl or lever 209 is then moved into engagement with the ratchet 208 of the center section of the warp beam so as to move the same backward to a differential extent dependent upon the diameter of the warp mass. This motion continues until all the slack upon the warp threads on the said center beam section is taken out. Thereupon the center section of the warp guide bar is moved into operative position and locked to the shaft 35. The left hand section 221 of the warp beam is moved to the right viewing Fig. 62 to engage the center section of the warp beam. Then the entire warp beam is turned backward to tighten up all the warps, and full speed is resumed. The center section 229 of the control shaft is moved again to the right viewing Fig. 62 to render the drum 236 active so as to wind up the cable 237 and lift the transfer bar up out of action. This completes the cycle of movements, all of which movements are automatic.

Having thus described several embodiments of mechanism for making the stocking blank of my invention, and having described the best mode known to me for making the said stocking blank, I desire it to be understood that although specific terms are employed, they are used in a generic and descriptive sense and not for purposes of limitation, the scope of the invention being set forth in the following claims.

I claim:

1. That method of knitting a full-fashioned or flat-knit run-proof or strongly run-resistant stocking or blank therefor which consists in knitting a main or body thread or threads into all the wales from edge to edge of the fabric and into all the courses of the stocking or blank, and in knitting a multiplicity of warp threads extending lengthwise of the fabric into respective loops of the needle wales thereof in successive courses in different loops of the said main or body thread or threads in such courses and including a multiplicity of needle wales; at the heel portions laterally outwardly transferring stitches of body and warp threads in succeeding courses while at the same time continuing the knitting operation from edge to edge of the fabric so as to provide the instep portion and the sole portions all initially integrally formed with said heel portions without thread severance of the warp threads being required in such knitting operations.

2. That method of knitting a full-fashioned or flat-knit run-proof or strongly run-resistant stocking or blank therefor which consists in knitting a main or body thread or threads into all the wales from edge to edge of the fabric and into all the courses of the stocking or blank, and in knitting a multiplicity of warp threads extending lengthwise of the fabric into respective loops of the needle wales thereof in successive courses in different loops of the said main or body thread or threads in such courses and including a multiplicity of needle wales; at the heel portions laterally outwardly transferring stitches of body and warp threads in succeeding courses while at the same time continuing the knitting operation from edge to edge of the fabric so as to provide the instep portion and the sole portions all initially integrally formed with said heel portions without thread severance of the warp threads being required in such knitting operation, and in the knitting operation providing at the inner edge of each heel portion an outwardly downwardly extending inclined line of openings, which openings are traversed by certain of said continuous warp threads.

3. That method of knitting a full-fashioned or flat-knit run-proof or strongly run-resistant stocking or blank therefor which consists in knitting a main or body thread or threads into all the wales from edge to edge of the fabric and into all the courses of the stocking or blank, and in knitting a multiplicity of warp threads extending lengthwise of the fabric into respective loops of the needle wales thereof in successive courses in different loops of the said main or body thread or threads in such courses and including a multiplicity of needle wales; at the heel portions laterally outwardly transferring stitches of body and warp threads in succeeding courses while at the same time continuing the knitting operation from edge to edge of the fabric so as to provide the instep portion and the sole portions all initially integrally formed with said heel portions without thread severance of the warp threads being required in such knitting operation, the knitting of the said instep portion continuing course for course during the knitting of the heel portions (i. e. without taking the instep stitches or fabric off the needles).

4. That method of knitting a full-fashioned or flat-knit run-proof or strongly run-resistant stocking or blank therefor which consists in knitting a main or body thread or threads into all the wales from edge to edge of the fabric and into all the courses of the stocking or blank, and in knitting a multiplicity of warp threads extending lengthwise of the fabric into respective loops of the needle wales thereof in successive courses in different loops of the said main or body thread or threads in such courses and including a multiplicity of needle wales; at the heel portions laterally outwardly transferring stitches of body and warp threads in succeeding courses while at the same time continuing the knitting operation from edge to edge of the fabric so as to provide the instep portion and the sole portions all initially integrally formed with said heel portions without thread severance of the warp threads being required in such knitting operation, and during the knitting operation introducing reinforcing body threads into the said heel portions.

5. That method of knitting a full-fashioned or flat-knit stocking-blank of full width throughout, which consists in knitting a main or body thread or threads into all the wales from edge to edge of the fabric blank and into all portions of the said blank, and in knitting a series of warp threads one for substantially each needle wale of the fabric and collectively knitted into substantially all the stitches of the said needle wales, so that substantially each stitch of the main thread or threads of the fabric has a stitch of warp thread to render the said fabric blank of a non-run or strongly run-resistant character, and in knitting said blank forming thereon heel portions and in the knitting of said heel portions laterally transferring stitches in alternate courses knitted in the same direction.

6. That method of knitting a full-fashioned or flat-knit run-proof or strongly run-resistant stocking or blank therefor which consists in knitting a main or body thread or threads into all the wales from edge to edge of the fabric and into all the courses of the stocking or blank, and in knitting a series of warp threads extending lengthwise of the fabric into respective loops in successive courses in different loops of the said main or body thread or threads in such courses, taking the instep stitches off the needles upon arriving at the instep portion, knitting the heel portions as integral continuations of the leg portion, transferring the instep stitches back to the needles, topping on the heel portion, then in the continued knitting of the instep or top of the foot knitting initially integral lateral extensions which together constitute the bottom of the foot, then knitting a toe portion as an initially integral extension of said instep portion and said lateral extensions, the said warp threads extending unsevered throughout the entire longitudinal extent of the said heel portions, instep portion, foot-bottom portions and the toe, and then seaming up the blank along the bottom of the foot and back of the leg.

7. That method of knitting a full-fashioned or flat-knit run-proof or strongly run-resistant stocking or blank therefor which consists in knitting a main or body thread or threads into all the wales from edge to edge of the fabric and into all portions of the stocking or blank and in knitting a series of warp threads, one for substantially each needle wale of the fabric and collectively knitted into substantially all the stitches of said knitting wales, so that substantially each stitch of the main thread or threads of the fabric has a stitch or warp thread to render said fabric of a non-run or strongly run-resistant character, taking the instep stitches off the needles upon arriving at the instep portion; knitting the heel portions as integral continuations of the leg portion, transferring the instep stitches back to the needles, topping on the heel portions, then in the continued knitting of the instep or top of the foot knitting initially integral lateral extensions which together constitute the bottom of the foot, then knitting a toe portion as an initially integral extension of said instep portion and said lateral extensions, the said warp threads extending unsevered throughout the entire longitudinal extent of the said heel portions, instep portion, foot-bottom portions and the toe, and then seaming up the blank along the bottom of the foot and back of the leg.

8. That method of knitting a full-fashioned or flat-knit run-proof or strongly run-resistant stocking or blank therefor which consists in knitting a main or body thread or threads into all the wales from edge to edge of the fabric and into all the courses of the stocking or blank, and in knitting a series of warp threads extending lengthwise of the fabric into respective loops in successive courses in different loops of the said main or body thread or threads in such courses, taking the instep stitches off the needles upon reaching the instep portion, knitting the heel portions as integral continuations of the leg portion, knitting an additional portion on each heel portion for a looping finger hold including a loose course, transferring the instep stitches back to the needles without topping on the heel portion, starting the foot portions as lateral prolongations of the instep portion, and knitting the instep or foot portion and the toe; upon the completion of the knitting, looping the ends of the sole portion to the inner side of the heel portions and then seaming up the blank along the bottom of the foot at the back of the leg.

9. That method of knitting a full-fashioned or flat-knit run-proof or strongly run-resistant stocking or blank therefor which consists in knitting a main or body thread or threads into all the wales from edge to edge of the fabric and into all portions of the stocking or blank and in knitting a series of warp threads, one for substantially each needle wale of the fabric and collectively knitted into substantially all the stitches of said knitting wales, so that substantially each stitch of the main thread or threads of the fabric has a stitch or warp thread to render said fabric of a non-run or strongly run-resistant character, taking the instep stitches off the needles upon reaching the instep portion, knitting the heel portions as integral continuations of the leg portion, knitting an additional portion on each heel portion for a looping finger hold, including a loose course, transferring the instep stitches back to the needles without topping on the heel portions, starting the foot portions as lateral prolongations of the instep portion, and knitting the instep or foot portion and the toe; upon the completion of the knitting, looping the ends of the sole portion to the inner side of the heel portions, and then seaming up the blank along the bottom of the foot at the back of the leg.

10. In knitting mechanism for knitting a flat, selvaged or full-fashioned stocking blank rendered non-run by the presence of a warp thread in substantially each weft thread stitch, and which mechanism has means for introducing said weft thread and means for incorporating a set of warp threads into the respective needle wales, means for tensioning said warp threads, and other, automatic means applicable only to and for controlling the tension upon the warp threads for the instep needle wales.

11. In knitting mechanism for knitting a flat, selvaged or full-fashioned stocking blank rendered non-run by the presence of a warp thread in substantially each weft thread stitch, and which mechanism has means for introducing said weft thread and means for incorporating a set of warp threads into the respective needle wales, means for tensioning all said warp threads, and other means applicable only to and for controlling the tension upon the warp threads for the instep needle wales during the knitting of the heel sections of the fabric.

12. In knitting mechanism for knitting a flat, selvaged or full-fashioned stocking blank rendered non-run by the presence of a warp thread in substantially each weft thread stitch, and which mechanism has means for introducing said weft thread and means for incorporating a set of warp threads into the respective needle wales, means for tensioning all said warp threads, and other means applicable only to and for controlling the tension upon the warp threads for the instep needle wales, and means for automatically varying the tension upon the said instep warp threads.

13. In knitting mechanism for knitting a flat, selvaged or full-fashioned stocking blank rendered non-run by the presence of a warp thread in substantially each weft thread stitch, and which mechanism has means for introducing said weft thread and means for incorporating a set of warp threads into the respective needle wales, said latter means including a single beam for supporting all the said warp threads for the said blank, and means for automatically varying at predetermined times the tension upon the said beam.

14. In knitting mechanism for knitting a flat, selvaged or full-fashioned stocking blank rendered non-run by the presence of a warp thread in substantially each weft thread stitch, and which mechanism has means for introducing said weft thread and means for incorporating a set of warp threads into the respective needle wales, said latter means including a beam or beams for supporting all the warp threads for the said blank, means co-acting with said beam or beams for tensioning all said warp threads and cam controlled means for varying the tension upon a portion only of the said warp threads.

15. In knitting mechanism for knitting a flat, selvaged or full-fashioned stocking blank rendered non-run by the presence of a warp thread in substantially each weft thread stitch, and which mechanism has means for introducing said weft thread and means for incorporating a set of warp threads into the respective needle wales, said latter means including a support for all the said warp threads and from which they are introduced into the fabric, tension means for the warp threads while being introduced into at least the weft, other tension means acting at all times upon all the warp threads, a third tension means acting upon the warp threads pertaining to needle wales of the instep fabric and of the fashioned portions of the fabric, and a fourth tension means acting only upon the needle wales pertaining to the instep fabric.

16. That method of knitting a full-fashioned or flat-knit run-proof or strongly run-resistant stocking or blank therefor, which consists in knitting a main or body thread or threads into all the wales from edge to edge of the fabric and into all the courses of the stocking or blank, and including knitting a heavier main or body thread or threads for one or more portions of the fabric (as, for example, the top welt) than for the main or body thread or threads of the leg portion; knitting a series of warp threads extending lengthwise the fabric into respective loops in successive courses of the said main or body thread or threads in such courses; and tensioning the said warp threads but proportioning the tension upon said warp threads in inverse relation to the size or diameter of the main or body thread or threads, thereby increasing the longitudinal expansibility of the fabric, particularly with respect to those portions of the fabric having the heavier weft thread or threads.

17. That method of knitting a full-fashioned or flat-knit run-proof or strongly run-resistant stocking or blank therefor, which consists in knitting a main or body thread or threads into all the wales from edge to edge of the fabric and into all the courses of the stocking or blank, and including a heavier main or body thread or threads for at least the top welt of the stocking than the main or body thread or threads for the leg portion of the stocking; and in knitting a series of warp threads extending lengthwise of the fabric into respective loops in successive courses of the said main or body thread or threads in such courses; and proportioning the tension upon the warp threads in inverse relation to the size or diameter of the main or body thread or threads, thereby increasing the longitudinal expansibility of the fabric in that portion or portions knitted with the said heavier main or body thread or threads.

18. In mechanism for knitting a flat, selvaged or full-fashioned stocking blank rendered non-run by the presence of a warp thread in substantially each weft thread stitch, and which mechanism has means for introducing different diameters of weft threads in different portions of the fabric, and has means for incorporating a set of warp threads into the respective needle wales; tensioning means for the warp threads, and means for proportioning the tension upon the warp threads in inverse relation to the size or diameter of the weft knitting thread or threads, thereby increasing the longitudinal expansibility of those portions of the fabric having the heavier weft thread or threads.

19. In mechanism for knitting a flat, selvaged or full-fashioned stocking blank rendered non-run by the presence of a warp thread in substantially each weft thread stitch, and which mechanism has means for introducing different diameters of weft threads in different portions of the fabric, and has means for incorporating a set of warp threads into the respective needle wales; a cam shaft having means thereon for controlling the knitting instrumentalities, and including the knock-over bit cam, the press cam, the back catch bar cam, the needle bar lift cam and the stitch cam, said press cam having a peripheral contour gaining additional time for lapping the warp threads, said back catch bar cam having a contour delaying the movement of the sinkers and dividers and to prevent them cutting into the non-run fabric while narrowing or widening, said needle bar lift cam having a contour gaining time for lapping the warp threads, and the stitch cam also having a contour gaining time to lap the warp threads.

20. In mechanism for knitting a flat, selvaged or full-fashioned stocking blank rendered non-run by the presence of a warp thread in substantially each weft thread stitch, and has means for incorporating a set of warp threads into the respective needle wales; a framing adapted to be supported upon the flooring for supporting the usual knitting instrumentalities and a supplemental framing itself adapted to be separately and directly supplied upon the flooring and which supplemental framing supports the means for introducing the warp threads, thereby preventing the jarring necessarily incident to the movement of the usual knitting instrumentalities from reaching the warp thread introducing means.

21. In mechanism for knitting a flat, selvaged or full-fashioned stocking blank rendered non-run by the presence of a warp thread in substantially each weft thread stitch, and has means for incorporating a set of warp threads into the respective needle wales; a framing adapted to be supported upon the flooring for supporting the usual knitting instrumentalities and a supplemental framing which supports the means for introducing the warp threads, thereby preventing the jarring necessarily incident to the movement of the usual knitting instrumentalities from reaching the warp thread introducing means, said supplemental framing also carrying means for supporting all the warp threads and for tensioning the said warp threads.

22. Mechanism for knitting a flat, selvaged or full-fashioned stocking blank which is provided with weft thread introducing means, and has means for incorporating a set of warp threads into the respective needle wales, said weft thread introducing means including means for introducing weft threads of different diameters at different parts of the blank; means for tensioning all the warp threads, and means whereby the tension on the warp threads may be varied in inverse relation to the diameter of the weft threads into which warp threads are being incorporated as stitches at the time.

23. In mechanism for knitting upon a unit machine a flat, selvaged or full-fashioned stocking blank, including a foot, heel and toe and which is rendered non-run by the presence of a warp thread in substantially each weft thread stitch, and which mechanism has means for introducing said weft thread and has means for incorporating a set of warp threads into the respective needle wales; means for automatically removing the instep stitches from their needles preparatory to knitting the heel sections, and for restoring said stitches to said needles upon completion of said heel portions.

24. In mechanism for knitting upon a unit machine a flat, selvaged or full-fashioned stocking blank including the foot, heel and toe, and which mechanism has means for introducing a weft thread and has means for incorporating a set of warp threads into the respective needle wales, a three-section warp beam for supporting all of said warp threads, the center section being for the instep stitches, means for turning said warp beam as a unit to feed the warp threads, and means for periodically interrupting the feeding movement of said center section.

25. In mechanism for knitting upon a unit machine a flat, selvaged or full-fashioned stocking blank, including the foot, heel and toe, and which mechanism has means for introducing a weft thread and has means for incorporating a set of warp threads into the respective needle wales; a three-section warp beam for supporting all of said warp threads, the center section being for the instep stitches, means for automatically turning said warp beam as a unit to feed the warp threads, and means automatically to interrupt the feeding movement of said center section for and during the knitting of the heel portions.

26. In mechanism for knitting upon a unit machine a flat, selvaged or full-fashioned stocking blank including the foot, heel and toe, and which mechanism has means for introducing a weft thread and has means for incorporating a set of warp threads into the respective needle wales, a three section warp beam for supporting all of said warp threads, the center section being for the instep stitches, means for automatically turning said warp beam as a unit to feed the warp threads, means automatically to interrupt the feeding movement of said center section for and during the knitting of the heel portions, and means for turning backward said center section upon the completion of said heel portions, to tighten said warp threads, and means for resuming feeding movement of all of the warp threads.

27. In mechanism for knitting upon a unit machine a flat, selvaged or full-fashioned stocking blank, including the foot, heel and toe, and which mechanism has means for introducing a weft thread and has means for incorporating a set of warp threads into the respective needle wales, one for substantially each needle wale throughout the fabric which means includes a set of warp fingers, one for each such warp thread; means for automatically moving into non-functioning position the warp fingers pertaining to the instep stitches.

28. In mechanism for knitting upon a unit machine a flat, selvaged or full-fashioned stocking blank, including the foot, heel and toe, and which mechanism has means for introducing a weft thread and has means for incorporating a set of warp threads into the respective needle wales, a three-section warp beam for supporting all of said warp threads, the center section being for the instep stitches, means for automatically turning said warp beam as a unit to feed the warp threads, means automatically to interrupt the feeding movement of said center section for and during the knitting of the heel portions, and means for turning backward said center section to a variable extent dependent upon the diameter of the warp beam contents, upon the completion of the heel portions, so as to tighten the warp threads pertaining to the instep needles.

29. In mechanism for knitting upon a unit machine a flat, selvaged or full-fashioned stocking blank, including the foot, heel and toe, and which mechanism has means for introducing a weft thread and has means for incorporating a set of warp threads into the respective needle wales; a three-section warp beam for supporting all of said warp threads, the center section being for the instep stitches, means for automatically turning said warp beam as a unit to feed the warp threads, means automatically to interrupt the feeding movement of said center section for and during the knitting of the heel portions, and means for preventing forward turning of said center section during the knitting of the heel portions.

30. In mechanism for knitting upon a unit machine a flat, selvaged or full-fashioned stocking blank, including the foot, heel and toe, and which mechanism has means for introducing a weft thread and has means for incorporating a set of warp threads into the respective needle wales; means for automatically removing temporarily the instep stitches from the needles, and means to reduce the speed of the machine for and during said removal of the instep stitches.

31. In mechanism for knitting upon a unit machine a flat, selvaged or full-fashioned stocking blank, including the foot, heel and toe, and which mechanism has means for introducing a weft thread and has means for incorporating a set of warp threads into the respective needle wales; means for automatically removing temporarily the instep stitches from the needles, means to reduce the speed of the machine for and during said removal of the instep stitches, and means to resume the full speed of the machine for the knitting of the heel portions.

32. In mechanism for knitting upon a unit machine a flat, selvaged or full-fashioned stocking blank, including a foot, heel and toe, which mechanism has means for introducing a weft thread and has means for incorporating a set of warp threads into the respective needle wales; means for automatically removing the instep stitches from their needles preparatory to knitting the heel sections, and for restoring said stitches to said needles upon completion of said heel portions.

33. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, main tension means acting upon all the warp threads, other tension means pertaining to those warp threads only that are supplied to instep needle wales of the fabric, and means to control the periodicity of action of said other tension means.

34. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, main tension means acting upon all the warp threads, other tension means pertaining to those warp threads only that are supplied to instep needle wales of the fabric, and automatic means for controlling the application of said other tension means.

35. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, means to apply tension to all the warp threads that are so introduced into the fabric, auxiliary tension means applicable only to those warp threads that are supplied to instep needle wales, and means to control the application of said auxiliary tension means.

36. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, transfer or fashioning mechanism constructed to act during the knitting of the heel, main tension means acting upon all the warp threads, auxiliary tension means applicable only to those warp threads that are supplied to the instep needle wales, and means to cause said auxiliary tension means to function during the knitting of the heel.

37. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, transfer or fashioning mechanism constructed to act during the knitting of the heel, main tension means acting upon all the warp threads, auxiliary tension means applicable only to those warp threads that are supplied to the instep needle wales, and automatic means to apply said auxiliary tension means at the beginning of the formation of the heel.

38. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, main tension means acting upon all the warp threads, tension means for those warp threads only that are supplied to instep needle wales of the fabric, a selector shaft, a cam on said shaft for controlling the application of said tension means, and operating connections between said cam and said tension means.

39. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, main tension means acting upon all the warp threads, tension means for those warp threads only that are supplied to instep needles of the fabric, a selector shaft having knitting-action-controlling cams thereon, an additional cam on said selector shaft for controlling the application of said tension means, and operating connections between said additional cam and said tension means.

40. In knitting mechanism having means for knitting a flat, selvaged or full-fashioned stocking blank and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, warp thread beam means for supporting said entire series of warp threads, means to apply tension to said warp thread beam means throughout the knitting of the welt of each stocking blank, and means for automatically increasing said tension upon the completion of the welt portion of the stocking.

41. Knitting mechanism having means for knitting a flat, selvaged or full-fashioned stocking blank and including a set of knitting needles and immediately cooperating knitting elements, means to introduce a weft thread for at least the top welt and a less heavy weft thread for the leg portion, means to introduce to the needles a series of warp threads so that in the knitted fabric they extend lengthwise thereof and are respectively knitted in different loops of said weft threads respectively, warp thread beam means for supporting said entire series of warp threads, means to apply tension to said warp thread beam means throughout the knitting of at least the welt of each stocking blank, and means for applying increased tension to said warp threads while knitting the leg portion of the stocking.

42. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, supporting means for the warp threads from which they are introduced into the fabric, a general warp tension means extending across the entire series of warp threads and adapted to apply the same amount of tension to said entire series, an auxiliary tension means applicable only to the warp threads introduced into the instep needle wales, means to apply said auxiliary tension automatically, and independent tension means for the purpose of preventing or reducing lengthwise extending tension streaks, said independent tension means being positioned to apply tension to said instep warp threads and also to a number of warp threads at either side thereof, but substantially less in number than all the warp threads that are between said instep warp threads and the selvages of the fabric.

43. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, general tension means 109 for all the warp threads, auxiliary tension means 117 for the warp threads for the instep needle wales only, and an independent warp tension means 112 for acting upon the warp threads for the instep needle wales and also upon additional warp threads at either side of said warp threads for the instep needles.

44. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, general tension means 109 for all the warp threads, auxiliary tension means 117 for the warp threads for the instep needle wales only, and an independent warp tension means 112 for acting upon the warp threads for the instep needle wales and also upon additional warp threads at either side of said warp threads for the instep needles, and automatic means for causing said auxiliary tension means to function at the commencement of the heel formation.

45. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, main tension means acting upon all the warp threads, other tension means pertaining to those warp threads only that are supplied to instep needle wales of the fabric, and means for automatically varying the action of said tension means.

46. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, warp beam means for supporting all the warp threads for introduction into needle wales of said blank, means associated with said warp beam for imparting tension to all the warp threads and cam controlled means for varying the tension upon a portion only of the said warp threads.

47. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, said latter means including a support for all the said warp threads and from which they are introduced into the fabric, tension means for the warp threads while being introduced into at least the welt, other tension means acting at all times upon all the warp threads, a third tension means acting upon the warp threads pertaining to needle wales of the instep fabric and of the fashioned portions of the fabric, and a fourth tension means acting only upon the needle wales pertaining to the instep fabric.

48. That method of knitting a full-fashioned or flat-knit stocking or blank therefor, which consists in knitting a main or body thread or threads into all the wales from edge to edge of the fabric and into all the courses of the stocking or blank, and including knitting a heavier main or body thread or threads for one or more portions of the fabric (as, for example, substantially the top welt) than for the main or body thread or threads of the leg portion; knitting a series of warp threads extending lengthwise the fabric into respective loops in successive courses of said main or body thread or threads in such courses; and tensioning the said warp threads but proportioning the tension upon said warp threads in inverse relation to the size or diameter of the main or body thread or threads, thereby increasing the longitudinal expansibility of the fabric, particularly with respect to those portions of the fabric having the heavier weft thread or threads.

49. That method of knitting a full-fashioned or flat-knit stocking or blank therefor, which consists in knitting a main or body thread or threads into all the wales from edge to edge of the fabric and into all the courses of the stocking or blank, and including a heavier main or body thread or threads for at least the top welt of the stocking than the main or body threads or thread for the leg portion of the stocking; and in knitting a series of warp threads extending lengthwise of the fabric into respective loops in successive courses of the said main or body thread or threads in such courses; and proportioning the tension upon the warp threads in inverse relation to the size or diameter of the main or body thread or threads, thereby increasing the longitudinal expansibility of the fabric in that portion or portions knitted with the said heavier main or body thread or threads.

50. In knitting mechanism for knitting a flat, selvaged or full-fashioned stocking blank, which mechanism has means for introducing different diameters of weft threads in different portions of the fabric, and has means for introducing different diameters of weft threads in different portions of the fabric, and has means for incorporating a set of warp threads into the respective needle wales; tensioning means for the warp threads, and means for proportioning the tension upon the warp threads in inverse relation to the size or diameter of the weft knitting thread or threads, thereby increasing the longitudinal expansibility of those portions of the fabric having the heavier weft thread or threads.

51. In knitting mechanism for knitting a flat, selvaged or full-fashioned stocking blank, and which has means for incorporating a set of warp threads into the respective needle wales, one for substantially each needle wale of the said blank; a cam shaft having means thereon for controlling the knitting instrumentalities, and including the knock-over bit cam, the press cam, the back catch bar cam, the needle bar lift cam and the stitch cam, said press cam having a peripheral contour gaining additional time for lapping the warp threads, said back catch bar cam having a contour delaying the movement of the sinkers and dividers and to prevent them cutting into the fabric while narrowing or widening, said needle bar lift cam having a contour gaining time for lapping the warp threads, and the stitch cam also having a contour gaining time to lap the warp threads.

52. In knitting mechanism having means for knitting a flat, selvaged or full-fashioned stocking blank, and including a set of knitting needles and immediately cooperating knitting elements, means to introduce a weft thread or threads to said needles to form the successive courses, means to introduce to the needles an extended series of warp threads so that in the knitted fabric they extend lengthwise thereof and are respectively knitted in different loops of the weft thread that is in said courses, a framing for supporting the said knitting needles and the said immediately cooperating knitting elements and also for supporting the operating means for said needles and elements, a supplemental framing whereon is mounted the means to introduce said series of warp threads, and a support for all of said warp threads also mounted in said supplemental framing, said supplemental framing including uprights outside of and independent of the uprights of the framing for the knitting needles, immediately cooperating elements and their operating means, said supplemental framing extending to the floor or support for the entire mechanism, whereby the vibration of the knitting mechanism is not conveyed to the warp support.

53. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, means to support said warp threads in feeding relation to said warp guides, said means including a sectional warp beam, the middle section whereof is positioned to supply warp threads to the warp guides for instep needles, and at least one section at each side of said middle section to supply warp threads to warp guides outside the instep needles and means for differentially controlling said several sections.

54. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a warp beam shaft in warp feeding relation to said warp guides, a middle warp beam section loose on said shaft, a side beam section fast on said shaft, an opposite side beam section slidable longitudinally on said shaft, and provisions for causing the interengagement of all said beam sections so that they turn in unison with said shaft.

55. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the warp thread that is in said courses, and thus to extend lengthwise the fabric, a warp beam shaft in warp feeding relation to said warp guides, a plurality of warp beam sections on said shaft including a middle section, a control shaft for the warp beam shaft, said control shaft having sections corresponding in number to those of the warp beam, one of said control shaft sections having a plurality of cams thereon, and connections from one of said cams to one of the warp beam sections for moving said warp beam section into engagement with the middle warp beam section.

56. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a warp beam shaft in warp feeding relation to said warp guides, a plurality of warp beam sections on said shaft including a middle section, a control shaft for said warp beam shaft and having a series of sections, a drum and cable mounted on one of said sections of the control shaft, stitch transfer mechaniism including a transfer arm with transfer points, said cable being operatively connected to the said transfer arm to move the same toward and from functioning position with respect to the knitting needles.

57. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a warp beam shaft in warp feeding relation to said warp guides, a plurality of warp beam sections on said shaft including a middle section, a control shaft for the warp beam shaft and having several sections including a central section which is provided with ratchet mechanism, said central section being slidable axially to couple to the control shaft a section at either side thereof.

58. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a shaft supporting the entire series of warp guides, those warp thread guides which are adapted to supply warp threads to needles outside of the instep needles being fixedly supported upon said warp guide shaft, the set of warp fingers for the instep needles being so supported on said warp guide shaft as periodically to be fast to the shaft or to be loose thereon, so as in the latter condition to hang in non-functioning position.

59. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a shaft supporting the entire series of warp guides, those warp thread guides which are adapted to supply warp threads to needles outside of the instep needles being fixedly supported upon said warp guide shaft, the set of warp fingers for the instep needles being so supported on said warp guide shaft as periodically to be fast to the shaft or to be loose thereon, so as in the latter condition to hang in non-functioning position, and automatic means for bringing the warp guides for the instep needles under the control of the movements of said warp guide shaft, and for releasing them from such control.

60. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles and extended series of warp threads so that in the knitted fabric said warp threads are respectively knitted in different loops of the weft thread that is in said courses, and thus to extend lengthwise the fabric, a shaft supporting the entire series of warp guides, those warp thread guides which are adapted to supply warp threads to needles outside of the instep needles being fixedly supported upon said warp guide shaft, the set of warp fingers for the instep needles being so supported on said warp guide shaft as periodically to be fast to the shaft or to be loose thereon, so as in the latter condition to hang in non-functioning position, and automatic means for locking to and unlocking from said warp guide shaft the warp guides for the instep needles.

61. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a warp beam shaft in warp feeding relation to said warp guides, a plurality of warp beam sections on said shaft including a middle section, a control shaft for the warp beam shaft and having several sections including a central section which is provided with ratchet mechanism, and pattern control means for operating said ratchets whereby said central section has rotative movement intermittently imparted thereto.

62. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a shaft supporting the entire series of warp guides, those warp thread guides which are adapted to supply warp threads to needles outside of the instep needles being fixedly supported upon said warp guide shaft, the set of warp fingers for the instep needles being so supported on said warp guide shaft as periodically to be fast to the shaft or to be loose thereon, so as in the latter condition to hang in non-functioning position, transfer means for taking the instep stitches temporarily off their needles, and means for causing said temporary removal of instep stitches to occur simultaneously with the rendering loose of the instep warp guides with respect to the warp guide shaft.

63. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a shaft supporting the entire series of warp guides, those warp thread guides which are adapted to supply warp threads to needles outside of the instep needles being fixedly supported upon said warp guide shaft, the set of warp fingers for the instep needles being so supported on said warp guide shaft as periodically to be fast to the shaft or to be loose thereon, so as in the latter condition to hang in non-functioning position, transfer means for taking the instep stitches temporarily off their needles, means for causing said temporary removal of instep stitches to occur simultanously with the rendering loose of the instep warp guides with respect to the warp guide shaft, and means to cause the restoration of the instep stitches to the needles to occur simultaneously with the making of the instep warp guides fast to the warp guide bar.

64. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a warp beam shaft in warp feeding relation to said warp guides, a plurality of warp beam sections on said shaft including a middle section, a control shaft for said warp beam shaft and having a series of sections, a drum and cable mounted on one of said sections of the control shaft, stitch transfer mechanism including a transfer arm with transfer points, said cable being operatively connected to the said transfer arm to move the same toward and from functioning position with respect to the knitting needles, and guiding means upon the framing to guide the transfer bar in its movements up and down with relation to the instep needles.

65. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a warp beam shaft having a middle beam section and at least one section at each side thereof, means periodically to render said middle section of the warp beam loose upon the warp beam shaft, and means to control the said middle section at those times that it is loose upon the warp beam shaft.

66. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a warp beam shaft, a series of warp beam sections thereon including a middle section adapted at times to be rendered loose upon the said warp beam shaft, and means cooperating with said middle section to turn the same at a rate dependent on and corresponding to the decrease in diameter of the warp mass upon the warp beam.

67. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a warp beam shaft, a series of warp beam sections upon said shaft including a middle section, means whereby said middle section is periodically rendered loose upon the warp beam shaft and means whereby when said middle section is rendered fast upon the shaft it is turned backward sufficiently to wind onto said middle section the warp threads thereof so as to tighten them and place them under the same tension as the warp threads upon the other warp beam sections.

68. Knitting mechanism having means for knitting a flat, selvaged or full fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a warp beam shaft, a series of warp beam sections upon said shaft including a middle section, means whereby said middle section is periodically rendered loose upon the warp beam shaft and means whereby when said middle section is rendered fast upon the shaft it is turned backward sufficiently to wind onto said middle section the warp threads thereof so as to tighten them and place them under the same tension as the warp threads upon the other warp beam sections, and means for varying said backward winding movement so as to make such backward movement accord with the constantly lessening diameter of the warp mass on the said several sections.

69. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a warp beam shaft, a plurality of warp beam sections thereon including a middle section, means whereby said middle section may be periodically rendered loose upon said shaft, and means to prevent the middle section of the warp beam from turning forward at any time while it is loose upon the warp beam shaft.

70. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a warp beam shaft having a plurality of warp beam sections thereon, a control shaft for said warp beam shaft, said control shaft having several sections, the central one of which is adapted to be driven in either direction of rotation and to be moved axially, one of said side sections having a series of cams thereon to be rendered active by said central section and another of said side sections having a drum and cable thereon also adapted to be rendered active by said central section.

71. Knitting mechanism having means for knitting a flat, selvaged or full-fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a warp beam shaft having a series of warp beam sections thereon, a control shaft for said warp beam shaft and having a series of sections including a central section having gearing whereby it may be turned in either direction of rotation, a selector shaft having a cam thereon and connections from said cam to the said gearing upon the control shaft whereby said cam upon the selector shaft automatically controls the movements of the control shaft, and operative connections between said control shaft and the warp beam shaft for controlling the movements of the latter.

72. Knitting mechanism having means for knitting a flat, selvaged or full fashioned stocking blank and including a set of knitting needles and immediately cooperating knitting elements, means to introduce a weft thread or threads to said needles to form the successive courses, a series of warp guides to introduce to the needles an extended series of warp threads so that in the knitted fabric said warp threads are respectively knitted in different loops of the weft thread that is in said courses, and thus to extend lengthwise the fabric, a warp beam shaft having a series of warp beam sections thereon, a control shaft for said warp beam shaft and having a series of sections including a central section having gearing whereby it may be turned in either direction of rotation, a selector shaft having a cam thereon and connections from said cam to the said gearing upon the control shaft whereby said cam upon the selector shaft automatically controls the movements of the control shaft, operative connections between said control shaft and the warp beam shaft for controlling the movements of the latter, transfer mechanism including a transfer bar with transfer points, mounted upon the knitting machine, and connections from said control shaft to said transfer bar for moving said transfer bar and its transfer points into and out of functioning relation with the needles.

73. That method of knitting a full-fashioned or flat-knit run-proof or strongly run-resistant selvaged stocking or selvaged blank therefor which consists in knitting a main or body thread or threads into all the wales from selvage edge to selvage edge of the fabric and into all the courses of the stocking or blank, and in knitting a series of warp threads extending lengthwise of the fabric into respective loops in successive courses in different loops of the said main or body thread or threads in such courses; and during the knitting of the stocking or blank and with respect to said selvages thereof periodically laterally outwardly transferring stitches, so as to shape such part of the fabric by said outward transfer of stitches, such outward transfer of stitches including both stitches of the weft thread and such portions of the warp threads as are incorporated into said weft thread stitches.

74. In knitting mechanism for knitting a flat, selvaged or full-fashioned stocking blank rendered non-run by the presence of a warp thread in substantially each weft thread stitch, and which mechanism has means for introducing said weft thread and means for incorporating a set of warp threads into the respective needle wales, means for tensioning all said warp threads, and other, automatic means for periodically imposing additional tension upon the warp threads for the instep needles.

75. In mechanism for knitting upon a unit machine, a flat, selvaged or full-fashioned stocking blank, including the foot, heel and toe, and which mechanism has means for introducing weft thread and has means for incorporating a set of warp threads into the respective needle wales, one for substantially each needle wale throughout the fabric, which means includes a set of warp fingers, one for each such warp thread, transfer point means to remove temporarily the stitches from the instep needles, and means for automatically moving into non-functioning position the warp fingers pertaining to the instep stitches at substantially the time said stitches are removed from the instep needles.

76. In mechanism for knitting upon a unit machine a flat, selvaged or full-fashioned stocking blank, including the foot, heel and toe, and which mechanism has means for introducing weft thread and has means for incorporating a set of warp threads into the respective needle wales for at least the instep needles wales, and a series of needle wales at each side of said instep needle wales, which means includes a set of warp fingers, one for each such warp thread, means for automatically moving into non-functioning position the warp fingers pertaining to the instep stitches.

77. In mechanism for knitting upon a unit machine a flat, selvaged or full-fashioned stocking blank, including the foot, heel and toe, which mechanism has means for introducing weft thread and has means for incorporating a set of warp threads into the respective needle wales, means for automatically removing temporarily the instep stitches from the needles, and means to reduce the speed of the machine for and during said removal of the instep stitches, and means for automatically moving into non-functioning position the warp fingers pertaining to the instep stitches at substantially the time said stitches are removed from the instep needles.

78. In mechanism for knitting upon a unit machine a flat, selvaged or full-fashioned stocking blank, including the foot, heel and toe, which mechanism has means for introducing weft thread and has means for incorporating a set of warp threads into the respective needle wales, means for automatically removing temporarily the instep stitches from the needles, means to reduce the speed of the machine for and during said removal of the instep stitches, and means to resume the full speed of the machine for the knitting of the heel portions, and means for automatically moving into non-functioning position the warp fingers pertaining to the instep stitches at substantially the time said stitches are removed from the instep needles.

ELLSWORTH E. CARLSON.